US012644806B2

(12) United States Patent
Bastiaens et al.

(10) Patent No.: US 12,644,806 B2
(45) Date of Patent: Jun. 2, 2026

(54) METHOD AND DEVICE FOR ULTRA-RAPID CRYO-FIXATION OF A SAMPLE FOR MICROSCOPIC STUDIES

(71) Applicants:Max-Planck-Gesellschaft zur Förderung der Wissenschaften e.V., Munich (DE); University of Buenos Aires, Argentina (AR); National Scientific & Technical Research Council, Argentina (AR)

(72) Inventors: Philippe I.H. Bastiaens, Dortmund (DE); Jan Hubinger, Dortmund (DE); Hernán Edgardo Grecco, Buenos Aires (AR)

(73) Assignees: Max-Planck-Gesellschaft zur Förderung der Wissenschaften e.V., Munich (DE); University of Buenos Aires, Argentina (AR); National Scientific & Technical Research Council, Argentina (AR)

( * ) Notice: Subject to any disclaimer, the term of this patent is extended or adjusted under 35 U.S.C. 154(b) by 396 days.

(21) Appl. No.: 18/286,563

(22) PCT Filed: Apr. 27, 2022

(86) PCT No.: PCT/EP2022/061123
§ 371 (c)(1),
(2) Date: Oct. 12, 2023

(87) PCT Pub. No.: WO2022/229231
PCT Pub. Date: Nov. 3, 2022

(65) Prior Publication Data
US 2024/0201056 A1      Jun. 20, 2024

(30) Foreign Application Priority Data

Apr. 27, 2021   (EP) ..................................... 21170604
Dec. 3, 2021   (EP) ..................................... 21212333

(51) Int. Cl.
| | |
|---|---|
| *G01N 1/42* | (2006.01) |
| *G01N 1/28* | (2006.01) |
| *G01N 21/64* | (2006.01) |

(52) U.S. Cl.
CPC ............. *G01N 1/42* (2013.01); *G01N 1/2813* (2013.01); *G01N 21/6428* (2013.01); *G01N 21/6456* (2013.01)

(58) Field of Classification Search
CPC .... G01N 1/42; G01N 1/2813; G01N 21/6428; G01N 21/6456
See application file for complete search history.

(56) References Cited

U.S. PATENT DOCUMENTS

| | | |
|---|---|---|
| 2015/0147778 A1 | 5/2015 | Pickard |
| 2017/0038105 A1 | 2/2017 | Newman |
| 2018/0356321 A1 | 12/2018 | Sase |

OTHER PUBLICATIONS

Shigley, JE "HPHT and CVD Diamond Growth Processes: Making Lab-Grown Diamonds", GIA Jul. 25, 2016, retrieved online from URL:www.gia.edu/hpht-and-cvd-diamond-growth-processes?, 14 pages. (Year: 2016).*
International Search Report and Written Opinion for International Patent Application No. PCT/EP2022/061123 dated Jun. 22, 2022, 9 pages.

* cited by examiner

*Primary Examiner* — Aaron J Kosar
(74) *Attorney, Agent, or Firm* — Amin, Turocy & Watson, LLP

(57) ABSTRACT
The present invention relates to method for decreasing temperature of a sample, in particular a method for ultra-rapid cryofixation of a sample for time and spatially resolved microscopic measurements as well as a device for ultra-rapid cryofixation of a sample at any particular time point of interest on a microscope. Said method and device are particularly useful for studying native molecular organization as well as (bio)chemical reactions within living cells with spatial and spectroscopic resolution beyond the fundamental limits caused by molecular motion at positive Celsius temperatures.

17 Claims, 21 Drawing Sheets

Figure 17
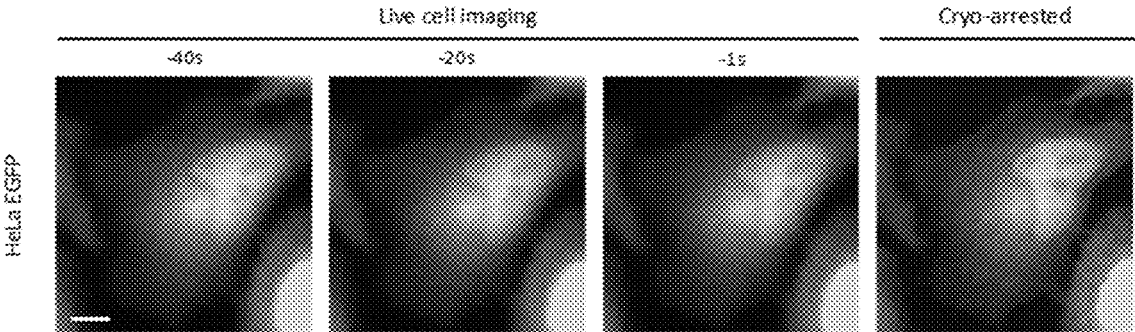
Figure 18
Figure 19
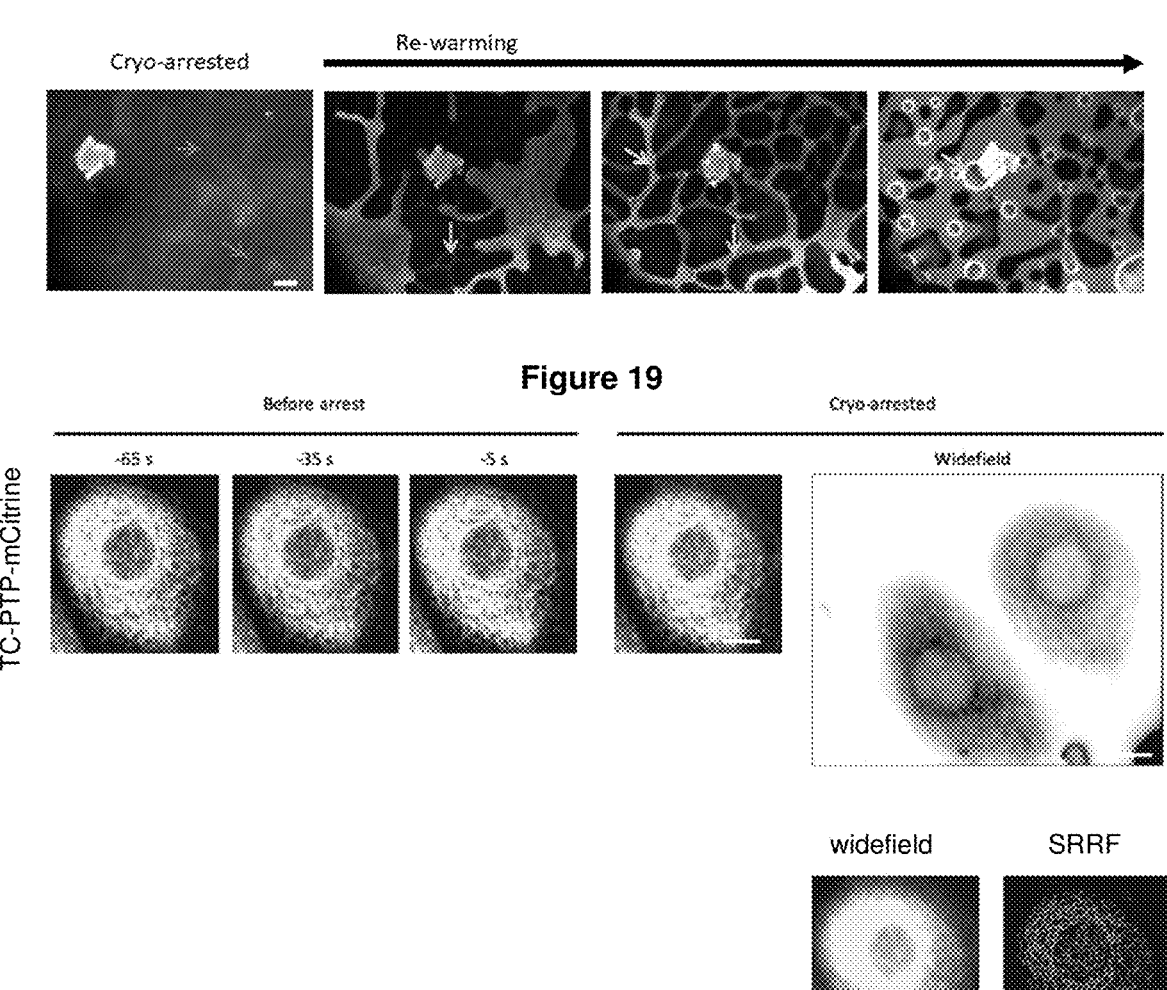

A

B

C

D

CLSM

STED

CLSM/STED

METHOD AND DEVICE FOR ULTRA-RAPID CRYO-FIXATION OF A SAMPLE FOR MICROSCOPIC STUDIES

The present invention relates to method for decreasing temperature of a sample, in particular a method for ultra-rapid cryofixation of a sample for time and spatially resolved microscopic measurements as well as a device for ultra-rapid cryofixation of a sample at any particular time point of interest on a microscope. Said method and device are particularly useful for studying native molecular organization as well as (bio)chemical reactions within living cells with spatial and spectroscopic resolution beyond the fundamental limits caused by molecular motion at positive Celsius temperatures.

BACKGROUND OF THE INVENTION

Fluorescence microscopy is a powerful tool for studying structure and dynamics of molecular systems.

Recent developments in fluorescence microscopy allow for the tracking of well-separated molecules with nanoscale and milliseconds localization precision (Balzarotti et al. 2017, *Science*, 355: 606-12). Super-resolution methods like single molecule localization microscopy (SMLM) (Betzig et al. 2006, *Science*, 313: 1642-46), coordinate targeted nanoscopy (e.g. stimulated emission depletion (STED) microscopy) (Hell and Wichmann 1994, *Optics Letters*, 19: 780-82; Sahl, Hell, and Jakobs 2017, *Nature reviews. Molecular cell biology*, 18: 685-701) or nanoscopy with minimal photon flux (MINFLUX) (Balzarotti et al. 2017, *Science*, 355: 606-12) allow for resolutions beyond the diffraction limit of light in crowded environments. Adding a spectroscopic dimension to the readout of photons in micro- or nanoscopy, such as polarisation (Runnels and Scarlata 1995, *Biophys J*, 69: 1569-83; Varma and Mayor 1998, *Nature*, 394: 798-801) or excited state lifetime (Gadella, Jovin, and Clegg 1993, *Biophysical Chemistry*, 48: 221-39; Bastiaens and Squire 1999, *Trends in Cell Biology*, 9: 48-52), allows the extraction of information on molecular reaction state within spatially resolvable volume elements.

However, spatial as well as spectroscopic resolution is fundamentally limited by the number of collected photons due to the Poisson statistics of quantum interactions (Gratton et al. 2003, *Journal of Biomedical Optics*, 8; Balzarotti et al. 2017, *Science*, 355: 606-12). The saturatable cycling of fluorophores between the ground and excited state as determined by the molecular cross section, fluorescence quantum yield and excited state lifetime, sets a limit to the fluorescence photon flux. This results in a minimally attainable exposure time that causes motional blur due to Brownian motion during the acquisition of photons. Motional blur is inversely related to the size of the observed structures and fundamentally limits localization precision and resolution (FIG. 1). This fundamental limit in exposure time is further prolonged by technical constrains of the optical systems, such as laser scanning in coordinate targeted nanoscopy or switching of fluorophores in coordinate stochastic nanoscopy. Active movement, such as molecular motor driven transport or cytoskeletal reorganisation further increases motional blur. Maximizing the saturable flux of fluorescence photons by enhancing irradiation intensity increases the time fluorophores are in the chemically-reactive excited state, causing strong bleaching. This not only compromises resolution by limiting the amount of informative photons that reach the detector (FIG. 1), but also enhances phototoxicity, perturbing the reactions in the sample.

A specific example is fluorescence microscopy of biological systems, such as living cells. Here, cellular functionality manifests on the micrometre scale and emerges from the non-equilibrium pattern-forming dynamics of nanometre-sized molecules (Bastiaens et al. 2006, *Trends Cell Biol*, 16: 125-34; Battle et al. 2016, *Science*, 352: 604-07; Koseska and Bastiaens 2017, *The EMBO Journal*, 36: 568-82; Gnesotto et al. 2018, *Reports on Progress in Physics*, 81). Fluorescence micro- and nanoscopy in principle enable imaging of said molecular patterns within cells as well as measure the underlying reaction dynamics. However, the ultimate goal to relate collective molecular behaviour to cellular functionality (Varma and Mayor 1998, *Nature*, 394: 798-801; Bastiaens and Squire 1999, *Trends in Cell Biology*, 9: 48-52; Wouters, Verveer, and Bastiaens 2001, *Trends Cell Biol*, 11: 203-11; Sahl, Hell, and Jakobs 2017, *Nature reviews. Molecular cell biology*, 18: 685-701; Balzarotti et al. 2017, *Science*, 355: 606-12) is often inaccessible due to the fundamental problem of photochemical reactivity of fluorescent probes together with motional blur.

To prevent molecular motion, such samples are usually chemically fixed. However, fixation by either cross-linking or denaturation inherently changes the sample, thereby rendering this method unsuitable for observation of native non-equilibrium states, particularly non-equilibrium molecular pattern in cells. The fixation process also takes at least minutes and is incomplete. Thus, it does not allow fixing a defined state (Huebinger et al. 2018, *Sci Rep*, 8: 17756). Subsequent treatments to enhance photostability are another source for artefacts.

Motional blur can be reduced by cooling the sample to a temperature at which it becomes a solid or reaches very high viscosity, thereby also diminishing photochemical reactivity of fluorophores. However, this has to be done extremely fast to avoid changes of the sample due to phase changes or loss of non-equilibrium states. E.g., living cells have to be immobilized extremely fast below the glass transition temperature of $\approx-136°$ C. to avoid mechanical destruction of cellular structures by ice crystals as well as denaturation of lipid membranes and proteins. This way, the water molecules in the sample are constrained from reaching thermodynamic equilibrium at this low temperature and become locked in a liquid-like configuration. Thus, even cellular out-of-equilibrium macro-molecular patterns can thereby be preserved by ultra-rapid cooling.

However, when liquids are applied onto a sample for cooling said sample, a limiting factor is the limited wettability of the initially warm surface. Due to the Leidenfrost phenomenon, an insulating vapour layer with a drastically reduced heat conduction compared to the liquid is formed at the surface, so that the cooling rate at the surface is limited. Furthermore, the technically possible flow velocity and thus the cooling capacity is limited. When using a gaseous cooling medium, however, the volume-related heat capacity is too low to achieve a cooling capacity sufficient for practical investigations due to its lower density.

Ultra-rapid cooling directly on a microscope is particularly desired since it enables the combination of dynamic measurements at positive temperatures in combination with precise analysis in the absence of molecular motion and with strongly reduced photochemical reactivity of the same sample under cryo-arrest.

The methods known in the state of the art for fast cooling of a sample are e.g. high-pressure freezing and propane jet freezing. High-pressure freezing requires a pressure of 2000 bar in order to reduce the melting point of the sample in order to pass the temperature range quickly in which the formation of ice crystals would be possible. Pressurizing the sample necessitates its encapsulation. With respect to propane jet freezing, it is necessary that a sample is jetted from two sides, i.e. from the top and from the bottom of the sample so that the methods and the devices are not suitable to allow an observation of the sample by a microscope in particular by an inverse microscope before, during and after the fast cooling process. In an inverse microscope, the sample is applied from the above of the objective lens of the microscope.

In the European Patent EP 2 877 828 B1, a method for temperature control of a sample as well as a temperature control device is disclosed. Therein, a supercritical medium is used to cool the sample provided on a front side of a carrier substrate. The supercritical medium is applied on the rear side of the carrier substrate from below, i.e. against the direction of earth gravitation. It is possible to cool the sample by means of said method but the temperature rate is too small in order to allow a continuous observation of the sample without destroying the biological sample by ice crystals. Moreover, applying the cooling medium against the earth gravitation does not allow the observation of the sample by an inverse microscope.

An in situ cryofixation method is reported by Fuest et al (*Journal of Microscopy*, 2018, 272: 87-95), in which the sample is placed on a heater that is in thermal contact with liquid nitrogen via an insulator. Despite the presence of cryoprotectants, the achieved cooling rates were too low to prevent ice crystal formation (Fuest et al. 2019, *Scientific Reports*, 9: 19133). Therefore this cryofixation method is only applicable to microorganisms that tolerate ice crystal formation like *Caenorhabditis elegans* or yeast.

Other samples, like mammalian cells, are especially difficult to arrest by cryofixation, due to their high water content, which is a very poor glass former and has a relatively low thermal conductivity (<0.6 W m$^{-1}$ K$^{-1}$).

Recent approaches of avoiding ice crystal formation in living cells included replacing water by cryoprotective substances before cooling (Fuest et al. 2019, *Scientific Reports*, 9: 19133). However, this method would change the sample (Huebinger 2018, *PLOS ONE*, 13: e0205520) and thus may influence the study of biological samples. Therefore, rapid cooling methods that avoid use of cryoprotective substances are highly desired.

EP 3418710 A1 relates to a method and setup for preparing samples for inverse microscopy studies, wherein the sample is irradiated at a first region with light at a time t1; a second region of the sample is irradiated with light at a time t2 after the time t1; and the sample is fixed at a time t3 after the time t2. The sample can be fixed by freezing (e.g. liquid nitrogen) or chemical fixation with a glutaraldehyde solution and a photocurable resin. WO 2013/152239 A1 relates to a cryo-preparation system for near-instantaneous vitrification of biological samples. The system includes a capsule structure configured for carrying, holding, or retaining the sample within a recess while the sample is subjected to ultra-rapid freezing by way of exposure to a cryogenic coolant jet. Pulsed microwave energy is applied during rapid cooling in order to avoid ice crystal formation within the sample. In these methods it is not disclosed how to produce a coolant jet that effectively avoids the formation of an insulating gas layer to cool the sample fast enough. EP 3128267 A1 discloses a food freezer tunnel apparatus for cryogenically chilling food products. A pulsed liquid cryogen flow is applied from a pressurized tank. The pulsed cryogen flow is created by alternate opening and closing of two valves. The pressure is however limited by the pump to 1.379 MPa, which will limit the cooling speed.

A general disadvantage of the conventional methods results from their specialized design for freezing samples. Other tempering processes, such as a sudden thawing of a sample, cannot usually be carried out with the conventional methods. However, for investigation of dynamic systems, it is important that the processes in the system can continue as undisturbed as possible after taking the still image and ending the fixation by heating. In the case of biological samples, for example, it is of interest to carry out heating in such a way that no ice crystals are formed during thawing and the sample is not overheated.

The objective of the present invention is the provision of an improved method and device for decreasing the temperature of a sample, with a sudden temperature adjustment for microscopic investigations, avoiding the disadvantages and limitations of conventional techniques. The invention comprises more precisely a method for ultra-rapid cryoprotectant-free cryofixation of a sample for spatially resolved microscopic measurements as well as a device for ultra-rapid cryofixation of a sample on a microscope. In particular, the invention is intended to make it possible to change the temperature of samples with an increased rate of temperature adjustment compared with the conventional techniques, to realize temperature increases or decreases, to set a final temperature of the temperature change and/or to monitor the sample. Abrupt temperature adjustments should be triggered at any desired time, especially during observation of the sample. In particular, the invention is intended to provide an improved technique for the vitrification of biological samples and their controlled heating in such a way that no ice crystal formation and no overheating occur, thereby allowing microscopic measurements of the sample before, during and after vitrification without altering the sample (reversible). In other words, the invention is intended to provide a technique for fixation of short-lived states of a sample in a targeted and uninfluenced ("native") manner ("cryo-arrest") and to investigate them with fluorescence microscopy methods whose recording speed would otherwise be too slow for studying these states. A further objective of the present invention is the provision of a device and a method for cooling a sample on an inverted microscope fast enough in order to allow a continuous observation of the sample before and after cryo-fixation.

The objective of the present invention is solved by the teaching of the independent claims. Further advantageous features, aspects and details of the invention are evident from the dependent claims, the description, the figures, and the examples of the present application.

BRIEF DESCRIPTION OF THE INVENTION

The objective has been solved by a method for decreasing temperature of a sample (1) for inverse microscopy comprising the following steps:

(a) providing a sample (1) on the lower side (12) of a carrier substrate (10) at atmospheric pressure;

(b) providing in a pressure tank (400) at least one liquid (2) having a temperature below its critical temperature and a gas (500) having a pressure higher than the atmospheric pressure; and (c) supplying the at least one liquid (2) from the pressure tank (400) to the upper side (11) of the carrier substrate (10) under pressure by opening an outlet valve (22) located at the bottom of the pressure tank (400), wherein the at least one liquid (2) is brought into contact with the upper side (11) of the carrier substrate (10), wherein the temperature of the sample (1) is decreased, preferably rapidly decreased, wherein the at least one liquid (2) is nitrogen and the gas (500) is helium at a pressure of at least 2.5 MPa.

Reworded, the present invention is directed to a method for decreasing temperature of a sample (1) for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased.

Reworded, the method for decreasing temperature of a sample (1) for inverse microscopy comprises the following steps:

(a) providing a sample (1) on a lower side (12) of a carrier substrate (10) at atmospheric pressure;

(b) providing in a pressure tank (400) liquid nitrogen having a temperature below its critical temperature and helium having a pressure of at least 2.5 MPa; and (c) applying the liquid nitrogen from the pressure tank (400) to an upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased.

Reworded, the method for decreasing temperature of a sample (1) for inverse microscopy comprises the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa; and (c) applying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased.

Reworded, the method for decreasing temperature of a sample (1) for inverse microscopy comprises the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa; and (c) passing the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably abruptly decreased.

Thus, rapid cooling of a sample (1) accommodated at the lower side (12) of a carrier substrate (10) is achieved by supplying liquid nitrogen having a temperature below its critical temperature under pressure to the upper side (11) of the carrier substrate (10) from a pressure tank (400). Pressure is applied to the liquid nitrogen by a gas (500) (helium), which is contained under high pressure in the pressure tank (400).

The pressure of helium is preferably at least 2.5 MPa, more preferably at least 3.0 MPa, more preferably at least 3.5 MPa, more preferably at least 4.0 MPa, more preferably at least 4.5 MPa, and most preferably at least 5.0 MPa.

Thus, in a preferred embodiment the method for decreasing temperature of a sample (1) for inverse microscopy comprises the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 5 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased.

In a further embodiment, the pressure of helium is preferably between 2.5 MPa and 100 MPa, more preferably between 3.0 MPa and 100 MPa, more preferably between 3.5 MPa and 100 MPa, more preferably between 4.0 MPa and 100 MPa, more preferably between 4.5 MPa and 100 MPa, and most preferably between 5.0 MPa and 100 MPa.

Thus, in another preferred embodiment the method for decreasing temperature of a sample (1) for inverse microscopy comprises the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure between 5 MPa and 100 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased.

The liquid nitrogen serving as a cooling medium or heat sink is applied in a sudden (or rapid or instantaneous) manner by opening an outlet valve (22) of the pressure tank (400). Thus, the outlet valve should be adapted to release the liquid nitrogen rapidly. To this extent, the outlet valve should be switchable, i.e. the outlet valve should open and close completely in a very fast manner. Also, the outlet valve should be designed to have a maximum diameter for releasing the liquid nitrogen rapidly.

The carrier substrate (10), which separates the sample (1) from the liquid nitrogen, acts here as a heat conductor and is thus made of any material that has the desired thermal conductivity and sufficient strength at the pressure of the tempering fluid. Preferably, the carrier substrate (10) comprises or consists of a diamond disc.

In one embodiment, the liquid nitrogen is released completely from the pressure tank (400) in step (c) in order to bring a maximum of the nitrogen into contact with the upper side of the carrier substrate and therefore to achieve a maximum cooling of the sample. Thus, the method for decreasing temperature of a sample (1) for inverse microscopy comprises the following steps:

(a) providing a sample (1) on the lower side (12) of a carrier substrate (10) at atmospheric pressure;

(b) providing in a pressure tank (400), liquid nitrogen having a temperature below its critical temperature and helium having a pressure of at least 2.5 MPa; and (c) supplying the liquid nitrogen from the pressure tank (400) completely to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased.

According to the invention, a sudden or rapid or explosive temperature decrease is realized, which means that the sample temperature is decreased from an initial temperature (start temperature) to an end temperature (target temperature) at a speed (cooling rate, tempering rate) compared to which the speed of molecular processes in the sample (e.g. ice crystal formation) is lower or negligible.

In other words, the method for decreasing temperature of a sample (1) for inverse microscopy comprises the following steps:

(a) providing a sample (1) on the lower side (12) of a carrier substrate (10) at atmospheric pressure;

(b) providing in a pressure tank (400), liquid nitrogen having a temperature below its critical temperature and helium having a pressure of at least 2.5 MPa; and (c) supplying the liquid nitrogen from the pressure tank (400) completely to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased explosively.

In another embodiment, in step (c) the complete content of the pressure tank (400), i.e. first the liquid nitrogen and second helium are supplied to the upper side (11) of the carrier substrate (10). While cooling of the sample is mainly caused from passing the liquid over the upper side (11) of the carrier substrate (10), additional cooling may be achieved by helium, which has the same temperature as the liquid nitrogen. Thus, in one embodiment, the method for decreasing temperature of a sample (1) for inverse microscopy comprises the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa; and (c) supplying the liquid nitrogen and the gas (500) from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased.

More precisely, in one embodiment, the method for decreasing temperature of a sample (1) for inverse microscopy comprises the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa; and (c) supplying the liquid nitrogen and the gas (500) from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased, wherein in step (c) the liquid nitrogen is supplied first and helium is supplied second.

Liquid nitrogen serving as a cooling medium is applied in a sudden manner so that the sample undergoes vitrification without crystallization, particularly without formation of ice crystals or without formation of ice crystals larger than 10 nm in diameter. The cooling rate for vitrification of a sample depends strongly on the sample's properties; mainly on the molecular components of the sample. For instance, vitrification occurs in dilute aqueous buffers, when these are cooled at a rate of approximately 100,000 K/s-1,000,000 K/s.

Thus, in one embodiment the method for decreasing temperature of a sample (1) for inverse microscopy comprises the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased at a rate of at least −100,000 K per s.

It is well known that the cooling rate required for vitrification of the sample may be lowered by the addition of cryoprotective compounds, such as dextran, or by applying high pressure of about 200 MPa on the sample. However, the use of a cryoprotectant may also influence the samples' properties and activities.

In further preferred embodiments of the inventive method for decreasing temperature of a sample (1) the temperature of the sample (1) is decreased at a rate of at least −10,000 K per s, more preferably at least of −100,000 K per s, more preferably at least of −200,000 K per s, more preferably at least of −500,000 K per s and most preferably at least of −1,000,000 K per s.

In one embodiment, the temperature of the sample (1) is decreased at a rate between −100,000 K per s and −1,000, 000 K per s.

In other embodiments, the sample natively or additively comprises cryoprotective compounds, such as salts, sugars (e.g. trehalose, dextran), organic solvents (e.g. dimethyl sulfoxide, ethylene glycol), proteins or antifreeze proteins in certain cells.

In these embodiments, cooling rates for vitrification, which are lower than the above-mentioned rates, may be applied.

Thus, in one embodiment the method for decreasing temperature of a sample (1) for inverse microscopy comprises the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased at a rate of at least −10,000 K per s.

Reworded, in one embodiment the method for decreasing temperature of a sample (1) for inverse microscopy comprises the following steps:

(a) providing a sample (1) on the lower side (12) of a carrier substrate (10) at atmospheric pressure;

(b) providing in a pressure tank (400), liquid nitrogen having a temperature below its critical temperature and helium having a pressure of at least 2.5 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased at a rate of at least −10,000 K per s;

and wherein the sample comprises a cryoprotective compound.

In these embodiments, the temperature of the sample (1) is preferably decreased at a rate of at least −5,000 K per s, more preferably at least of −6,000 K per s, more preferably at least of −7,000 K per s, more preferably at least of −8,000 K per s, more preferably at least of −9,000 K per s and most preferably at least of −10,000 K per s.

It is well known that the achieved cooling rate depends on the samples' properties, such as thermal conductivity within the sample and its thickness. A skilled person may readily choose a suitable sample thickness in order to ensure complete vitrification of the sample with the method according to the present invention.

Thus, in one embodiment the method for decreasing temperature of a sample (1) for inverse microscopy comprises the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased, and wherein the sample (1) has a thickness of less than 500 µm.

Preferably the sample (1) has a thickness of less than 500 µm, more preferably of less than 400 µm, more preferably of less than 300 µm, more preferably of less than 200 µm, more preferably of less than 100 µm, more preferably of less than 50 µm, more preferably of less than 30 µm, more preferably of less than 20 µm, more preferably of less than 15 µm, and even more preferably less than 10 µm.

Thus, in one embodiment the method for decreasing temperature of a sample (1) for inverse microscopy comprises the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa; and (c) supplying the at least one liquid (2) from the pressure tank (400) to the upper side (11) of the carrier substrate (10) under pressure by opening an outlet valve (22) located at the bottom of the pressure tank (400), wherein the at least one liquid (2) is brought into contact with the upper side (11) of the carrier substrate (10), wherein the temperature of the sample (1) is decreased, preferably rapidly decreased, and wherein the sample (1) has a thickness of less than 20 µm.

In other words, the method for decreasing temperature of a sample (1) for inverse microscopy comprises the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased from room temperature to at least −120° C., preferably −130° C.

In a preferred embodiment of the inventive method for decreasing temperature of a sample (1) for inverse microscopy, the sample (1) undergoes vitrification (i.e. without formation of ice crystals larger than 10 nm in diameter). Ice crystals of nanometer size usually do not affect the samples' properties and activities (Huebinger et al., 2016, *Biophysical Journal*, 110: 840-49). The size of ice crystals in the sample (1) can be determined by standard methods like cryogenic electron microscopy (cryo-EM) or X-ray diffraction.

Thus, the method for decreasing temperature of a sample (1) for inverse microscopy comprises the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased and the sample (1) undergoes vitrification without crystallization, preferably without formation of ice crystals larger than 80 nm in diameter, preferably without formation of ice crystals larger than 10 nm in diameter, more preferably without formation of ice crystals larger than 1 nm in diameter and even more preferably without formation of ice crystals.

All methods for decreasing temperature of a sample (1) as disclosed herein are able to decrease the temperature of the sample (1) without the formation of ice crystals or without the formation of ice crystals larger than 10 nm in diameter.

More precisely, all methods for decreasing temperature of a sample (1) as disclosed herein are able to decrease the temperature of the sample (1) below −120° C. and preferably below −130° C. without the formation of ice crystals or without the formation of ice crystals larger than 10 nm in diameter.

Thus, the temperature of the sample (1) is decreased explosively which means very rapidly. A minimum cooling rate in order to avoid formation of ice crystals larger than 10 nm in diameter is hard to define, because the required cooling rate depends of the thickness and size of the sample (1), the material or mixture of materials the sample (1) consists of, the presence of cryoprotective compounds (i.e. cryoprotectants) and other parameters disclosed herein. However, as an example the methods for decreasing temperature of a sample (1) as disclosed herein are able to decrease the temperature of an aqueous sample with a 50-μm thermocouple, wherein the sample has a thickness of 100 μm from room temperature to a temperature between −120° C. to −130° C. within a time frame less than 10 milliseconds by a cooling rate of −15,000 K/s or less (see FIG. 7A). Said cooling rate approaches the theoretical thermal diffusion limit of aqueous samples and therefore corresponds to a cooling rate of up to −200,000 K/s for an aqueous sample of 10 μm-15 μm thickness comprising adherent mammalian cells.

Another aspect of the invention is related to a device (100) for controlling the temperature of a sample (1), comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible.

By supplying a cooling liquid from the pressure tank (400) under pressure to the upper side (11) of the carrier substrate (10) in a sudden manner, the formation of an insulating gaseous layer on the carrier substrate (Leidenfrost phenomenon) is prevented. The use of a liquid at low pressure alone would not prevent the formation of an insulating gaseous layer, and thus result in a lower cooling rate. This problem can be solved by additionally pressurizing the cooling liquid in particular by using a gas (500), such as helium, which does not liquefy under these conditions. When this mixture of liquid and gas gets rapidly released onto the carrier substrate, a very high flow of coolant at the carrier substrate enables rapid convective cooling and suppresses film boiling. Moreover, the device has been inverted in comparison to the device according to EP 2 877 828 B1 such that the tank storing the cooling medium is located above the sample and that the cooling medium is applied from top onto the carrier substrate.

In order to minimize warming of the cooling liquid (2) in the supply line (20), the pressure tank (400) is arranged above the upper side (11) of the carrier substrate (10) such that the supply line (20) can be as short as possible. By shortening the line from the outlet valve (22) of the pressure tank (400) to the upper side (11) of the carrier substrate (10), less heat exchange between the cooling liquid (2) and the surrounding can occur. This can be achieved by mounting or connecting the pressure tank (400) with the outlet valve (22) at its bottom to the upper the upper side (11) of the carrier substrate (10).

In preferred embodiments of the device (100), warming of the cooling liquid (2) is further minimized by insulating the supply line (20). Thus, a preferred embodiment of the device (100) for controlling the temperature of a sample (1), comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible, and wherein the supply line (20) is insulated from the inside, preferably with high density polyethylene.

The device (100) according to the invention allows the cryoprotectant free fixation and observation of native out-of-equilibrium molecular states, such as cytoplasmic molecular organisation and reaction patterns within living cells. The device (100) when being coupled to an inverse microscope set-up, enables the continuous observation of dynamic cellular processes at physiological temperatures to subsequently rapidly freeze and measure molecular patterns in the same cells in the cryopreserved state.

In other words, the device (100) according to the invention is a device for decreasing, preferably rapidly decreasing the temperature of a sample (1), comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) having an upper end connected to the outlet valve (22) and an outlet opening (21) at a lower end, wherein the outlet opening (21) points towards the upper side (11) of the carrier substrate (10) and the supply line (20) is adapted to pass the liquid (2) with a pressure higher than the atmospheric pressure through it; and (d) an expansion chamber (30) surrounding the outlet opening (21).

Surprisingly, the inventors have found that higher cooling rates can be achieved with the inventive device in comparison to the device according to EP 2 877 828 B1. FIG. 7A demonstrates that cooling rate of about −15,000 K/s (which theoretically estimates to reach water vitrifying cooling speeds of up to −200,000 K/s in aqueous samples consisting of 10 $\mu$m-15 $\mu$m thickness, such as adherent cells) was measured for a 100 $\mu$m thick aqueous sample with a thermocouple element located at the lower side of the carrier substrate and being cooled from the upper side. With the device of EP 2 877 828 B1 being adapted such that the sample is located at the lower side of the carrier substrate and being cooled from the upper side, a temperature rate of only −1,000 K/s was observed (FIG. 7B).

Moreover, ice crystals including microcrystals could not be observed in a solution of the fluorescent dye Rhodamine 6G in cell culture medium of 15 $\mu$m thickness under an inverted light microscope after the cooling process (see FIG. 18). Dehydration of the sample was also not observed.

More importantly, the inventors could demonstrate by wide-field fluorescence imaging that the morphology of EGFP expressing adhered HeLa cells was preserved during cryofixation and no ice crystals were detected inside the cells (see Examples and FIG. 17).

Further, it was shown by confocal laser scanning microscopy (CLSM) and wide-field fluorescence imaging that during cryofixation the morphology of large cell organelles, such as the endoplasmatic reticulum (ER), remain intact. To this extent, ER membranes were labelled by using MCF7 cells expressing T cell protein tyrosine phosphatase (TC-PTP) fused to fluorescent mCitrine (see FIG. 19). The high photostability of mCitrine at cryo-temperatures, also enabled the subsequent acquisition of 100 widefield fluorescence images of the same arrested cells in order to generate a super resolution radial fluctuation (SRRF) reconstruction of the ER, thereby showing that spatial localisation of fluorescent proteins was fully conserved after cryofixation with the device according to the invention.

Advantageously, the invention makes it possible to fix short-lived states in a targeted and uninfluenced manner ("cryo-arrest") and to investigate them with methods whose recording speed would otherwise be too slow for studying these states. These include, for example, many optical microscopy techniques with increased spatial and spectral resolution, such as CLSM or Stimulated Emission Depletion Microscopy (STED).

For this, the inventors focused on the proto-oncoprotein EGFR (epidermal growth factor receptor) and the functionally related tumour suppressor R-PTP-$\gamma$ (receptor-like protein tyrosine phosphatase $\gamma$), which were co-expressed as fluorescent fusion constructs (Alexa647-SNAP-EGFR and R-PTP-$\gamma$-mCitrine) in MCF7 cells. The vesicular dynamics of both fluorescent fusion proteins at room temperature could be followed by CLSM upon stimulation with epidermal growth factor (EGF, 100 ng/ml), after which cryo-arrest allowed for precise capture of the spatial patterns of both proteins in relation to one another (FIG. 20A). The absence of motional blur (FIG. 20B) and enhanced photostability of the fluorescent markers enabled colocalization analysis using SRRF reconstructions of 100 widefield fluorescence images from each channel. This cryo-arrest analysis thereby revealed the previously unknown co-organisation of EGFR and R-PTP-$\gamma$ into nanoscale clusters along the plasma membrane and in endosomes as well as their segregation upon EGF stimulus. This growth factor induced separation of EGFR nanoclusters from its inhibiting phosphatase is consistent with the system switching from a dynamically silenced to a transient active signalling state.

STED nanoscopy constitutes a special case among super-resolution techniques, since fluorescence intensity can be directly related to the density of fluorescence markers, yielding quantitative molecular patterns. In this laser scanning nanoscopy, resolution beyond the diffraction limit is achieved by stimulated emission of excited fluorophores using a second high-intensity, doughnut-shaped laser beam. The consequent high demands to photostability, fluorescence quantum yield and density of fluorescent labels hamper STED imaging of fluorescently tagged sparse molecules in live cells.

Indeed, only a low depletion laser power (<42 mW/$\mu$m$^2$) preserved enough fluorescent markers to obtain a noisy STED image of Alexa647-Snap-EGFR in MCF7 cells at room temperature (see FIGS. 21A and 21B), resulting in a statistically insignificant increase in information content beyond the diffraction limit over regular CLSM (FIGS. 21A and 21C). The resolution could be slightly improved by alleviating motional blur through chemical fixation of the cells, enabling the accumulation of photons from 5 consecutive STED frames before bleaching the sample (FIG. 21C). However, after ultra-rapid cryo-arrest of living cells, the −45-fold decreased bleaching rate (FIG. 21B) enabled a 10-fold increase of both the depletion laser power (420 mW/$\mu$m$^2$) as well as exposure time (radiation energy density: 35 mJ/$\mu$m$^2$), resulting in sharply resolved endosomal structures containing Alexa647-Snap-EGFR (FIG. 21D). Information content was significantly increased at scales <125 nm down to the digital (pixel-limited) resolution of 80 nm (FIG. 21C).

Furthermore, due to the absence of motional blur and strongly reduced photochemistry, it is possible to scan a whole cell in 3D by CLSM and subsequently record super-resolution STED images of Alexa647-Snap-EGFR in different regions at different z-levels (FIG. 21D). This enabled the identification of vesicle clusters beyond the diffraction limit that could not be resolved at room temperature. Here, the total acquisition time was >15 min, amounting to an average irradiation energy density of >20 mJ/$\mu$m$^2$ over the whole cell area, largely exceeding the lethal light dose of ~1 mJ/$\mu$m$^2$ for mammalian cell lines at positive temperatures. Thus, the inventors could demonstrate that cryofixation with the device according to the invention enables imaging of whole living cells in 3D with improved spatial and spectroscopic resolution in the absence of molecular motion with greatly extended exposure times due to reduced motion blur and strongly enhanced photostability.

Consequently, the inventive methods described herein enable cryofixation of dilute aqueous medium and cells without detectable ice-crystals at this resolution as fluorescent free areas in the cytoplasm of these cells (FIG. 26), even for cellular structures imaged beyond the diffraction limit by STED or SRRF. Moreover, after repeated STED scanning with maximal depletion laser intensity after which the structure and configuration of the endocytic structures was preserved, no ice-crystals were observed, thereby demonstrating that the high intensity STED illumination does not warm the biological sample enough to create ice crystals. Further, the distribution of the molecular conformations of the LIFEA2 sensor as measured by FRET-FLIM was preserved indicating that protein structure remains intact after cryo-arrest. Thus, the ultra-high speed of cryo-fixation by the methods described herein faithfully arrests a temporal state of dynamic molecular patterns in cells that can be observed at multiple resolutions.

A further important advantage of the invention is that the temperature of samples can be changed at a higher rate of tempering compared to conventional techniques and/or the samples can be monitored without bringing the sample out of its natural state, moving it or otherwise manipulating it by additives or e.g. excessively increased pressure.

Moreover, the inventors assessed functional imaging of molecular reactions in cells after ultra-rapid cryo-arrest. FLIM adds the spectroscopic dimension of nanosecond fluorescence decay kinetics to fluorescence microscopy. Molecular proximity induced excited state reactions between fluorophores (e.g. FRET) can thereby be imaged to spatially resolve macromolecular reactions, such as interactions and conformational changes. The genetically encoded biosensor LIFEA2 reports on the molecular conformation and thereby kinase activity of the cell guidance ephrin receptor type-A (EphA2) via FRET between the fluorescent proteins mCitrine and mCherry. At room temperature, receptor activation by the ligand clustered Ephrin A1 could be observed at the plasma membrane of Cos7 cells by a small (~0.2 ns) drop in average fluorescence lifetime of the FRET donor mCitrine in LIFEA2 (FIG. 22). Yet, motional blur and poor separation of the fluorescence decay profiles and derived phasors severely limited the spatial as well as fluorescence lifetime resolution on membrane structures in the cell (FIG. 22). At cryo-temperatures, however, the increased quantum yield of mCitrine resulted in a largely improved separation of the decay profiles, average fluorescence lifetimes (T) and associated phasors of LIFEA2 in stimulated versus unstimulated cells (FIG. 22). Clustered receptor activity could now be resolved in plasma membrane patches and endocytic structures (FIG. 22), where basal activity in absence of exogenous stimulation was likely caused by endogenous ephrin on neighbouring cells. This contrast improvement in molecular activity imaging became especially apparent when the same Ephrin A1-stimulated cell was compared before and during cryo-arrest (FIG. 22).

Under cryo-arrest, the large separation of the cumulative phasors (FIG. 24C) enables to derive the spatially invariant fluorescence lifetimes of the active (T=0.9±0.2 ns) and inactive (T=3.5±0.1 ns) conformations by global analysis as well as the fraction of LIFEA2 with non-absorbing mCherry acceptor (~0.2). Using these constrains, the spatially variant molecular fraction of active LIFEA2 (a) could be derived from the phasor in each voxel of an image. Cryo-arrest thereby enabled the acquisition (time>10 min) and reconstruction of a 3D molecular activity map of LIFEA2 in a stimulated Cos7 cell (FIG. 25), where individual vesicles with activated receptors that emerged from the plasma membrane could be distinguished from gradually inactivated receptors in the perinuclear endosomal compartments.

Thus, the inventors could show that cryofixation with the inventive device allows measuring the spatial distribution of fluorescence decay kinetics by fluorescence lifetime imaging microscopy (FLIM) with greatly improved resolution, thereby enabling an unpreceded mapping of the reaction state of fluorescently tagged molecules, preferably genetically encoded one or two component fluorescent protein containing indicators. An example is given for the genetically encoded conformational FRET sensor LIFEA2, with which the active state of the EphA2 receptor can be precisely measured in the numerous individual endosomes and endomembrane structures in the cell (FIG. 25).

Thus, a further aspect of the present invention is directed to a method of fluorescence microscopy comprising the following steps:

(a) providing a sample (1) containing fluorescent molecules on the lower side (12) of a carrier substrate (10) at atmospheric pressure;

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased;

(d) illuminating the sample (1) by laser light; and (e) detecting the fluorescence produced by the sample (1).

Thus, a further aspect of the present invention is directed to a method for performing optical microscopy with stimulated emission depletion of a cryo-arrested sample (1), comprising (a) providing a sample (1) containing fluorescent molecules on the lower side (12) of a carrier substrate (10) at atmospheric pressure;

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased;

(d1) illuminating the sample (1) by a first pulsed laser beam to excite the fluorescent molecules for fluorescence in the sample (1), wherein the first pulsed laser beam is focused on at least one focal area;

(d2) illuminating the sample (1) by a second torus-shaped laser beam to de-excite the fluorescent molecules in the sample (1), wherein the second laser beam comprises an intensity zero point in the at least one focal area;

(e) detecting the fluorescence produced by the sample (1); and (f) optionally repeating steps d1, d2 and e at different positions of the focal area of the first pulsed laser beam and at different positions of the intensity zero point of the second torus-shaped laser beam.

Thus, a further aspect of the present invention is directed to a method for performing fluorescence-lifetime imaging microscopy with time-correlated single-photon counting of a cryo-arrested sample (1), comprising (a) providing a sample (1) containing fluorescent molecules on the lower side (12) of a carrier substrate (10) at atmospheric pressure;

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased;

(d) periodically exciting the fluorescent molecules to emit fluorescence photons by illuminating the sample with a pulsed laser beam;

(e) detecting the fluorescence photons produced by the sample (1); and (f) determining the fluorescence-lifetime from the detected fluorescence photons.

Therefore, in all embodiments disclosed herein, the sentence >>a method for decreasing temperature of a sample (1) for inverse microscopy<< can be replaced by the sentence >>a method for decreasing temperature of a living sample (1) for inverse microscopy<< or can more precisely be replaced by >>a method for decreasing temperature of living cells (1) for inverse microscopy<<.

Accordingly, the sentence >>a device (100) for controlling the temperature of a sample (1)<< can be replaced by the sentence >>a device (100) for controlling the temperature of a living sample (1)<< or can more precisely be replaced by >>a device (100) for controlling the temperature of living cells (1)<<.

Consequently, the present application relates to a method for decreasing temperature of a living sample (1), preferably of living cells (1) for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and a helium having a pressure at least 2.5 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased.

Accordingly, the present application relates to a device (100) for controlling the temperature of a living sample (1), preferably of living cells (1), comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible.

DESCRIPTION OF THE INVENTION

The term "decreasing temperature" of the sample is generally used to describe a temperature change depending on the temperature difference between the tempering liquid and the carrier substrate with the sample, which comprises a temperature reduction (cooling).

Accordingly, the tempering liquid is called a cooling medium or cryogen. If the carrier substrate with the sample is arranged at a temperature above the freezing point of water, the use of the cooling medium causes the sample to change to the solid state. The transition to the solid state is also referred to here as freezing of the sample.

The term "point spread function" (PSF) describes the spreading of an infinitesimal small point source by the impulse response of a focused optical system. It is equivalent to the optical transfer function of an imaging system. The obtained image of an object in an optical system is the convolution of the object with the PSF.

The term "localization precision" describes the deviation in the detected position of a single object or point source in an optical system, as described by the variance or the standard deviation.

The term "resolution" is defined as the smallest distance at which two objects or point sources can be distinguished in an optical system. This can be defined for example by the Rayleigh criterion.

The term "cryofixation" as used herein refers to (nearly) instantaneous (rapidly or explosively) freezing of a sample, wherein molecular motion within the sample stops and water molecules contained in the sample are not able to form a hydrogen bond network of crystalline ice anymore. The resulting amorphous ice, called "vitreous ice", remains in a disordered, liquid-water-like arrangement that does not perturb the native structure of the sample. Thus, cryofixation avoids the growth of ice crystals and/or only leads to the formation of nanodisperse ice (vitrification), which does not affect the structure of the sample. Nanodisperse ice comprises ice particles that are smaller than 100 nm, in particular smaller than 10 nm, e.g. smaller than 5 nm.

In case of living cells, cryofixation can in principle preserve the cells so well that many continue living if later thawed with the appropriate speed. Therefore, this process can be considered as a reversible process.

"Cryo-arrest" is used herein synonymously with "cryofixation".

The tempering liquid is generally a substance comprising a chemical element or a chemical compound or composition which can be provided in a liquid state in the temperature ranges of interest for cooling the sample. Preferably, the liquid comprises nitrogen. Further examples of liquids as temperature control media are hydrogen, argon, helium or methane.

"Gas" (500), as used herein, refers to a gas, which does not liquefy under the conditions present in the pressure tank (400), i.e. under higher pressures than the atmospheric pressure and at the boiling point of the tempering liquid. Further, the gas (500) is preferably inert, i.e. it does not react with or dissolve in the tempering liquid or does not react with the pressure tank or other components of the device (100). The gas serves as a pressure means, i.e. it is used to build up a pressure in the pressure tank. To this extent, the gas must be compressible. Preferably, the gas comprises or consists of helium or hydrogen.

"Upper side" (11) of the carrier substrate (10), as used herein, refers to the side of the carrier substrate (10) being directed towards the outlet opening (21) of the supply line (20), and (10), which faces upwards, i.e. opposite to the direction of the earth gravitation.

"Lower side" (12), as used herein, refers to the side of the carrier substrate (10) facing away from the outlet opening (21) of the supply line (20), and which faces downwards, i.e. in the direction of earth gravitation.

Just for clarification, the carrier substrate (10) has only one upper side and one lower side. The upper side is the opposite side of the lower side and vice versa.

"Room temperature", as used herein, refers to temperatures greater than 4° C., preferably from 15-40° C. 15° C. to 30° C. and 15° C. to 24° C. and 16° C. to 21° C. Such temperatures include 14° C., 15° C., 16° C., 17° C., 18° C., 19° C., 20° C., and 21° C.

"Positive Celsius temperatures", as used herein, refers to temperatures above the melting point of water, i.e. temperatures greater than 0° C. Such temperatures include exemplarily 14 C, 15° C., 16° C., 17° C., 18 C, 19° C., 20° C., 21° C., 22 C, 23° C., 25° C., 30° C., 35° C., 37° C. and 40° C.

"Inverse microscopy" as used herein, refers to any type microscopy in which the objectives of the microscope are located under the stage, pointing up and thereby observing the sample from below. The sample may be located at the bottom of a vessel having highest optical features or adhered to the lower side of a carrier substrate. Therefore, inverse microscopy includes, but is not restricted to, confocal microscopy, (multi-modal) epifluorescence microscopy, wide-field fluorescence microscopy, super-resolution microscopy, like single molecule localization microscopy, stimulated emission depletion microscopy (STED), fluorescence-lifetime imaging microscopy with time-correlated single-photon counting, electron microscopy.

"Critical temperature" as used herein, refers to the temperature below which a gas can be liquefied by pressure, whereas above the critical temperature this is not possible. In embodiments comprising more than one liquid (2), the critical temperature refers to the lowest critical temperature of the individual liquids.

According to the invention, the supply line (20) is adapted to conduct the tempering liquid to the carrier substrate at a pressure higher than atmospheric pressure. Furthermore, the lower side (12) of the carrier substrate is adapted to receive, accommodate or hold the sample at atmospheric pressure.

It could be found that when the pressure of the gas (500) in the pressure tank (400) is at least 50 bar, the cooling rate is limited by the thermal conductivity of the sample and no longer by the Leidenfrost phenomenon. Therefore, an embodiment of the invention is directed to a method for decreasing temperature of a sample, wherein the pressure of the gas (500) is between 50 bar to 1000 bar.

Thus, an embodiment according to the invention is related to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) at least one liquid (2) having a temperature below its critical temperature and a gas (500) having a pressure of at least 2.5 MPa; and (c) supplying the at least one liquid (2) from the pressure tank (400) to the upper side (11) of the carrier substrate (10) under pressure by opening an outlet valve (22) located at the bottom of the pressure tank (400), wherein the at least one liquid (2) is brought into contact with the upper side (11) of the carrier substrate (10), wherein the temperature of the sample (1) is decreased, preferably rapidly decreased, wherein the at least one liquid (2) is liquid nitrogen and the gas (500) is helium.

Thus, an embodiment of the invention is directed to a method for decreasing temperature of a sample, wherein the pressure of helium is between 5 MPa and 100 MPa. Thus, an embodiment according to the invention is related to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure between 5 MPa and 100 MPa; and (c) supplying the liquid nitrogen from the pressure tank (400) to the upper side (11) of the carrier substrate (10) under pressure by opening an outlet valve (22) located at the bottom of the pressure tank (400), wherein liquid nitrogen (2) is brought into contact with the upper side (11) of the carrier substrate (10), wherein the temperature of the sample (1) is decreased, preferably rapidly decreased.

In principle, any liquid or mixture of liquids, which is able to cool down a sample below the glass transition temperature of water (about −136° C.) within milliseconds, can be used as a liquid (2). However, the desired cooling rates are only achieved in the inventive methods when using liquid nitrogen.

In step b) of the inventive methods described herein, the at least one liquid (2) is preferably filled in the pressure tank (400) first and thereafter the gas (500) is added to create a high pressure in the pressure tank (400).

In step b) of the inventive methods described herein, the at least one liquid (2) can be provided in the pressure tank (400) by filling the liquid cooled to a temperature below its critical temperature, i.e. by filling a pre-cooled liquid into the pressure tank. Alternatively, the at least one liquid (2) can be filled as a gas into the pressure tank (400) and then cooled to a temperature below its critical temperature, such that the gas condenses to a liquid. Cooling of the gas within the pressure tank can be achieved for example by a cooling tank (300) surrounding the pressure tank.

Preferably, the at least one liquid (2) is liquid nitrogen. In some embodiments, the at least one liquid (2) may comprise further cooling liquids, such as liquid argon or liquid methane. Thus, an embodiment according to the invention is directed a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) at least one liquid (2) having a temperature below its critical temperature and helium having a pressure of at least 2.5 MPa; and (c) supplying the at least one liquid (2) from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased, wherein the at least one liquid (2) comprises liquid nitrogen.

In another embodiment, the method for decreasing temperature of a sample (1), preferably of a living sample (1), more preferably of living cells (1), for inverse microscopy comprises the following steps:

(a) providing a sample (1) on the lower side (12) of a carrier substrate (10) at atmospheric pressure;

(b) providing in a pressure tank (400) at least one liquid (2) having a temperature below its critical temperature and helium having a pressure of at least 2.5 MPa; and (c) supplying the at least one liquid (2) from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased, wherein the at least one liquid (2) comprises a mixture of (i) liquid nitrogen and liquid argon, or (ii) liquid nitrogen and liquid methane, or (iii) liquid nitrogen, liquid argon and liquid methane.

In another embodiment, the method for decreasing temperature of a sample (1), preferably of a living sample (1), more preferably of living cells (1), for inverse microscopy comprises the following steps:

(a) providing a sample (1) on the lower side (12) of a carrier substrate (10) at atmospheric pressure;

(b) providing in a pressure tank (400) at least one liquid (2) having a temperature below its critical temperature and helium having a pressure between 5 MPa and 100 MPa; and (c) supplying the at least one liquid (2) from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased, wherein the at least one liquid (2) comprises a mixture of (i) liquid nitrogen and liquid argon, or (ii) liquid nitrogen and liquid methane, or (iii) liquid nitrogen, liquid argon and liquid methane.

In a preferred embodiment, the method for decreasing temperature of a sample (1) for inverse microscopy comprises the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased and without formation of ice crystals within the sample (1) or without formation of ice crystals larger than 80 nm in diameter or without formation of ice crystals larger than 10 nm in diameter within the sample (1).

In a preferred embodiment, the method for decreasing temperature of a sample (1) for inverse microscopy comprises the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure between 5 MPa and 100 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased and without formation of ice crystals within the sample (1) or without formation of ice crystals larger than 80 nm in diameter or without formation of ice crystals larger than 10 nm in diameter within the sample (1).

The temperature of the at least one liquid (2) used in the inventive method is at least 5° C., and preferably 10° C. or more below the critical temperature of said liquid. Therefore, an embodiment according to the invention is related to a method for decreasing temperature of a sample, wherein the temperature of the at least one liquid (2) is at least 10° C. below its critical temperature.

Thus, an embodiment according to the invention is directed a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400), at least one liquid (2) having a temperature of at least 10° C. below its critical temperature and a gas (500) having a pressure of at least 2.5 MPa; and (c) supplying the at least one liquid (2) from the pressure tank (400) to the upper side (11) of the carrier substrate (10) under pressure by opening an outlet valve (22) located at the bottom of the pressure tank (400), wherein the at least one liquid (2) is brought into contact with the upper side (11) of the carrier substrate (10), wherein the temperature of the sample (1) is decreased, preferably rapidly decreased wherein the at least one liquid (2) is liquid nitrogen and the gas (500) is helium.

In a further embodiment, the method for decreasing temperature of a sample (1), preferably of a living sample (1), more preferably of living cells (1), for inverse microscopy comprises the following steps:

(a) providing a sample (1) on the lower side (12) of a carrier substrate (10) at atmospheric pressure;

(b) providing in a pressure tank (400), liquid nitrogen having a temperature of at least 10° C. below its critical temperature and helium having a pressure between 5 MPa and 100 MPa; and (c) supplying the at least one liquid (2) from the pressure tank (400) to the upper side (11) of the carrier substrate (10) under pressure by opening an outlet valve (22) located at the bottom of the pressure tank (400), wherein the at least one liquid (2) is brought into contact with the upper side (11) of the carrier substrate (10), wherein the temperature of the sample (1) is decreased, preferably rapidly decreased.

In principle, any gas (500), such as helium or hydrogen, can be used in the inventive methods described herein, which is a compressible gas, which does not liquefy under the conditions present in the pressure tank and which does not react with or dissolves in the liquid. However, the desired cooling rates were achieved when helium is used as gas (500).

In one embodiment, a mixture of gases (500) is used in the inventive method. A mixture of gases may be advantageous for adjusting the pressure inside the pressure tank (500). Thus, an embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and a mixture of gases (500) having a pressure of at least 2.5 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased wherein the mixture of gases (500) comprises helium.

A further embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and a mixture of gases (500) having a pressure of at least 2.5 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased wherein the mixture of gases (500) comprises helium and hydrogen.

Also, an embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and a mixture of gases (500) having a pressure between 2.5 MPa and 1000 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased, wherein the mixture of gases (500) comprises helium.

Also, an embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and a mixture of gases (500) having a pressure of at least 2.5 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased and without formation of ice crystals within the sample (1) or without formation of ice crystals larger than 80 nm in diameter or without formation of ice crystals larger than 10 nm in diameter within the sample (1).

"Sample", as used herein, refers to any specimen, which is to be cryofixed or cryoarrested and analyzed by an inventive method and by using an inventive device. In general, each kind of sample can be cooled down. The sample generally comprises a variable liquid composition of substances, such as soft matter, materials, chemical reaction partners or particularly preferred biological materials.

The sample may comprise a chemical molecular system, like (polymeric) materials or biopolymers, such as aqueous solutions of peptides, proteins, oligonucleotides, saccharides; or biochemical system. Said systems may be in a native uninfluenced state, in a modified state, in an excited state, in a non-equilibrium state or in an equilibrium state. The sample may also be a biological sample, like (mammalian) cell, tissue, body fluid (blood, serum, plasma etc). Preferably, the sample comprises living biological material and more preferably living cells, living biological cells or living cell components. The cells form an adherent cell culture, preferably in the form of a cell monolayer, on the lower side (12) of the carrier substrate. If the sample consists of a very thin layer between the carrier substrate and the observation window, adherence is not absolutely necessary.

According to the invention, the sample is prepared at normal pressure (atmospheric pressure) and tempered (frozen or thawed). Therefore, an embodiment according to the invention is related to a method for decreasing temperature of a sample, wherein the sample (1) comprises biological cells, preferably living biological cells. Thus, an embodiment according to the invention is directed a method for decreasing temperature of a sample (1), preferably of a living sample (1), more preferably of living cells (1), for inverse microscopy comprising the following steps:

(a) providing biological cells (1), preferably living biological cells (1) on the lower side (12) of a carrier substrate (10) at atmospheric pressure;

(b) providing in a pressure tank (400) at least one liquid (2) having a temperature below its critical temperature and a gas (500) having a pressure of at least 2.5 MPa; and (c) supplying the at least one liquid (2) from the pressure tank (400) to the upper side (11) of the carrier substrate (10) under pressure by opening an outlet valve (22) located at the bottom of the pressure tank (400), wherein the at least one liquid (2) is brought into contact with the upper side (11) of the carrier substrate (10), wherein the temperature of the biological cells (1), preferably living biological cells (1) is decreased, preferably rapidly decreased wherein the at least one liquid (2) is nitrogen and the gas (500) is helium.

A further embodiment according to the invention is directed a method for decreasing temperature of a sample (1), preferably of a living sample (1), more preferably of living cells (1), for inverse microscopy comprising the following steps:

(a) providing biological cells (1), preferably living biological cells (1) on the lower side (12) of a carrier substrate (10) at atmospheric pressure;

(b) providing in a pressure tank (400) liquid nitrogen having a temperature below its critical temperature and helium having a pressure between 2.5 MPa and 1000 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the biological cells (1), preferably living biological cells (1) is decreased, preferably rapidly decreased.

A further embodiment according to the invention is directed a method for decreasing temperature of a sample (1), preferably of a living sample (1), more preferably of living cells (1), for inverse microscopy comprising the following steps:

(a) providing biological cells (1), preferably living biological cells (1) on the lower side (12) of a carrier substrate (10) at atmospheric pressure;

(b) providing in a pressure tank (400) liquid nitrogen having a temperature below its critical temperature and helium having a pressure between 2.5 MPa and 1000 MPa; and (c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the biological cells (1), preferably living biological cells (1) is decreased, preferably rapidly decreased without formation of ice crystals within biological cells (1) or without formation of ice crystals larger than 80 nm in diameter or without formation of ice crystals larger than 10 nm in diameter within the biological cells (1).

According to the invention, the liquid (2) is brought into contact with the carrier substrate (10). In order to achieve a sudden temperature change, the liquid is released from the pressure tank (400) under pressure. A flow of the liquid to the upper side of the carrier substrate is formed. The flow can be realized with a defined starting time and a predetermined flow velocity. The flow rate is chosen depending on the liquid's properties (e.g. viscosity) and the desired temperatures.

Advantageously, there are various ways of directing the flow of the tempering liquid relative to the upper side of the carrier substrate. The flow can be oriented by the design of the supply line (20) and its outlet opening (21). According to a first variant, a flow direction parallel to the surface normal of the upper side of the carrier substrate is provided. The tempering liquid flows vertically onto the upper side and then laterally away from the carrier substrate. In this case, there may be advantages for a particularly efficient heat transfer. Alternatively, a second variant provides for a flow direction perpendicular to the surface normal of the upper side of the carrier substrate. The tempering liquid flows parallel over the upper side past the carrier substrate. In this case, advantages can result from a low flow resistance.

In a preferred embodiment, the flow is oriented parallel to the surface normal of the upper side of the carrier substrate, so that the liquid flows in direction of gravitational force, thereby increasing the flow velocity to a certain extend.

According to the invention, a sudden temperature decrease is realized. The term "abrupt temperature decrease" (or: sudden temperature decrease, immediate temperature decrease, instantaneous temperature decrease, rapid temperature decrease or explosive temperature decrease) is used to describe a decrease in the sample temperature from an initial temperature (start temperature) to an end temperature (target temperature) at a speed (cooling rate, tempering rate) compared to which the speed of molecular processes in the sample (e.g. ice crystal formation or denaturation of biological molecules or biological systems) is lower or negligible.

Consequently, the methods disclosed herein are able to decrease the temperature of a sample (1) in a way (i.e. very rapidly or explosively) that no ice crystals within the sample (1) are formed or that no ice crystals larger than 10 nm in diameter within the sample (1) are formed or that no ice crystals larger than 80 nm in diameter within the sample (1) are formed or that biological molecules or biological systems such as cells are not denatured.

For investigation of samples, particularly biological samples, it may be desired to keep the sample constantly at a low temperature after the rapid (or explosive) cooling of step (c) in order to avoid ice crystal formation. To this extent, the at least one liquid (2) (liquid nitrogen) may be passed permanently over the upper side (11) of the carrier substrate (10). Therefore, an embodiment according to the invention is related to a method for decreasing temperature of a sample comprising additional step (d):

(d) tempering the sample (1) on the lower side (12) of the carrier substrate (10) by passing the at least one liquid over the upper side (11) of the carrier substrate (10).

Thus, an embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) at least one liquid (2) having a temperature below its critical temperature and a gas (500) having a pressure of at least 2.5 MPa;

(c) supplying the at least one liquid (2) from the pressure tank (400) to the upper side (11) of the carrier substrate (10) under pressure by opening an outlet valve (22) located at the bottom of the pressure tank (400), wherein the at least one liquid (2) is brought into contact with the upper side (11) of the carrier substrate (10), wherein the temperature of the sample (1) is decreased, preferably rapidly decreased; and (d) tempering the sample (1) on the lower side (12) of the carrier substrate (10) by passing the at least one liquid over the upper side (11) of the carrier substrate (10), wherein the at least one liquid (2) is liquid nitrogen and the gas (500) is helium.

A further embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure between 5 MPa and 100 MPa;

(c) supplying the liquid nitrogen from the pressure tank (400) to the upper side (11) of the carrier substrate (10)

under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased; and (d) tempering the sample (1) on the lower side (12) of the carrier substrate (10) by passing the liquid nitrogen over the upper side (11) of the carrier substrate (10).

A preferred embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased and without formation of ice crystals within the sample (1) or without formation of ice crystals larger than 10 nm in diameter within the sample (1) or without formation of ice crystals larger than 80 nm in diameter within the sample (1); and (d) tempering the sample (1) on the lower side (12) of the carrier substrate (10) by passing the liquid nitrogen over the upper side (11) of the carrier substrate (10).

A preferred embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased and without formation of ice crystals within the sample (1) or without formation of ice crystals larger than 10 nm in diameter within the sample (1) or without formation of ice crystals larger than 80 nm in diameter within the sample (1); and (d) tempering the sample (1) without ice crystal formation within the sample (1) on the lower side (12) of the carrier substrate (10) by passing the liquid nitrogen over the upper side (11) of the carrier substrate (10).

The tempering liquid used in step (d) may be the same liquid as in step (b). The tempering liquid may have the same or a different temperature below its critical temperature. Alternatively, the tempering liquid used in step (d) may be a different liquid as used in step (b), having the same temperature or a different temperature below its critical temperature.

Thus, an embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) a first liquid (2) having a temperature below its critical temperature and a gas (500) having a pressure of at least 2.5 MPa;

(c) supplying the first liquid (2) from the pressure tank (400) to the upper side (11) of the carrier substrate (10) under pressure by opening an outlet valve (22) located at the bottom of the pressure tank (400), wherein the at least one liquid (2) is brought into contact with the upper side (11) of the carrier substrate (10), wherein the temperature of the sample (1) is decreased, preferably rapidly decreased; and (d) tempering the sample (1) on the lower side (12) of the carrier substrate (10) by passing a second liquid over the upper side (11) of the carrier substrate (10), wherein the first liquid (2) is liquid nitrogen and the gas (500) is helium.

Reworded, an embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased; and (d) tempering the sample (1) on the lower side (12) of the carrier substrate (10) by passing a further liquid over the upper side (11) of the carrier substrate (10).

Reworded, an embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure between 5 MPa and 100 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased; and (d) tempering the sample (1) on the lower side (12) of the carrier substrate (10) by passing a further liquid over the upper side (11) of the carrier substrate (10).

Reworded, an embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased and without formation of ice crystals within the sample (1) or without formation of ice crystals larger than 10 nm in diameter within the sample (1) or without formation of ice crystals larger than 80 nm in diameter within the sample; and (d) tempering the sample (1) on the lower side (12) of the carrier substrate (10) by passing a further liquid over the upper side (11) of the carrier substrate (10).

Thus, an embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) liquid nitrogen having a temperature $T_1$ and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased; and (d) tempering the sample (1) on the lower side (12) of the carrier substrate (10) by passing a further liquid having a temperature $T_2$ over the upper side (11) of the carrier substrate (10), wherein the temperature $T_1$ is below the critical temperature of liquid nitrogen and optionally the temperature $T_2$ is lower than the critical temperature of the further liquid.

In a preferred embodiment, $T_1$ and $T_2$ do not differ by more than 10 K in order to avoid drastic temperature changes of the sample. Preferably, $T_1$ and $T_2$ are identical or nearly identical, i.e. $T_1$ and $T_2$ do not differ by more than 5 K.

Thus, an embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased; and (d) tempering the sample (1) on the lower side (12) of the carrier substrate (10) by passing the liquid nitrogen over the upper side (11) of the carrier substrate (10).

The tempering liquid used in step (d) may be supplied from the pressure tank (400) or via a separate line connected to the supply line.

To maintain sufficient cooling of the sample over a prolonged time, in step (d) of the inventive method the tempering liquid is passed over the upper side of the carrier substrate with a pressure higher than atmospheric pressure. Preferably, the pressure lies between 0.1 MPa and 1.5 MPa, more preferably between 0.2 MPa and 1 MPa, and most preferably between 0.5 MPa and 1 MPa. Thus, an embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased; and (d) tempering the sample (1) on the lower side (12) of the carrier substrate (10) by passing the liquid nitrogen over the upper side (11) of the carrier substrate (10) with a pressure higher than the atmospheric pressure.

Also, an embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure between 5 MPa and 100 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased; and (d) tempering the sample (1) on the lower side (12) of the carrier substrate (10) by passing the liquid nitrogen over the upper side (11) of the carrier substrate (10) with a pressure between 0.5 MPa and 1 MPa.

Thus, a further embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased and without formation of ice crystals within the sample (1) or without formation of ice crystals larger than 10 nm in diameter within the sample (1) or without formation of ice crystals larger than 80 nm in diameter within the sample (1); and (d) tempering the sample (1) on the lower side (12) of the carrier substrate (10) by passing the liquid nitrogen over the upper side (11) of the carrier substrate (10) with a pressure higher than the atmospheric pressure.

Also, an embodiment of the invention is directed to a method for decreasing temperature of a sample (1), preferably of a living sample (1), more preferably of living cells (1), for inverse microscopy comprising the following steps:

(a) providing a sample (1) on the lower side (12) of a carrier substrate (10) at atmospheric pressure;

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased; and (d) tempering the sample (1) on the lower side (12) of the carrier substrate (10) by passing the liquid nitrogen over the upper side (11) of the carrier substrate (10) with a pressure higher than the atmospheric pressure.

Device

The present invention is directed to a device (100) for decreasing the temperature of a sample (1) in a way (i.e. very rapidly or explosively) that no ice crystals within the sample (1) are formed or that no ice crystals larger than 10 nm in diameter within the sample (1) are formed or that no ice crystals larger than 80 nm in diameter within the sample (1) are formed or that biological molecules or biological systems such as cells are not denatured, the device (100) comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible.

In other words, the present invention is also directed to a device (100) for controlling the temperature of a sample (1), comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is connected to the upper side (11) of the carrier substrate (10), to keep the supply line (20) as short as possible.

Also, the present invention is directed to a device (100) for controlling the temperature of a sample (1), comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is directly mounted to the upper side (11) of the carrier substrate (10), to keep the supply line (20) as short as possible.

Also, the present invention is directed to a device (100) for controlling the temperature of a sample (1), comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is directly connected to the upper side (11) of the carrier substrate (10), to keep the supply line (20) as short as possible.

More precisely, the present invention is also directed to a device (100) for controlling the temperature of a sample (1), comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the bottom of the pressure tank (400) is mounted to the upper side (11) of the carrier substrate (10), to keep the supply line (20) as short as possible.

Reworded, the present invention is also directed to a device (100) for controlling the temperature of a sample (1), comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the bottom of the pressure tank (400) is directly mounted to the upper side (11) of the carrier substrate (10), to keep the supply line (20) as short as possible.

Supply Line

The supply line (20) is connected with its upper end to the outlet valve (22) of the pressure tank (400). At its lower end, the supply line comprises an outlet opening (21) for releasing the at least one liquid (2), such as depicted in FIG. 2. The supply line (20) is positioned between the pressure tank (400) and the upper side (11) of the carrier substrate, thereby allowing to supply the at least one liquid (2) (and optionally the gas (500)) to the upper side (11) of the carrier substrate.

The supply line (20) is preferably as short as possible in order to reduce undesired temperature changes of the at least one liquid (2), which may result in a lower cooling rate of the sample. On the other hand, the supply line should be long enough, so that the outlet opening (21) is positioned optimal for supply of the liquid to the upper side of the carrier substrate, i.e. the released liquid (2) should get in contact with the upper side of the carrier substrate directly and not with other components of the device, as shown in FIG. 3.

In order to minimize warming of the cooling liquid (2) in the supply line (20), the supply line (20) may be insulated. In principle, the supply line may be insulated with any suitable inert polymer material from the inside, such as low density polyethylene (LDPE), high density polyethylene (HDPE), polypropylene, polysulfone, polycarbonate, polyethylene terephthalate, polyimide, polytetrafluoroethylene (PTFE) or polyurethane. The inventors have found that high density polyethylene is the most stable and long-lasting insulator under the low temperature and high pressure. Thus, most preferably, the supply line is insulated with high density polyethylene from the inside.

The supply line (20) can have any form, such as a cylindrical shape or a funnel shape. Funnel shape means herein that the diameter of an upper part of the supply line is larger than the diameter of a lower part of the supply line, particularly, the diameter of an upper part of the supply line is larger than the diameter of the outlet opening (21) of the supply line. Preferably, the supply line (20) is funnel-shaped at its lower end (outlet opening (21)), as depicted in FIGS. 3C and 3D.

Therefore, an embodiment according to the invention is directed to a device (100) for decreasing temperature of a sample for inverse microscopy, wherein the supply line (20) is funnel-shaped.

Hence, an embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a funnel-shaped supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible.

A further embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a funnel-shaped supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is directly mounted to the upper side (11) of the carrier substrate (10), to keep the supply line (20) as short as possible.

A further embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a funnel-shaped supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible and wherein the supply line (20) is insulated from the inside, preferably with high density polyethylene.

Preferably, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it, and the supply line (20) is funnel-shaped at its lower end; and (d) an expansion chamber (30) surrounding the upper side (11) of the carrier substrate (10), wherein the pressure tank (400) is mounted to the upper side (11) of the carrier substrate (10), to keep the supply line (20) as short as possible.

Preferably, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it, and the supply line (20) is funnel-shaped at its lower end; and (d) an expansion chamber (30) surrounding the upper side (11) of the carrier substrate (10), wherein the pressure tank (400) is directly mounted to the upper side (11) of the carrier substrate (10), to keep the supply line (20) as short as possible.

Preferably, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it, and the supply line (20) is funnel-shaped at its lower end; and (d) an expansion chamber (30) surrounding the upper side (11) of the carrier substrate (10), wherein the pressure tank (400) is mounted to the upper side (11) of the carrier substrate (10), to keep the supply line (20) as short as possible and wherein the supply line (20) is insulated from the inside, preferably with high density polyethylene.

Further, the supply line (20) of the inventive device (100) described herein is adapted to pass the liquid (2) with a pressure higher than the atmospheric pressure through it. Thus, the supply line is made of a material which remains mechanically stable at the temperature of the liquid (2) and which does not deform when the liquid is passed through at higher pressure.

Also, the supply line (20) is preferably straight (as shown in FIG. 3) and does nor comprise any turns, edges or windings in order to enable higher flow rates of the at least one liquid (2).

Pressure Tank (400)

The inventive device (100) contains at least one pressure tank (400). The pressure tank (400) of the device (100) is preferably a pressure vessel, which is adapted to receive the tempering liquid (2) and the gas (500) and/or a thermally insulated storage vessel, which is adapted to receive the tempering liquid (2) and the gas (500). Since the term "fluid" comprises liquids and gases, the pressure tank (400) of the device (100) is also preferably a pressure vessel, which is adapted to receive a fluid and/or a thermally insulated storage vessel, which is adapted to receive a fluid. More preferably, the pressure tank (400) is a thermally insulated pressure vessel which is adapted to receive the tempering liquid (2) and the gas (500).

The pressure tank (400) has preferably a volume of 0.5 L to 10 L, more preferably a volume of 0.5 L to 9 L, more preferably a volume of 0.5 L to 8 L, more preferably a volume of 1 L to 7 L and most preferably a volume of 1 L to 5 L.

Thus, in one embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a volume of 1 L to 5 L;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible.

Preferably, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a volume of 1 L to 5 L;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is directly mounted to the upper side (11) of the carrier substrate (10), to keep the supply line (20) as short as possible.

Preferably, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a volume of 1 L to 5 L;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible and wherein the supply line (20) is insulated from the inside, preferably with high density polyethylene.

In a preferred embodiment the pressure tank (400) has a rounded bottom as shown in FIG. 4A. Thus, in one embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a rounded bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible.

Preferably, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a rounded bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is directly mounted to the upper side (11) of the carrier substrate (10), to keep the supply line (20) as short as possible.

Preferably, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a rounded bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible and the supply line is insulated from the inside, preferably with high density polyethylene.

In a preferred embodiment the pressure tank (400) has a funnel-shaped bottom, which is advantageous for sealing the outlet valve (22) and the connection with the supply line (20). Thus, in one embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a funnel-shaped bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible.

Preferably, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a funnel-shaped bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is directly mounted to the upper side (11) of the carrier substrate (10), to keep the supply line (20) as short as possible.

Preferably, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a funnel-shaped bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible and the supply line is insulated from the inside, preferably with high density polyethylene.

In a preferred embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a funnel-shaped bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and the supply line (20) is funnel-shaped at its lower end; and (d) an expansion chamber (30) surrounding the upper side (11) of the carrier substrate (10), wherein the pressure tank (400) is mounted to the upper side (11) of the carrier substrate (10), to keep the supply line (20) as short as possible.

Cooling Tank (300) The device (100) preferably further comprises at least one cooling tank (300) for cooling or tempering the at least one liquid (2) in the pressure tank (400). The cooling tank (300) of the inventive device (100) is preferably a tank made of stainless steel, but can also be made of other materials as well. The cooling tank (300) has preferably an opening at the top for conveniently supplying a cooling medium. The cooling tank (300) therefore surrounds the pressure tank (400) for cooling the liquid.

Thus, in one embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (e) a cooling tank (300) for cooling the liquid (2), wherein the pressure tank (400) is mounted to the upper side (11) of the carrier substrate (10), to keep the supply line (20) as short as possible.

In a preferred embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (e) a cooling tank (300) for cooling the liquid (2), wherein the pressure tank (400) is directly mounted to the upper side (11) of the carrier substrate (10), to keep the supply line (20) as short as possible.

In a further embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (e) a cooling tank (300) for cooling the liquid (2), wherein the pressure tank (400) is mounted to the upper side (11) of the carrier substrate (10), to keep the supply line (20) as short as possible and the supply line is insulated from the inside, preferably with high density polyethylene.

In a preferred embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (e) a cooling tank (300) for cooling the liquid (2), wherein the cooling tank (300) surrounds the pressure tank (400).

In a preferred embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (e) a cooling tank (300) for cooling the liquid (2), wherein the cooling tank (300) surrounds the pressure tank (400), wherein the pressure tank (400) is directly mounted to the upper side (11) of the carrier substrate (10), to keep the supply line (20) as short as possible.

In a further embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (e) a cooling tank (300) for cooling the liquid (2), wherein the cooling tank (300) surrounds the pressure tank (400), wherein the pressure tank (400) is mounted to the upper side (11) of the carrier substrate (10), to keep the supply line (20) as short as possible and the supply line is insulated from the inside, preferably with high density polyethylene.

Cooling of the liquid (2) in the pressure tank (400) is achieved by heat exchange with a cooling medium that is contained in the cooling tank (300). To this extent, the cooling medium has a temperature below the critical temperature of the liquid (2). The cooling medium can be the same substance as the liquid (2), for example liquid nitrogen. Thus, in one embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (e) a cooling tank (300) for cooling the liquid (2), wherein the cooling tank (300) is adapted for receiving a cooling medium, wherein the pressure tank (400) is mounted to the upper side (11) of the carrier substrate (10), to keep the supply line (20) as short as possible.

In a preferred embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (e) a cooling tank (300) for cooling the liquid (2), wherein the cooling tank (300) and the pressure tank (400) are thermally not insulated and wherein the pressure tank (400) is mounted to the upper side (11) of the carrier substrate (10), to keep the supply line (20) as short as possible.

In a preferred embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a funnel-shaped bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and the supply line (20) is funnel-shaped at its lower end;

(d) an expansion chamber (30) surrounding the upper side (11) of the carrier substrate (10), and (e) a cooling tank (300) for cooling the liquid (2), wherein the pressure tank (400) is mounted to the upper side (11) of the carrier substrate (10), to keep the supply line (20) as short as possible.

In a preferred embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a funnel-shaped bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and the supply line (20) is funnel-shaped at its lower end;

(d) an expansion chamber (30) surrounding the upper side (11) of the carrier substrate (10), and (e) a cooling tank (300) for cooling the liquid (2), wherein the pressure tank (400) is directly mounted to the upper side (11) of the carrier substrate (10), to keep the supply line (20) as short as possible.

In a preferred embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a funnel-shaped bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and the supply line (20) is funnel-shaped at its lower end;

(d) an expansion chamber (30) surrounding the upper side (11) of the carrier substrate (10), and (e) a cooling tank (300) for cooling the liquid (2), wherein the pressure tank (400) is mounted to the upper side (11) of the carrier substrate (10), to keep the supply line (20) as short as possible and the supply line is insulated from the inside, preferably with high density polyethylene.

Outlet Valve

According to the invention, the supply of the tempering liquid to the upper side of the carrier substrate is activated (started) by an outlet valve, e.g. an electrically or pneumatically valve, in the supply line (20) of the tempering liquid. The control element for opening and closing the outlet valve is arranged separately from the heat exchanger (carrier substrate). The actuation of the final control element enables a defined temperature control start. When the outlet valve is opened, the tempering liquid hits the carrier substrate (10) with a predetermined, defined delay. This allows the fixation of selected states of the sample, which were previously identified during the observation with an inverted microscope. Therefore, the device (100) is equipped with an outlet valve (22), preferably a switchable outlet valve, more preferably a fast opening, switchable outlet valve. The switchable outlet valve (22) can be a pneumatically or electrically switchable valve and/or a fluidic rotary valve.

Thus, an embodiment according to the invention is directed to a device (100) for decreasing temperature of a sample, wherein the pressure tank (400) is equipped with a switchable outlet valve, more preferably a fast opening, switchable outlet valve. Hence, an embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible and wherein the outlet valve is a switchable outlet valve, more preferably a fast opening, switchable outlet valve.

Preferably, the device (100) for decreasing temperature of a sample, comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is directly mounted to the upper side (11) of the carrier substrate (10), to keep the supply line (20) as short as possible and wherein the outlet valve is a switchable outlet valve, more preferably a fast opening, switchable outlet valve.

Preferably, the device (100) for decreasing temperature of a sample, comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible, wherein the outlet valve is a switchable outlet valve, more preferably a fast opening, switchable outlet valve, and and the supply line is insulated from the inside, preferably with high density polyethylene.

In another embodiment according to the invention, the device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible, and wherein the outlet valve is a pneumatically or electrically switchable valve and/or a fluidic rotary valve.

Any valve is suitable for the inventive device (100) and methods disclosed herein, provided that the valve is able to open a large cross-section very fast (switchable), i.e. within a few milliseconds, at −196° C. and at least 50 bars. The outlet valve (22) can be an electrically or pneumatically switchable valve. Preferably, the outlet valve (22) is a pneumatically switchable valve. The switchable outlet valve (22) can be composed of a lifting cylinder (200), a piston (501) and a piston tip (510), as shown in FIG. 5. The piston tip is preferably composed of high density polyethylene (HDPE).

In addition, the switchable outlet valve (22) can further comprise a piston guide (520). Preferably, the switchable outlet valve (22) is a pneumatically switchable valve which is composed of a lifting cylinder (200), a piston (501) and a piston tip (510). In addition, the pneumatic switchable valve can further comprise a piston guide (520). This pneumatic switchable valve allows the fast opening of a large cross-section.

The piston (501) is movable. A vertically movable piston (501) is inserted into a pressure tank (400) via a sealed piston guide (520). The piston tip (510) is designed in such a way that it seals the bottom of the pressure tank (400). The piston can be regulated by a pneumatically driven lifting cylinder (200), thereby serving as an outlet valve for the pressure tank (400). The pressure tank (400) can be filled with liquids and gases through tubes which are screwed into threaded bores. Gases may be cooled and condense due to the cooling of the pressure tank (400) by the surrounding cooling tank (300).

It is advantageous if the piston (501) is moved abruptly, i.e. within a few microseconds, in order to achieve a high cooling capacity immediately.

Therefore, a preferred embodiment according to the invention is directed to a device (100) for decreasing temperature of a sample, wherein the pressure tank (400) is provided with a pneumatic switchable valve comprising a lifting cylinder (200), a piston (501), and a piston tip (510). Hence, a preferred embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible, wherein the outlet valve (22) is a pneumatic switchable valve comprising a lifting cylinder (200), a piston (501), and a piston tip (510).

Preferably, the device (100) for decreasing temperature of a sample, comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it, and (d) an expansion chamber (30) surrounding the upper side (11) of the carrier substrate (10), wherein the pressure tank (400) is directly mounted to the upper side (11) of the carrier substrate (10), to keep the supply line (20) as short as possible, and wherein the outlet valve (22) is a pneumatic switchable valve comprising a lifting cylinder (200), a piston (501), and a piston tip (510).

Preferably, the device (100) for decreasing temperature of a sample, comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible, wherein the outlet valve (22) is a pneumatic switchable valve comprising a lifting cylinder (200), a piston (501), and a piston tip (510) and the supply line is insulated from the inside, preferably with high density polyethylene.

Another preferred embodiment according to the invention is directed to a device (100) for decreasing temperature of a sample, wherein the pressure tank (400) is provided with a pneumatic switchable valve comprising a lifting cylinder (200), a piston (501), a piston tip (510), and a piston guide (520). Hence, a preferred embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible, and wherein the outlet valve (22) is a pneumatic switchable valve comprising a lifting cylinder (200), a piston (501), a piston tip (510), and a piston guide (520).

In a preferred embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a funnel-shaped bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and the supply line (20) is funnel-shaped at its lower end; and (d) an expansion chamber (30) surrounding the upper side (11) of the carrier substrate (10), (e) a cooling tank (300) for cooling the liquid (2);

wherein the pressure tank (400) is mounted to the upper side (11) of the carrier substrate (10), to keep the supply line (20) as short as possible wherein the outlet valve (22) is a pneumatic switchable valve comprising a lifting cylinder (200), a piston (501), a piston tip (510), and a piston guide (520).

Preferably, the device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22)

located at the bottom, wherein the pressure tank (400) has a funnel-shaped bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and the supply line (20) is funnel-shaped at its lower end; and (d) an expansion chamber (30) surrounding the upper side (11) of the carrier substrate (10), (e) a cooling tank (300) for cooling the liquid (2);

wherein the pressure tank (400) is directly mounted to the upper side (11) of the carrier substrate (10), to keep the supply line (20) as short as possible wherein the outlet valve (22) is a pneumatic switchable valve comprising a lifting cylinder (200), a piston (501), a piston tip (510), and a piston guide (520).

Preferably, the device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a funnel-shaped bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and the supply line (20) is funnel-shaped at its lower end; and (d) an expansion chamber (30) surrounding the upper side (11) of the carrier substrate (10), (e) a cooling tank (300) for cooling the liquid (2);

wherein the pressure tank (400) is mounted to the upper side (11) of the carrier substrate (10), to keep the supply line (20) as short as possible, wherein the outlet valve (22) is a pneumatic switchable valve comprising a lifting cylinder (200), a piston (501), a piston tip (510), and a piston guide (520) and wherein the supply line (20) is insulated from the inside, preferably with high density polyethylene.

Outlet Opening

Further advantages of the invention, in particular in the design with the expansion of the tempering medium, arise when the lower end part of the supply line (20) forming the outlet opening (21) has at least one of the following characteristics. According to a first variant, the end part can be arranged in such a way that the distance of the outlet opening (21) from the upper side (11) of the carrier substrate is variable. For example, the supply line may be movable and the end part may be adjustable relative to the carrier substrate. Alternatively or additionally, the end part can be designed so that the diameter of the outlet opening is variable. The mentioned distance and/or diameter can be selected depending on the concrete application of the invention for an optimal heat transfer and/or a predetermined temperature setting of the tempering medium. According to another, particularly preferred variant, the outlet opening (21) has the shape of a nozzle. The nozzle forms the outlet opening (21) of the supply line (20) and is shaped in such a way that the outlet opening (21) has a smaller diameter than the supply line (20) (funnel shape). In another embodiment according to the invention, the lower end part is arranged so that it can be separated from the supply line (20). For example, an exchangeable nozzle (24) can be provided. If the end part, in particular the nozzle, is coupled to the supply line via a screw connection, both interchangeability (to vary the nozzle diameter) and positionability (to vary the distance to the carrier substrate) can be advantageously simplified.

Preferably, the configuration of the outlet opening (21) has the form a nozzle. Therefore, an embodiment according to the invention is directed to a device (100) for decreasing temperature of a sample, wherein the outlet opening (21) has the configuration of a nozzle. Hence, an embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible, and wherein the outlet opening (21) has the configuration of a nozzle.

Preferably, the device (100) for decreasing temperature of a sample, comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is directly mounted to the upper side (11) of the carrier substrate (10), to keep the supply line (20) as short as possible, and wherein the outlet opening (21) has the configuration of a nozzle.

Preferably, the device (100) for decreasing temperature of a sample, comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible, and wherein the supply line (20) is insulated from the inside, preferably with high density polyethylene and wherein the outlet opening (21) has the configuration of a nozzle.

In a preferred embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a funnel-shaped bottom;

(c) a supply line (20) connecting the outlet valve (22) with the upper side (11) of the carrier substrate (10), wherein the supply line (20) is adapted to pass the liquid (2) with a pressure higher than the atmospheric pressure through it, and the supply line (20) is funnel-shaped at its lower end;

(d) an expansion chamber (30) surrounding the upper side (11) of the carrier substrate (10), and (e) a cooling tank (300) for cooling the liquid (2);

wherein the pressure tank (400) is mounted to the upper side (11) of the carrier substrate (10), to keep the supply line (20) as short as possible, wherein the outlet valve (22) is a pneumatic switchable valve comprising a lifting cylinder (200), a piston (501), a piston tip (510), and a piston guide (520), and wherein the outlet opening (21) has the configuration of a nozzle.

Preferably, the nozzle has a diameter between 1 mm and 15 mm, more preferably between 1 mm and 12 mm, more preferably between 1 mm and 10 mm, more preferably between 1 mm and 5 mm, and most preferably between 1.5 mm and 5 mm. Preferably, the nozzle has a diameter of 3 mm. Thus, an embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible, wherein the outlet opening (21) has the configuration of a nozzle, with a diameter between 1.5 mm an 5 mm.

Outlet Opening and Carrier Substrate

A further improvement of the temperature rate can be achieved by adjusting the distance between the outlet opening (21) and the upper side (11) of the carrier substrate (10). The distance can be in the range of 0.1 mm to 5 mm, preferably in the range of 0.1 mm to 3 mm, more preferably in the range of 0.5 mm to 1.5 mm, and most preferably the distance is 1 mm.

Therefore, an embodiment according to the invention is directed to a device (100) for decreasing temperature of a sample, wherein the distance between the outlet opening (21) and the upper side (11) of the carrier substrate (10) is in the range of 0.5 mm to 1.5 mm. Hence, an embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible, and wherein the distance between the outlet opening (21) and the upper side (11) of the carrier substrate (10) is in the range of 0.5 mm to 1.5 mm.

It could also be found that the ratio of the diameter of the outlet opening (21) and the diameter of the carrier substrate (10) can influence the temperature rate positively. Therefore, an embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible, and wherein the diameter of outlet opening (21) is smaller than the diameter of the carrier substrate (10).

In a preferred embodiment, the inventive device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a funnel-shaped bottom;

(c) a supply line (20) connecting the outlet valve (22) with the upper side (11) of the carrier substrate (10), wherein the supply line (20) is adapted to pass the liquid (2) with a pressure higher than the atmospheric pressure through it, and the supply line (20) is funnel-shaped at its lower end;

(d) an expansion chamber (30) surrounding the upper side (11) of the carrier substrate (10), and (e) a cooling tank (300) for cooling the liquid (2);

wherein the pressure tank (400) is mounted to the upper side (11) of the carrier substrate (10), to keep the supply line (20) as short as possible, wherein the outlet valve (22) is a pneumatic switchable valve comprising a lifting cylinder (200), a piston (501), a piston tip (510), and a piston guide (520), wherein the outlet opening (21) has the configuration of a nozzle; and wherein the diameter of outlet opening (21) is smaller than the diameter of the carrier substrate (10).

Carrier Substrate

The carrier substrate (10) (or: cooling substrate) forms a sample holder and a heat exchanger. It is generally a plate-shaped, flat or curved component, one surface of which (here called the lower side) forms a receptacle for the sample and the other surface (here called the upper side) forms a heat exchanger surface. In the case of a self-adhesive sample, such as an adherent cell culture, the exposed surface of the lower side, which may carry a modification layer, provides the sample holder. Otherwise, e.g. for non-adherent samples, the lower side may be provided with receiving structures, e.g. to form a vessel for receiving a sample of liquid reaction partners. The top is preferably a flat surface exposed for wetting with the cooling medium. However, the upper side can also have surface structures, such as projections or depressions, with which the tempering fluid can be brought into contact.

Preferably, the tempering rate (cooling rate or heating rate) is greater than 5,000 K/s, especially greater than 20,000 K/s, e.g. greater than 50,000 K/s, or even 100,000 K/s or more. The temperature change of the sample is essentially simultaneous with the temperature change of the carrier substrate caused by the tempering fluid. For this purpose, the carrier substrate preferably comprises a material whose thermal conductivity value is selected such that the temperature of the sample is variable at a tempering rate (temperature gradient) above the limit mentioned. The thermal conductivity of the carrier substrate (10) is particularly preferred to be greater than 1,000 W/Km, especially greater than 1,500 W/Km.

The carrier substrate (10) has preferably a thickness less than 2 mm, preferably, less than 1 mm, and more preferably less than 500 μm. A fast heat transfer combined with an appropriate stability which is necessary for the high pressure applied on the carrier substrate can be achieved if the thickness is in the range of 0.1 mm to 10 mm, more preferably in the range of 0.1 mm to 2 mm, and most preferably in the range of 0.5 mm to 1.5 mm.

Therefore, an embodiment according to the invention is directed to a device (100) for decreasing temperature of a sample, wherein the carrier substrate (10) has a thickness in the range of 0.1 mm to 10 mm. Hence, an embodiment according to the invention is related to a device (100) for decreasing temperature of a sample, comprising:
(a) a carrier substrate (10) with a lower side (12) for accommodating a sample (1) and with an upper side (11), which is exposed for a supply of a liquid (2), wherein the carrier substrate (10) has a thickness in the range of 0.1 mm to 10 mm;
(b) a pressure tank (400) adapted for holding a fluid, the pressure tank (400) comprising an outlet valve (22) located at the bottom;
(c) a supply line (20) connecting the outlet valve (22) with the upper side (11) of the carrier substrate (10), wherein the supply line (20) is adapted to pass the liquid (2) with a pressure higher than the atmospheric pressure through it; and
(d) an expansion chamber (30) surrounding the upper side (11) of the carrier substrate (10), wherein the pressure tank (400) is mounted to the upper side (11) of the carrier substrate (10), to keep the supply line (20) as short as possible.

The carrier substrate (10) can be made of any material that has the desired thermal conductivity and sufficient strength at the pressure of the tempering fluid. Thus, the carrier substrate (10) acts as a heat conductor. For example, the carrier substrate can be made of copper (400 W/Km) or silver (430 W/Km). In these cases, although the thickness of the carrier substrate required for sufficient strength may have an adverse effect on the thermal conductivity value and the achievable temperature rate (tempering rate), it is important to ensure that the carrier substrate (10) is sufficiently thick. However, this is not critical if low demands are made on the tempering rate and/or if the sample is arranged even at a pressure increased relative to atmospheric pressure.

The carrier substrate comprises a diamond disc, e.g. of synthetically produced diamond with a thickness less than 2 mm, in particular less than 500 μm. The use of diamond has particular advantages with regard to optimum values of thermal conductivity (depending on manufacture, e.g. 1,500 W/Km) and strength with a low substrate thickness.

Therefore, an embodiment according to the invention is directed to a device (100) for decreasing temperature of a sample, wherein the carrier substrate (10) is diamond, in particular CVD diamond. Preferably, the CVD diamond comprises impurities of less than 6 ppb. The carrier substrate can comprise a diamond disc, e.g. of synthetically produced diamond with a thickness less than 2 mm, preferably less than 1 mm, and more preferably less than 500 μm. The use of diamond has particular advantages with regard to optimum values of thermal conductivity (depending on manufacture, e.g. 1,500 W/Km) and strength with a low substrate thickness. Particularly preferred are single crystal CVD diamonds, which exhibit a thermal conductivity of more than 2200 W/Km.

Therefore, an embodiment according to the invention is directed to a temperature control device (100) for decreasing temperature of a sample, wherein the carrier substrate (10) is composed of CVD diamond having impurities of less than 6 ppb. Using such CVD diamond increases the thermal conductivity, and thus the temperature rate.

Hence, an embodiment according to the invention is related to a device (100) for decreasing temperature of a sample, comprising:
(a) a carrier substrate (10) with a lower side (12) for accommodating a sample (1) and with an upper side (11), which is exposed for a supply of a liquid (2), wherein the carrier substrate (10) is made of CVD diamond having impurities of less than 6 ppb;
(b) a pressure tank (400) adapted for holding a fluid, the pressure tank (400) comprising an outlet valve (22) located at the bottom;
(c) a supply line (20) connecting the outlet valve (22) with the upper side (11) of the carrier substrate (10), wherein the supply line (20) is adapted to pass the liquid (2) with a pressure higher than the atmospheric pressure through it; and
(d) an expansion chamber (30) surrounding the upper side (11) of the carrier substrate (10), wherein the pressure tank (400) is mounted to the upper side (11) of the carrier substrate (10), to keep the supply line (20) as short as possible.

Preferably, the device (100) for decreasing temperature of a sample, comprises:
(a) a carrier substrate (10) with a lower side (12) for accommodating a sample (1) and with an upper side (11), which is exposed for a supply of a liquid (2), wherein the carrier substrate (10) is made of CVD diamond having impurities of less than 6 ppb;

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is directly mounted to the upper side (11) of the carrier substrate (10), to keep the supply line (20) as short as possible.

Preferably, the device (100) for decreasing temperature of a sample, comprises:

(a) a carrier substrate (10) with a lower side (12) for accommodating a sample (1) and with an upper side (11), which is exposed for a supply of a liquid (2), wherein the carrier substrate (10) is made of CVD diamond having impurities of less than 6 ppb;

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible and wherein the supply line (20) is insulated from the inside, preferably with high density polyethylene.

Another embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2), wherein the carrier substrate (10) is made of single crystal CVD diamond;

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible.

Further advantages of the invention result from the temperature decrease of the carrier substrate (10) from its upper side, whereby the sample can be exposed on the lower side. For example, it is possible to carry out an optical and/or electrical measurement on the sample before, during and/or after the supply of the tempering medium. A measuring device (1000) is arranged which comprises, for example, an optical microscope, a confocal microscope, an inverse confocal microscope, or an observation optical system and/or an impedance measuring device (1000), especially an inverse optical microscope, and more especially an inverse confocal microscope. With the microscope, the sample can be observed in high resolution while the sample remains in an unchanged position on the carrier substrate. The impedance measuring device may comprise measuring electrodes located on the front of the carrier substrate.

The device (100) can thus comprise a measuring device (1000). Preferably, it comprises a microscope, and more preferably an inverted microscope.

An embodiment of the invention is thus directed to a device (100) for decreasing temperature of a sample comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (f) a measuring device (1000)

wherein the pressure tank (400) is mounted to the upper side (11) of the carrier substrate (10), to keep the supply line (20) as short as possible.

Preferably, the device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (f) a measuring device (1000)

wherein the pressure tank (400) is directly mounted to the upper side (11) of the carrier substrate (10), to keep the supply line (20) as short as possible.

Preferably, the device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (f) a measuring device (1000)

wherein the pressure tank (400) is mounted to the upper side (11) of the carrier substrate (10), to keep the supply line (20) as short as possible and wherein the supply line (20) is insulated from the inside, preferably with high density polyethylene.

In a preferred embodiment of the device (100) according to the invention, the measuring device (1000) is an inverted microscope. Thus, another aspect of the invention is directed to an inverted cryomicroscope (2000) comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (f) a measuring device (1000)

wherein the pressure tank (400) is mounted to the upper side (11) of the carrier substrate (10), to keep the supply line (20) as short as possible.

In a preferred embodiment, the inverted cryomicroscope (2000) comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a funnel-shaped bottom;

(c) a supply line (20) having an upper end connected to the outlet valve (22) and an outlet opening (21) at a lower end, wherein the outlet opening (21) points towards the upper side (11) of the carrier substrate (10), the supply line (20) is adapted to pass the liquid (2) with a pressure higher than the atmospheric pressure through it, and the supply line (20) is funnel-shaped at its lower end;

(d) an expansion chamber (30) surrounding the outlet opening (21);

(c) a supply line (20) connecting the outlet valve (22) with the upper side (11) of the carrier substrate (10), wherein the supply line (20) is adapted to pass the liquid (2) with a pressure higher than the atmospheric pressure through it and the supply line (20) is funnel-shaped at its lower end;

(d) an expansion chamber (30) surrounding the upper side (11) of the carrier substrate (10), (e) a cooling tank (300) for cooling the liquid (2); and (f) a measuring device (1000)

wherein the pressure tank (400) is mounted to the upper side (11) of the carrier substrate (10), to keep the supply line (20) as short as possible, wherein the outlet valve (22) is a pneumatic switchable valve comprising a lifting cylinder (200), a piston (501), a piston tip (510), and a piston guide (520), wherein the outlet opening (21) has the configuration of a nozzle; and wherein the diameter of outlet opening (21) is smaller than the diameter of the carrier substrate (10).

Sample Chamber (14)

The device can further comprise a sample chamber (14). Therefore, an embodiment according to the invention is directed to a device (100) for decreasing temperature of a sample, wherein said device further comprises a sample chamber (14). The sample chamber (14) may comprise a spacer but preferably the sample chamber (14) does not contain a spacer. Thereby, the temperature rate can further be improved remarkably, i.e. the temperature rate increases.

Hence, an embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (g) a sample chamber (14), wherein the pressure tank (400) is mounted to the upper side (11) of the carrier substrate (10), to keep the supply line (20) as short as possible.

Preferably, the device (100) for decreasing temperature of a sample, comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (g) a sample chamber (14), wherein the pressure tank (400) is directly mounted to the upper side (11) of the carrier substrate (10), to keep the supply line (20) as short as possible.

Preferably, the device (100) for decreasing temperature of a sample, comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (g) a sample chamber (14), wherein the pressure tank (400) is mounted to the upper side (11) of the carrier substrate (10), to keep the supply line (20) as short as possible and wherein the supply line (20) is insulated from the inside, preferably with high density polyethylene.

In one embodiment, the sample chamber (14) is formed by the lower side of the carrier substrate and an observation window (15), as shown in FIG. 3E. This sample chamber may comprise additional spacer or not.

A preferred embodiment according to the invention is directed to a device (100) for decreasing temperature of a sample, wherein the device contains a sample chamber (14), and the sample chamber (14) does not contain a spacer. Hence, a preferred embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (g) a sample chamber (14) wherein the sample chamber does not contain a spacer, wherein the pressure tank (400) is mounted to the upper side (11) of the carrier substrate (10), to keep the supply line (20) as short as possible.

It is still more preferred if the device according to the invention does not even contain a sample chamber (14) if the temperature rate should be further increased. Therefore, an embodiment according to the invention is directed to a device (100) for decreasing temperature of a sample, wherein said device does not contain a sample chamber (14) and does not contain a spacer.

Hence, an embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10), wherein the pressure tank (400) is mounted to the upper side (11) of the carrier substrate (10), to keep the supply line (20) as short as possible and wherein the device (100) does not contain a sample chamber (14) and a spacer.

Expansion Chamber

It could be found that the high pressure difference between the outlet opening and the expansion chamber allows a fast transport of a liquid (2) at the carrier substrate (10). The bigger the expansion chamber (30), the bigger the pressure difference between the outlet opening (21) and the expansion chamber (30), so that the transport rate of a liquid at the carrier substrate (10) can be increased.

Therefore, an embodiment according to the invention is directed to a device (100) for decreasing temperature of a sample, wherein the expansion chamber (30) has a dimension in the range of 50 $cm^3$ to 100 $cm^3$.

Hence, an embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), wherein the expansion chamber (30) has a dimension in the range of 50 $cm^3$ to 100 $cm^3$ and wherein the pressure tank (400) is mounted to the upper side (11) of the carrier substrate (10), to keep the supply line (20) as short as possible.

In order to achieve a maximum cooling rate, the carrier substrate (10) is made of CVD diamond, the dimension of the expansion chamber (30) is in the range of 50 $cm^3$ to 100 $cm^3$, the supply line (20) is funnel-shaped, the distance between the outlet opening (21) and the upper side (11) of the carrier substrate (10) is in the range of 0.5 mm to 1.5 mm.

Therefore, a preferred embodiment according to the invention is directed to a device (100) for decreasing temperature of a sample, wherein the carrier substrate (10) is made of CVD diamond, the dimension of the expansion chamber (30) is in the range of 50 $cm^3$ to 100 $cm^3$, the supply (21) is funnel-shaped, the distance between the outlet opening (21) and the front side (11) of the carrier substrate is in the range of 0.5 mm to 1.5 mm.

Hence, a preferred embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), wherein the distance between the outlet opening (21) and the front side (11) of the carrier substrate is in the range of 0.5 mm to 1.5 mm, and wherein the expansion chamber (30) has a dimension in the range of 50 $cm^3$ to 100 $cm^3$ wherein the pressure tank (400) is mounted to the upper side (11) of the carrier substrate (10), to keep the supply line (20) as short as possible.

The expansion chamber (30) of the inventive device (100) is preferably open so that a low pressure can be ensured in the chamber, when the tempering liquid is supplied. The expansion chamber may be in a housing with a gas outlet (23) as shown in FIGS. 3B, 3C and 3D. Thus, the device according to the invention can further comprise a gas outlet (23). Preferably, the gas outlet (23) is connected to an exhaust hose via a quick coupling for an exhaust hose. Preferably, the exhaust hose is connected to the housing of expansion chamber (30).

Hence, an embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an open expansion chamber (30) surrounding the upper side (11) of the carrier substrate (10), wherein the pressure tank (400) is mounted to the upper side (11) of the carrier substrate (10), to keep the supply line (20) as short as possible.

Another embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an open expansion chamber (30) surrounding the upper side (11) of the carrier substrate (10), the expansion chamber (30) comprising a gas outlet (23), wherein the pressure tank (400) is mounted to the upper side (11) of the carrier substrate (10), to keep the supply line (20) as short as possible.

Preferably, the device (100) for decreasing temperature of a sample, comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an open expansion chamber (30) surrounding the upper side (11) of the carrier substrate (10), the expansion chamber (30) comprising a gas outlet (23), wherein the pressure tank (400) is directly mounted to the upper side (11) of the carrier substrate (10), to keep the supply line (20) as short as possible.

Preferably, the device (100) for decreasing temperature of a sample, comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an open expansion chamber (30) surrounding the upper side (11) of the carrier substrate (10), the expansion chamber (30) comprising a gas outlet (23), wherein the pressure tank (400) is mounted to the upper side (11) of the carrier substrate (10), to keep the supply line (20) as short as possible and wherein the supply line (20) is insulated from the inside, preferably with high density polyethylene.

In a preferred embodiment, the inventive device (100) comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom, wherein the pressure tank (400) has a funnel-shaped bottom;

(c) a supply line (20) connecting the outlet valve (22) with the upper side (11) of the carrier substrate (10), wherein the supply line (20) is adapted to pass the liquid (2) with a pressure higher than the atmospheric pressure through it, and the supply line (20) is funnel-shaped at its lower end;

(d) an open expansion chamber (30) surrounding the upper side (11) of the carrier substrate (10), the expansion chamber (30) comprising a gas outlet (23);

(e) a cooling tank (300) for cooling the liquid (2); and wherein the pressure tank (400) is mounted to the upper side (11) of the carrier substrate (10), to keep the supply line (20) as short as possible, wherein the outlet valve (22) is a pneumatic switchable valve comprising a lifting cylinder (200), a piston (501), a piston tip (510), and a piston guide (520), wherein the outlet opening (21) has the configuration of a nozzle; and wherein the diameter of outlet opening (21) is smaller than the diameter of the carrier substrate (10).

Permanent Cooling

According to another advantageous variant of the invention, after the temperature change of the sample, especially after cooling, a permanent tempering of the carrier substrate (10) with the sample can be provided. For example, during the examination of the sample by inverse microscopy, the low temperature can be maintained by passing a gaseous or liquid thermostatic medium over the upper side (11) of the carrier substrate (10). The gaseous or liquid thermostatic medium is supplied at a low pressure between 5 bars and 10 bars. Furthermore, cryofixation of the suddenly frozen sample can be provided. Cryofixation can be carried out using one of the methods known per se, whereby the carrier substrate (10) with the sample is transferred from the device to a cryofixation device, e.g. to a cryotank with liquid nitrogen, if necessary.

The tempering liquid for permanent cooling may be supplied from the pressure tank (400) or via a separate line connected to the supply line. Preferably, the tempering liquid for permanent cooling is the cooling medium stored in cooling tank (300).

Thus, one embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it, and wherein the supply line (20) comprises an inlet for a tempering liquid for permanent cooling; and (d) an expansion chamber (30) surrounding the upper side (11) of the carrier substrate (10), wherein the pressure tank (400) is mounted to the upper side (11) of the carrier substrate (10), to keep the supply line (20) as short as possible.

In one embodiment according to the invention the device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (e) a cooling tank (300) for cooling the liquid (2), wherein the pressure tank (400) is mounted to the upper side (11) of the carrier substrate (10), to keep the supply line (20) as short as possible and wherein the cooling tank (300) is connected to the pressure tank (400) for supplying the tempering liquid for permanent cooling to the supply line.

The tempering liquid is preferably supplied in a fast or instantaneous manner after cooling, in order to keep the sample temperature constantly low. To this extent, in embodiments of the inventive device in which the tempering liquid is supplied from the pressure tank (400), the tempering liquid supply is controlled by a valve. The valve may be a check valve, which opens as soon as the pressure in the pressure tank drops due to opening the outlet valve (22). Alternatively, the valve may be a valve, which opens after a predefined amount of time.

Thus, in one embodiment according to the invention the device (100) for decreasing temperature of a sample comprises:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it;

(d) an expansion chamber (30) surrounding the upper side (11) of the carrier substrate (10), and (e) a cooling tank (300) for cooling the liquid (2), wherein the pressure tank (400) is mounted to the upper side (11) of the carrier substrate (10), to keep the supply line (20) as short as possible, wherein the cooling tank (300) is connected via a valve to the pressure tank (400) for supplying the tempering liquid for permanent cooling to the supply line.

Preferably, the valve is a check valve configured to open, when the pressure in the pressure tank reaches atmospheric pressure. Preferably, the valve is a check valve configured to open, when the pressure in the pressure tank decreases below a predefined pressure, which is higher than atmospheric pressure.

Another embodiment according to the invention is related to a device (100) for decreasing temperature of a sample, comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) connecting the outlet valve (22) with the upper side (11) of the carrier substrate (10), wherein the supply line (20) is adapted to pass the liquid (2) with a pressure higher than the atmospheric pressure through it; and (d) an expansion chamber (30) surrounding the upper side (11) of the carrier substrate (10) wherein the expansion chamber (30) further comprises an inlet for a tempering liquid for permanent cooling, wherein the pressure tank (400) is mounted to the upper side (11) of the carrier substrate (10), to keep the supply line (20) as short as possible.

Fluorescence Microscopy

The methods and devices disclosed herein are particularly useful for fluorescence microscopy of a cryo-arrested sample (1). Ultra-rapid cryo-arresting of a sample (1), preferably a biological sample, such as a living cell, overcomes the fundamental resolution barrier imposed by motional blur and photochemical reactivity, thereby enabling the observation of native molecular distributions and reaction patterns that are not resolvable at physiological temperatures.

Thus, a further aspect of the present invention is directed to a method of fluorescence microscopy comprising the following steps:

(a) providing a sample (1) containing fluorescent molecules on the lower side (12) of a carrier substrate (10) at atmospheric pressure;

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased;

(d) illuminating the sample (1); and (e) detecting the fluorescence produced by the sample (1).

The sample (1) can be illuminated by any suitable light source such as a lasers, LEDs, xenon or mercury gas lamps.

Preferably, the method of fluorescence microscopy comprises the following steps:

(a) providing a sample (1) containing fluorescent molecules on the lower side (12) of a carrier substrate (10) at atmospheric pressure;

(b) providing in a pressure tank (400) liquid nitrogen having a temperature below its critical temperature and helium having a pressure between 5 MPa and 100 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased;

(d) illuminating the sample (1); and (e) detecting the fluorescence produced by the sample (1).

Preferably, the method of fluorescence microscopy comprises the following steps:

(a) providing a sample (1) containing fluorescent molecules on the lower side (12) of a carrier substrate (10) at atmospheric pressure;

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased and the sample (1) undergoes vitrification without crystallization, preferably without formation of ice crystals larger than 80 nm in diameter, preferably without formation of ice crystals larger than 10 nm in diameter, more preferably without formation of ice crystals larger than 1 nm in diameter and even more preferably without formation of ice crystals;

(d) illuminating the sample (1); and (e) detecting the fluorescence produced by the sample (1).

In a preferred embodiment, the method of fluorescence microscopy comprises the following steps:

(a) providing a sample (1) containing fluorescent molecules on the lower side (12) of a carrier substrate (10) at atmospheric pressure;

(a') illuminating the sample (1); and (a") detecting the fluorescence produced by the sample (1).

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased;

(d') repeating steps (a') and (a").

Optical microscopy with stimulated emission depletion (STED) A further aspect of the present invention is directed to a method for performing optical microscopy with stimulated emission depletion of a cryo-arrested sample (1), comprising:

(a) providing a sample (1) containing fluorescent molecules on the lower side (12) of a carrier substrate (10) at atmospheric pressure;

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased;

(d1) illuminating the sample (1) by a first pulsed laser beam to excite the fluorescent molecules for fluorescence in the sample (1), wherein the first pulsed laser beam is focused on at least one focal area;

(d2) illuminating the sample (1) by a second torus-shaped laser beam to de-excite the fluorescent molecules in the sample (1), wherein the second laser beam comprises an intensity zero point in the at least one focal area;

(e) detecting the fluorescence produced by the sample (1); and (f) optionally repeating steps d1, d2 and e at different positions of the focal area of the first pulsed laser beam and at different positions of the intensity zero point of the second torus-shaped laser beam.

Preferably, the method for performing optical microscopy with stimulated emission depletion of a cryo-arrested sample (1), comprises (a) providing a sample (1) containing fluorescent molecules on the lower side (12) of a carrier substrate (10) at atmospheric pressure;

(b) providing in a pressure tank (400) liquid nitrogen having a temperature below its critical temperature and helium having a pressure between 5 MPa and 100 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased;

(d1) illuminating the sample (1) by a first pulsed laser beam to excite the fluorescent molecules for fluorescence in the sample (1), wherein the first pulsed laser beam is focused on at least one focal area;

(d2) illuminating the sample (1) by a second torus-shaped laser beam to de-excite the fluorescent molecules in the sample (1), wherein the second laser beam comprises an intensity zero point in the at least one focal area;

(e) detecting the fluorescence produced by the sample (1); and (f) optionally repeating steps d1, d2 and e at different positions of the focal area of the first pulsed laser beam and at different positions of the intensity zero point of the second torus-shaped laser beam.

Preferably, the method for performing optical microscopy with stimulated emission depletion of a cryo-arrested sample (1), comprises (a) providing a sample (1) containing fluorescent molecules on the lower side (12) of a carrier substrate (10) at atmospheric pressure;

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased and the sample (1) undergoes vitrification without crystallization, preferably without formation of ice crystals larger than 80 nm in diameter, preferably without formation of ice crystals larger than 10 nm in diameter, more preferably without formation of ice crystals larger than 1 nm in diameter and even more preferably without formation of ice crystals;

(d1) illuminating the sample (1) by a first pulsed laser beam to excite the fluorescent molecules for fluorescence in the sample (1), wherein the first pulsed laser beam is focused on at least one focal area;

(d2) illuminating the sample (1) by a second torus-shaped laser beam to de-excite the fluorescent molecules in the sample (1), wherein the second laser beam comprises an intensity zero point in the at least one focal area;

(e) detecting the fluorescence produced by the sample (1); and (f) optionally repeating steps d1, d2 and e at different positions of the focal area of the first pulsed laser beam and at different positions of the intensity zero point of the second torus-shaped laser beam.

Fluorescence-Lifetime Imaging Microscopy (FLIM)

A further aspect of the present invention is directed to a method for performing fluorescence-lifetime imaging microscopy with time-correlated single-photon counting of a cryo-arrested sample (1), comprising (a) providing a sample (1) containing fluorescent molecules on the lower side (12) of a carrier substrate (10) at atmospheric pressure;

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased;

(d) periodically exciting the fluorescent molecules to emit fluorescence photons by illuminating the sample with a pulsed laser beam;

(e) detecting the fluorescence photons produced by the sample together with the photon arrival times relative to the laser pulse (1); and (f) determining the fluorescence-lifetime from the detected fluorescence photons and the photon arrival times.

Preferably, the method for performing fluorescence-lifetime imaging microscopy with time-correlated single-photon counting of a cryo-arrested sample (1), comprises (a) providing a sample (1) containing fluorescent molecules on the lower side (12) of a carrier substrate (10) at atmospheric pressure;

(b) providing in a pressure tank (400) liquid nitrogen having a temperature below its critical temperature and helium having a pressure between 5 MPa and 100 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased;

(d) periodically exciting the fluorescent molecules to emit fluorescence photons by illuminating the sample with a pulsed laser beam;

(e) detecting the fluorescence photons produced by the sample (1); and (f) determining the fluorescence-lifetime from the detected fluorescence photons.

Preferably, the method for performing fluorescence-lifetime imaging microscopy with time-correlated single-photon counting of a cryo-arrested sample (1), comprises (a) providing a sample (1) containing fluorescent molecules on the lower side (12) of a carrier substrate (10) at atmospheric pressure;

(b) providing in a pressure tank (400) liquid nitrogen having a temperature below its critical temperature and helium having a pressure of at least 2.5 MPa;

(c) supplying the liquid nitrogen from the pressure tank (400) to the upper side (11) of the carrier substrate (10) under pressure by opening an outlet valve (22) located at the bottom of the pressure tank (400), wherein the liquid nitrogen is brought into contact with the upper side (11) of the carrier substrate (10), wherein the temperature of the sample (1) is decreased, preferably rapidly decreased and without formation of ice crystals within the sample (1) or without formation of ice crystals larger than 80 nm in diameter or without formation of ice crystals larger than 10 nm in diameter within the sample (1);

(d) periodically exciting the fluorescent molecules to emit fluorescence photons by illuminating the sample with a pulsed laser beam;

(e) detecting the fluorescence photons produced by the sample (1); and (f) determining the fluorescence-lifetime from the detected fluorescence photons.

The present disclosure also relates to the following points:

Point 1. A method for decreasing temperature of a sample (1) for inverse microscopy comprising the following steps:

(a) providing a sample (1) on the lower side (12) of a carrier substrate (10) at atmospheric pressure;

(b) providing in a pressure tank (400) at least one liquid (2) having a temperature below its critical temperature and a gas (500) having a pressure higher than the atmospheric pressure; and (c) supplying the at least one liquid (2) from the pressure tank (400) to the upper side (11) of the carrier substrate (10) under pressure by opening an outlet valve (22) located at the bottom of the pressure tank (400), wherein the at least one liquid (2) is brought into contact with the upper side (11) of the carrier substrate (10), wherein the temperature of the sample (1) is decreased, preferably rapidly decreased.

Point 2. The method according to point 1, wherein the pressure of the gas (500) is between 50 bar to 1000 bar.

Point 3. The method according to point 1 or 2, wherein at least one liquid (2) in step (b) is liquid nitrogen.

Point 4. The method according to any one of the points 1 to 3, wherein the gas (500) is helium.

Point 5. The method according to any one of the points 1 to 4 further comprising step (d):

(d) tempering the sample (1) on the lower side (12) of the carrier substrate (10) by passing a further liquid over the upper side (11) of the carrier substrate (10).

Point 6. The method according to any one of the points 1 to 5, wherein the sample (1) is a living sample of a biological material, preferably of living cells.

Point 7. The method according to any one of the points 1 to 7, wherein in step (c) the temperature of the sample (1) is decreased, preferably rapidly decreased without formation of ice crystals within the sample (1) or without formation of ice crystals larger than 10 nm in diameter within the sample (1).

Point 8. A device (100) for decreasing the temperature of a sample (1) comprising:

(a) a carrier substrate (10) with a lower side (12) for accommodating a sample (1) and with an upper side (11), which is exposed for a supply of a liquid (2);

(b) a pressure tank (400) adapted for holding a fluid, the pressure tank (400) comprising an outlet valve (22) located at the bottom;

(c) a supply line (20) having an upper end connected to the outlet valve (22) and an outlet opening (21) at a lower end, wherein the outlet opening (21) points towards the upper side (11) of the carrier substrate (10) and the supply line (20) is adapted to pass the liquid (2) with a pressure higher than the atmospheric pressure through it; and (d) an expansion chamber (30) surrounding the outlet opening (21).

Point 9. The device (100) according to point 8, wherein the temperature of a sample (1) is decreased in a way that no ice crystals within the sample (1) are formed or that no ice crystals larger than 10 nm in diameter within the sample (1) are formed.

Point 10. The device (100) according to point 8 or 9, wherein the outlet valve (22) is a switchable valve, preferably a fast-opening, switchable valve, preferably an electrically or pneumatically switchable valve, preferably a switchable piston valve.

Point 11. The device according to any one of points 8 to 10, wherein the bottom of the pressure tank (400) is funnel-shaped and the outlet valve (22) is located at the center of the bottom.

Point 12. The device (100) according to any one of the points 8 to 11, wherein the carrier substrate (10) is diamond, in particular CVD diamond.

Point 13. The device (100) according to any one of the points 8 to 12, wherein the distance between the outlet opening (21) and the upper side (11) of the carrier substrate (10) is in the range of 0.5 mm to 1.5 mm.

Point 14. The device (100) according to any one of the points 8-13, wherein the expansion chamber (30) has a dimension in the range of 50 cm$^3$ to 100 cm$^3$.

Point 15. The device (100) according to any one of the points 8-14, wherein the pressure tank (400) is surrounded by a cooling tank (300) for cooling the liquid (2) and/or wherein the supply line is funnel-shaped, preferably funnel-shaped at the outlet opening (21).

Figure 1:
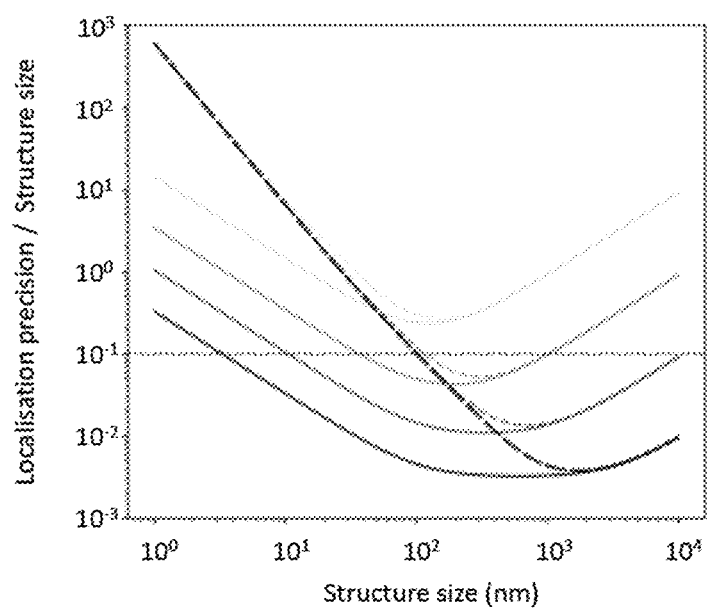
FIG. 1 shows calculated localization precision relative to the actual structure size (left) and resolution (right) plotted against the structure size for different amounts of emitted photons (legend to the right) at room temperature with simulated Brownian motion (continuous lines) or under cryo-arrest (dotted lines). Horizontal black dotted line: localization precision with 10% of actual structure size. This diagram illustrates the spatial resolution limit ("fundamental barrier") of an observed system. PSF indicates the point spread function of the microscope. This limit is inversely related to the size of the observed structures and is caused by Brownian or active motion ("room temperature" vs "cryo-arrest") and by the number of collected photons that is determined by the exposure time that is limited by the maximally attainable fluorescence photon flux as determined by molecular cross section, fluorescence quantum yield and excited state lifetime as well as photochemical stability.
Figure 1:
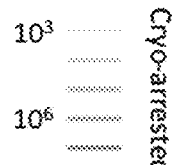
Figure 1:
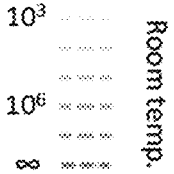
Figure 1:
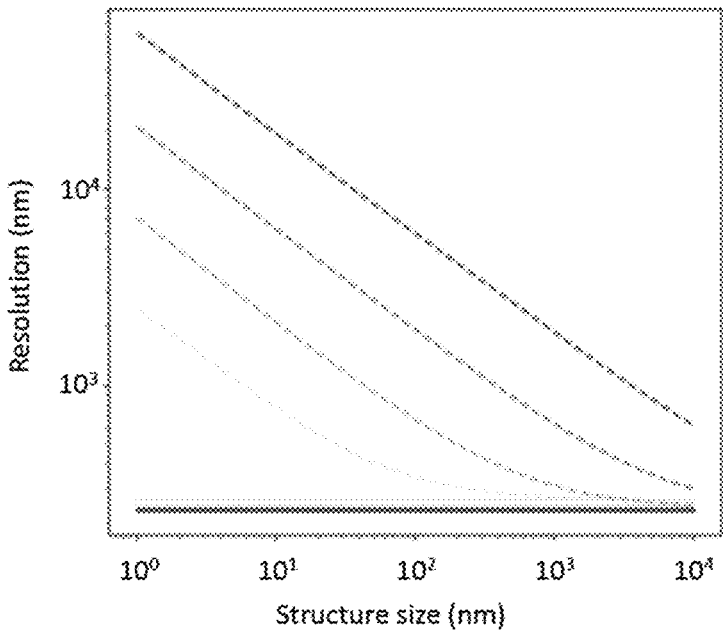
Figure 2:
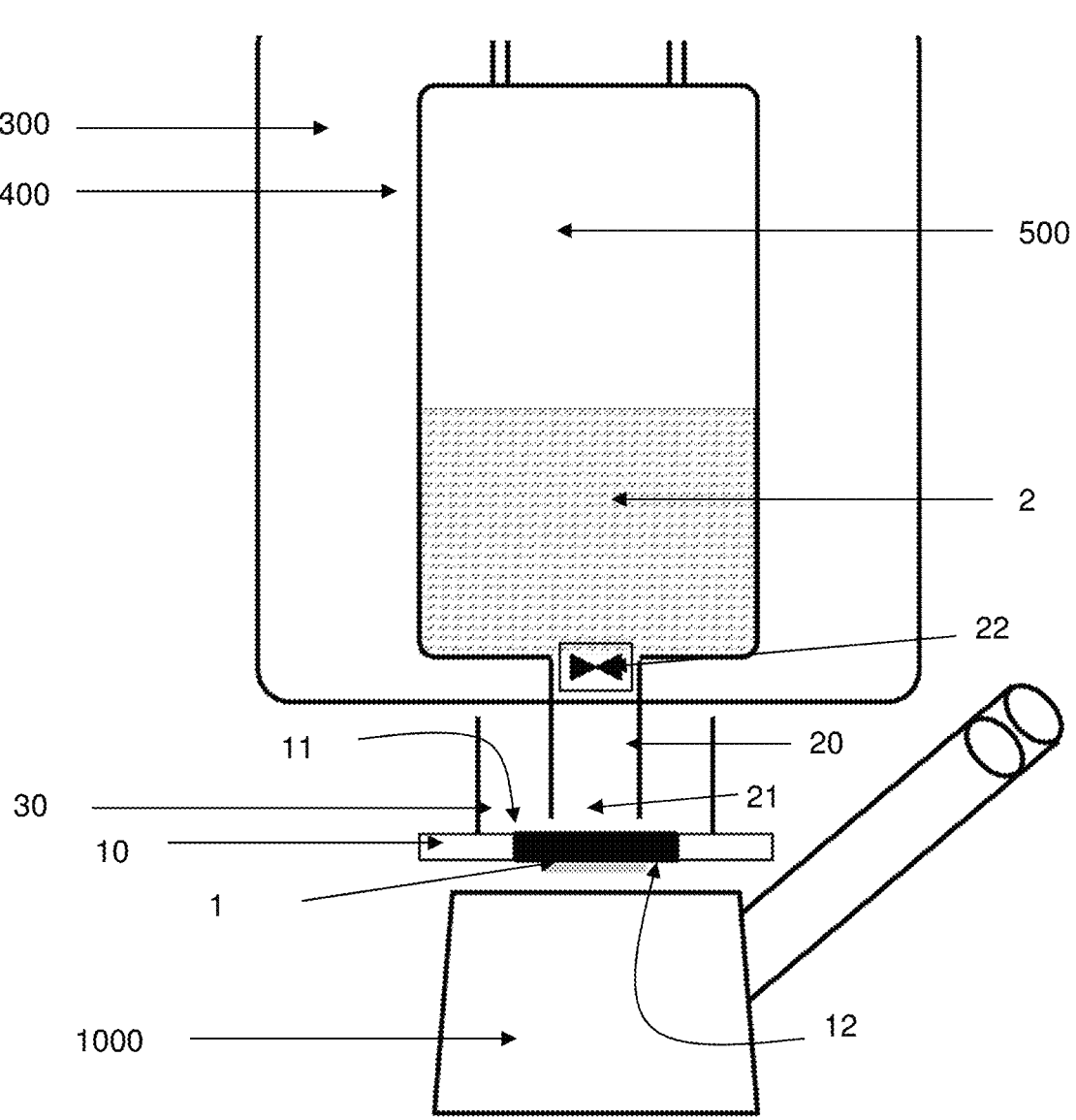
FIG. 2 shows a schematic view of an embodiment of the inventive device (100) adapted to an inverted microscope (1000). Depicted are the following means: sample (1), liquid (2), gas (500) carrier substrate (10), upper side (11) and lower side (12) of the carrier substrate (10), cooling tank (300), pressure tank (400), supply line (20), outlet opening (21), outlet valve (22), expansion chamber (30) and inverted microscope (100).
Figure 3:
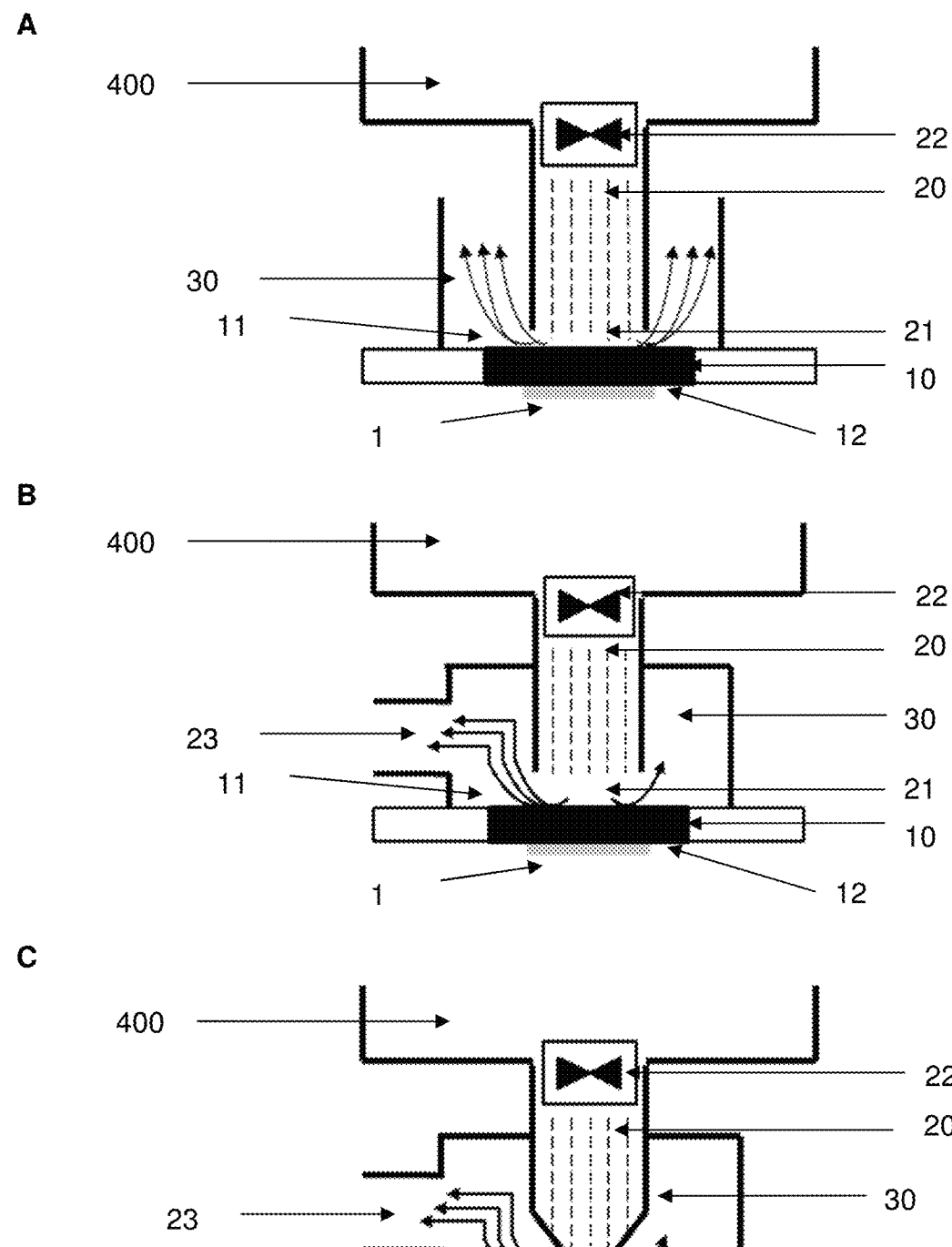
FIG. 3 (A) shows a detailed view of the device (100) according to the invention: The carrier substrate (10) serves as a heat exchanger and for receiving the sample (1) at its lower side, a supply line (20) for the liquid (2), an outlet opening (21). When the outlet valve (22) opens, the liquid (2) and gas (500) flushes out of the pressure tank (400), passing through the supply line onto the upper side (11) of the carrier substrate (10) into the expansion chamber (30)
Figure 3:
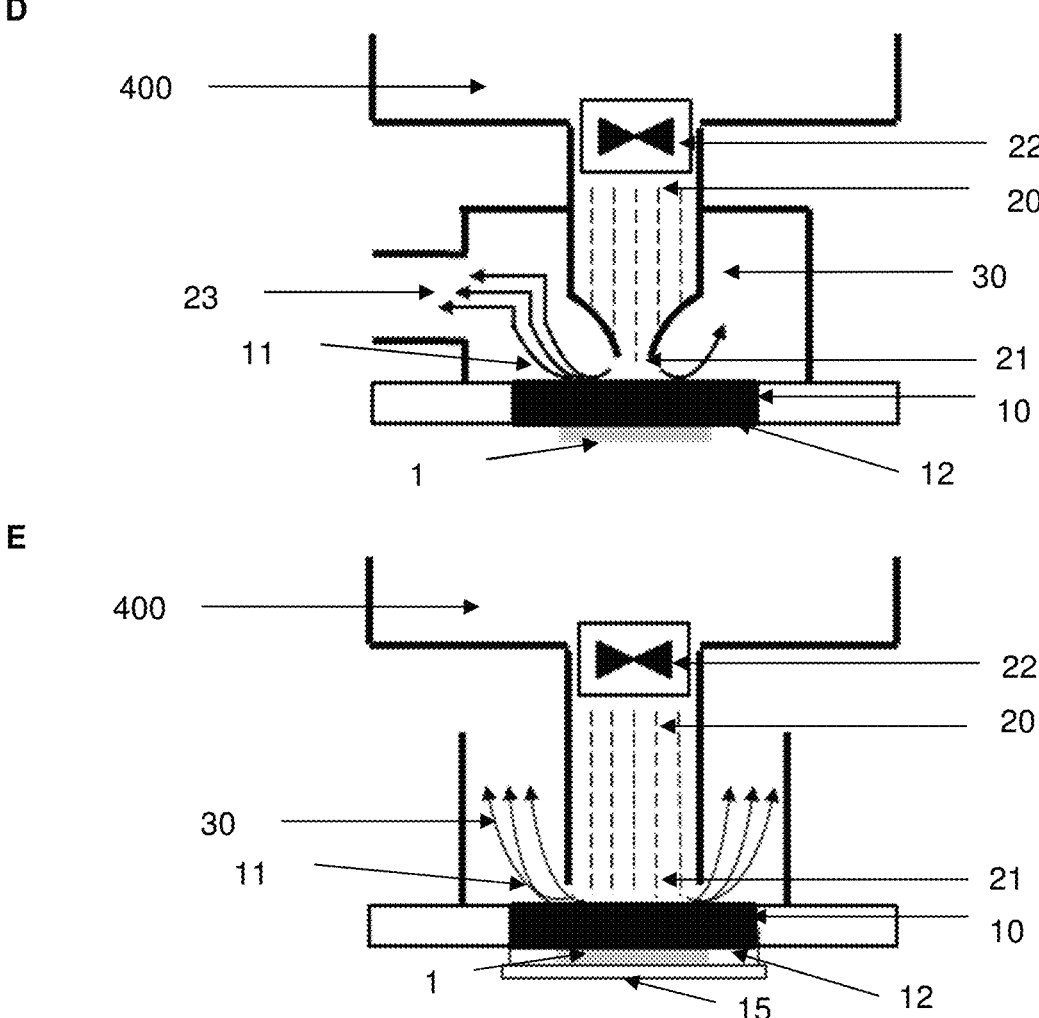

(B) shows a detailed view of an embodiment of the inventive device (100) having an expansion chamber (30) with an gas outlet (23), the gas outlet (23) may further comprise a quick coupling for an exhaust hose;

(C) shows a detailed view of an embodiment of the inventive device (100) having a closed expansion chamber (30) and with a supply line (20) having a funnel-shaped outlet opening (21); the outlet opening may possibly form of a nozzle;

(D) shows a detailed view of an embodiment of the inventive device (100) having a closed expansion chamber (30) and with a supply line (20) having a funnel-shaped outlet opening (21); the outlet opening may possibly form of a nozzle.

(E) shows a detailed view of an embodiment of the inventive device (100), wherein an observation window (15) is placed below the sample (1), thereby forming a sample chamber (14).

Figure 4:
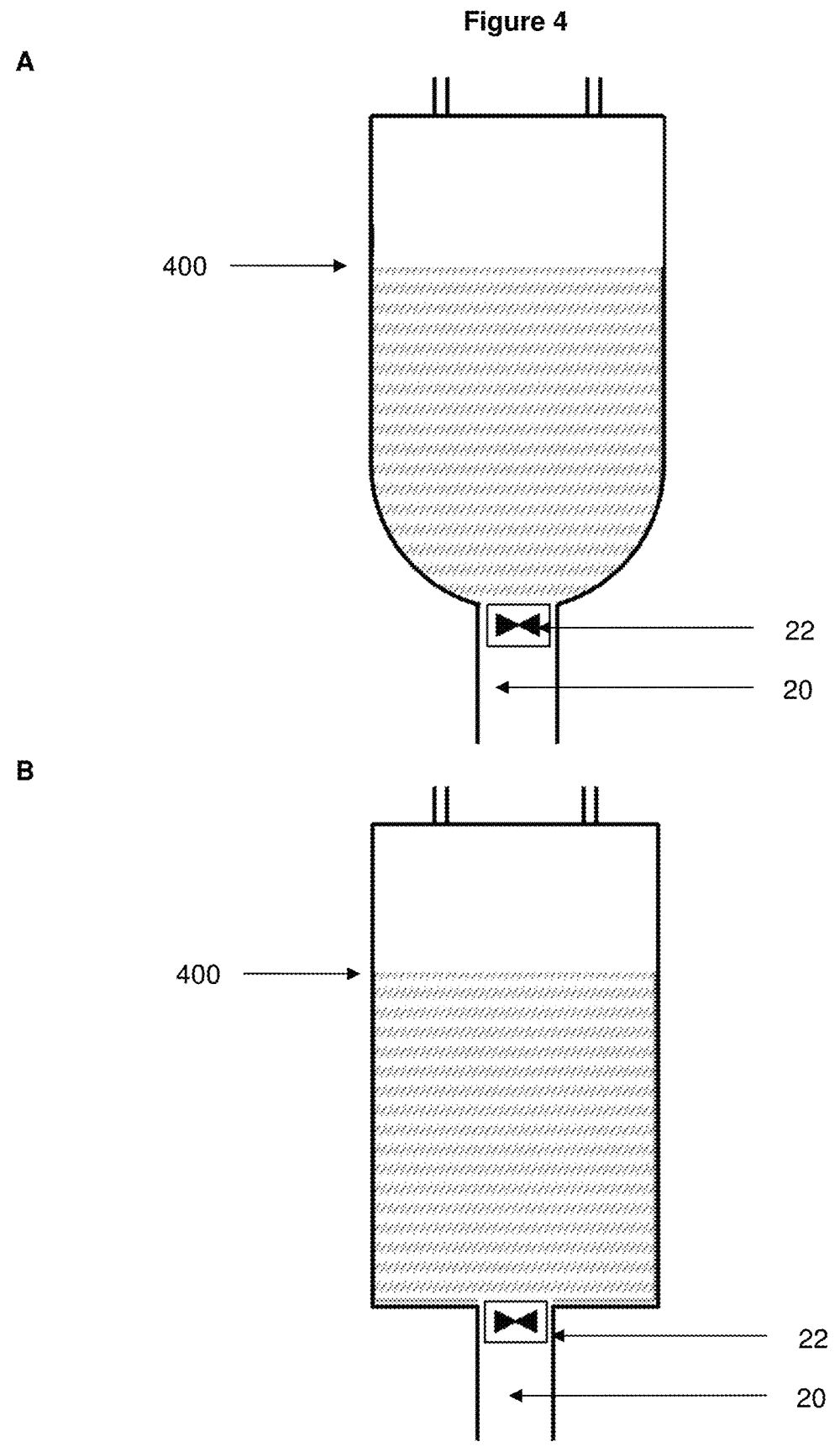

FIG. 4 shows an exemplarily embodiment of the pressure tank (400) of the device according to the invention having (A) a round bottom or semicircular bottom; or (B) a flat bottom.

Figures 5, 6:
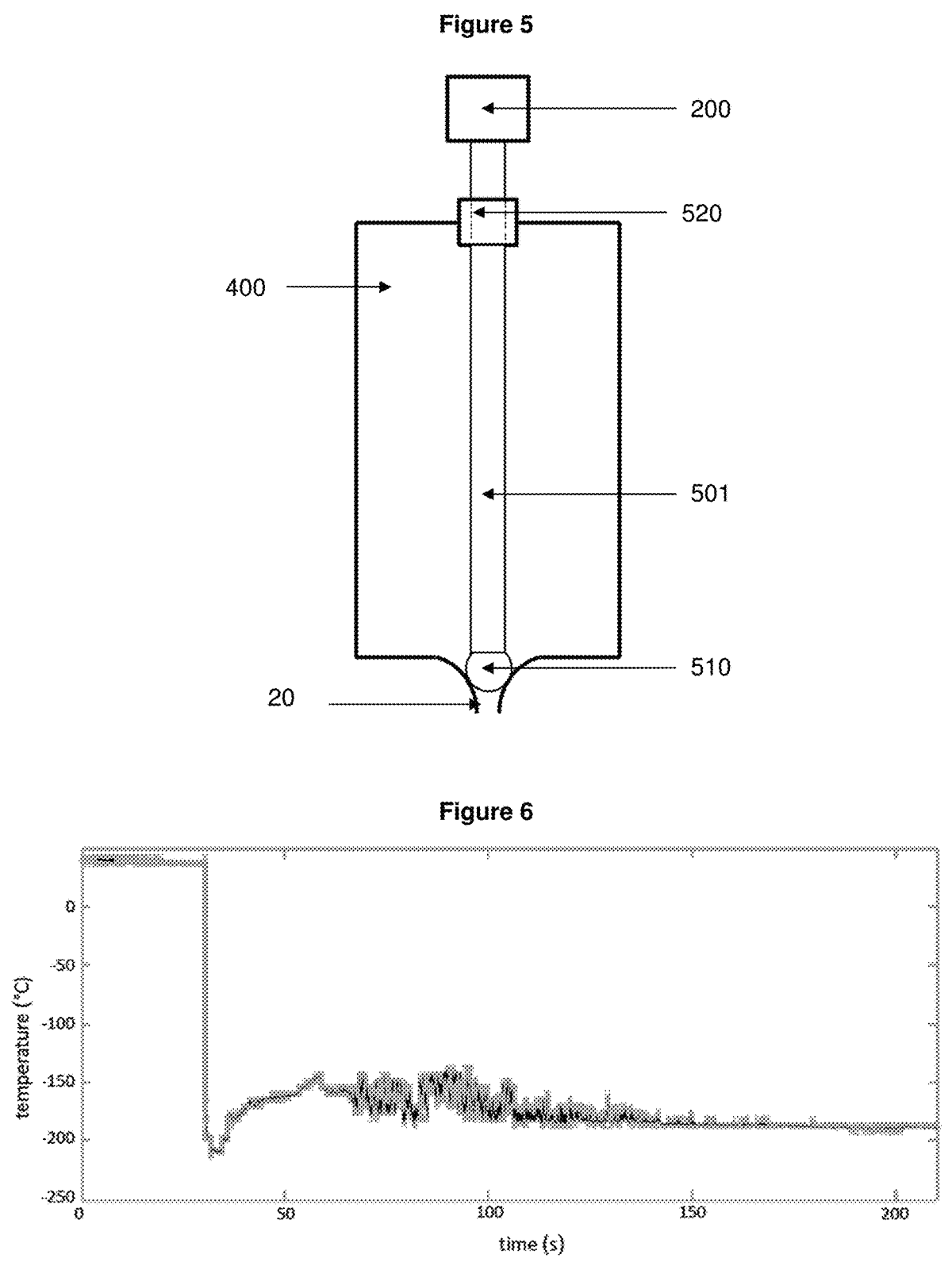

FIG. 5 shows an exemplarily embodiment of the pressure tank (400) of the device according to the invention with a switchable outlet valve (22). The following means are depicted: a lifting cylinder (200), a piston guide (520), a piston tip (510), and a piston (501). The piston tip is preferably composed of high density polyethylene (HDPE). This switchable valve allows the fast opening of a large cross-section.

FIG. 6 shows the temperature profile by using a device according to the invention. A cylindrical sample having a diameter of 4 mm and a thickness of 100 μm was used for the cooling experiment. The temperature was measured by using a 50 μm uninsulated wire thermocouple (T type, Omega Engineering Inc.) in an aqueous imaging medium (DMEM with HEPES buffer from PAN-Biotech GmbH). As can be seen, the temperature can initially be maintained at the desired temperature. By opening the switchable valve, the temperature suddenly reduces to below –130° C. Afterwards, the temperature remains constantly below –130° C. by passing liquid nitrogen over the upper side (11) of the carrier substrate (10).

Figure 7:
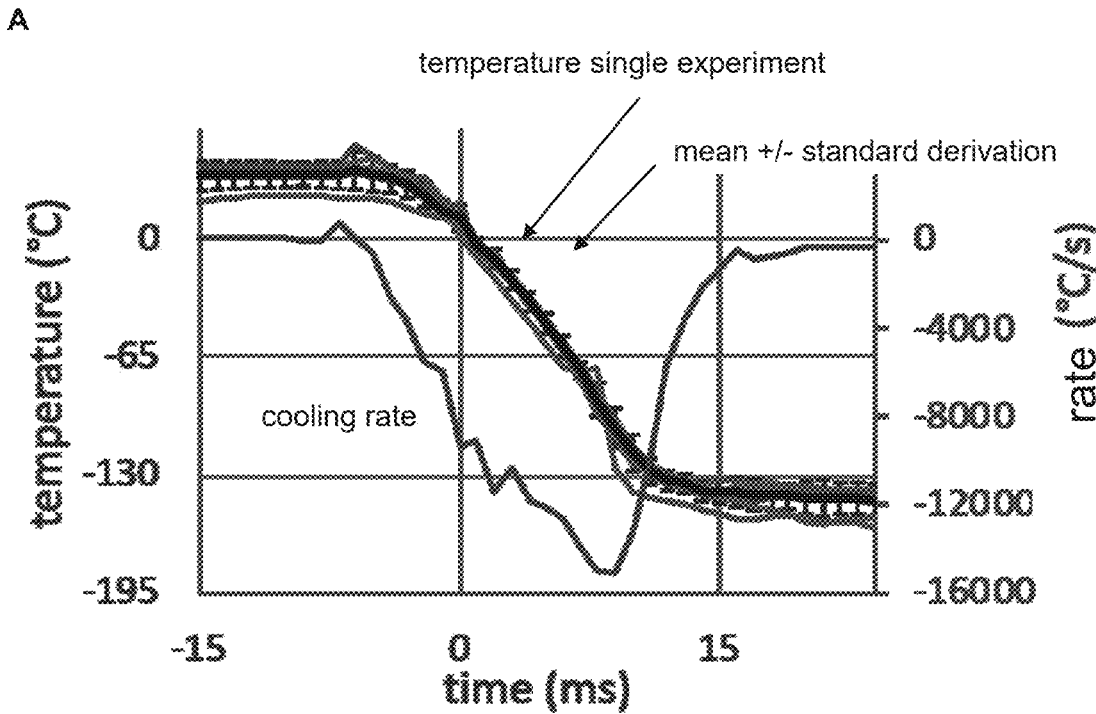
Figure 7:
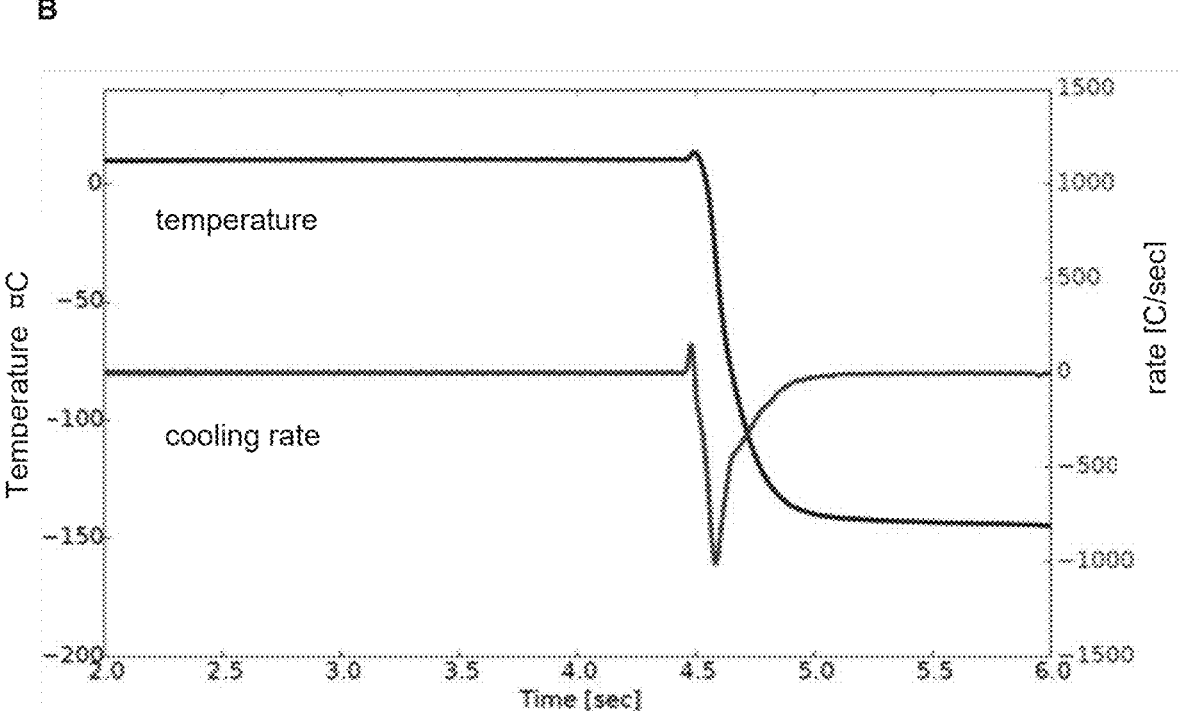
Figure 7:
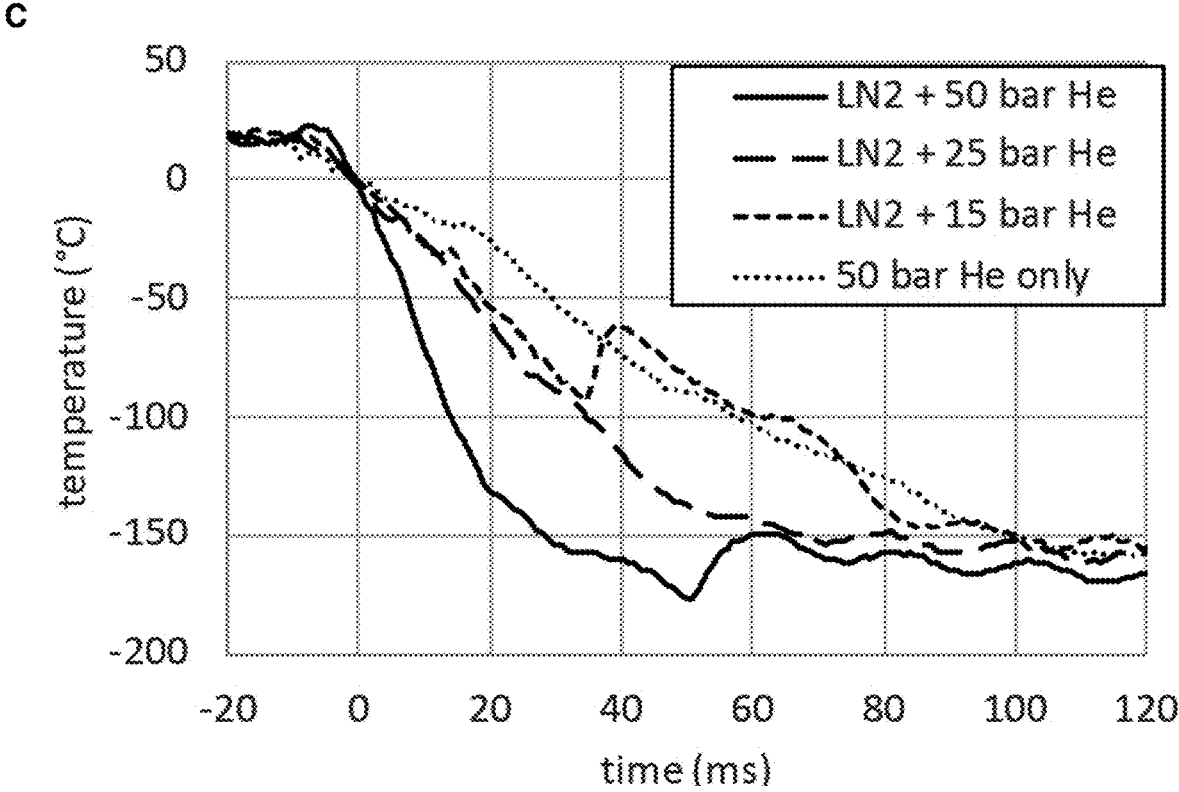

FIG. 7 shows a comparison between the temperature and cooling rate achieved by the device according to the invention (A) and the device according to the EP 2 877 828 B1 (B). The temperatures were measured by using a 50 μm uninsulated wire thermocouple (T type, Omega Engineering Inc.) in an aqueous imaging medium (DMEM with HEPES buffer from PAN-Biotech GmbH).

(A) The lowest curve shows the cooling rate in ° C./s of the cooling experiments by using the device or method according to the invention. The bolded line is the mean value of single cooling experiments, wherein the standard derivation is depicted. The other curves show the temperature profile of single cooling experiments. Here the cooling process is clearly visible and it can be seen that the cooling rates (lowest curve) are greater than 10,000 K/s for the temperature range between 0° C. and –130° C. In said temperature range an ice formation can usually occur.

(B): The lowest curve shows the cooling rate in ° C./s of the cooling experiments by using the device or method according to EP 2 877 828 B1.

(C) shows a comparison between the cooling rates achieved by the device according to the invention operated with a mixture of liquid nitrogen (LN2) and Helium (He) at a pressure of 50 bar (solid line) and lower pressures of 25 bar and 15 bar (dashed lines) as well as with Helium at 50 bar without LN2. The temperatures were measured by using a 50-μm uninsulated wire thermocouple (T type, Omega Engineering Inc.) in an aqueous imaging medium (DMEM with HEPES buffer from PAN-35 Biotech GmbH). It can be clearly seen that cooling rates are slower with lower Helium pressures. The lowest cooling rate was observed, when liquid nitrogen is omitted.

Figure 8:
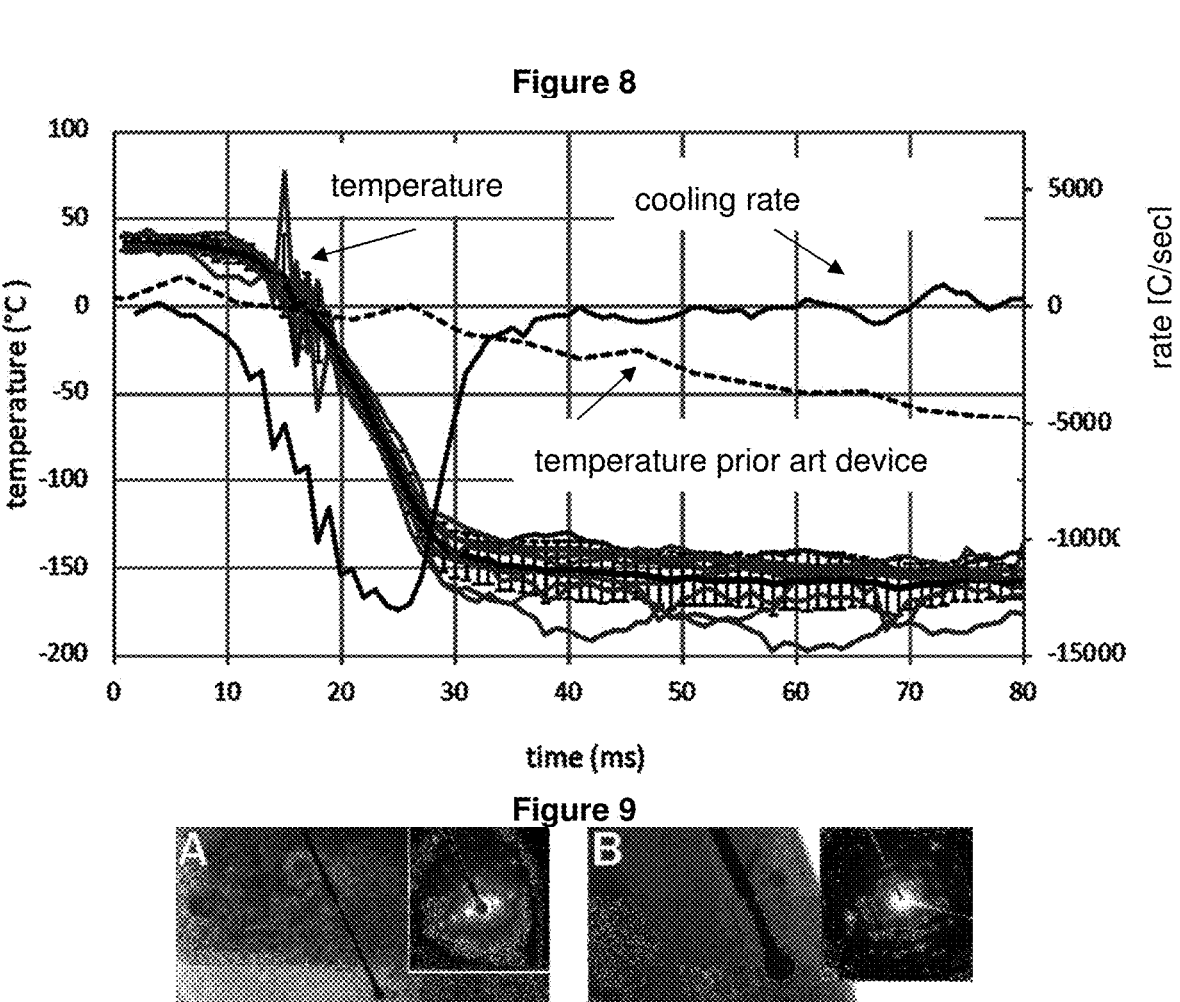

FIG. 8 shows a comparison between the temperature and temperature rate achieved by the device according to the invention and the device according to the EP 2 877 828 B1 ("prior art device") adapted to an inverted microscope by extending the supply line to the upper side of the carrier substrate. The temperature rates were measured by using a 50 μm uninsulated wire thermocouple (T type, Omega Engineering Inc.) in an aqueous imaging medium (DMEM with HEPES buffer from PAN-Biotech GmbH).

Figure 9:
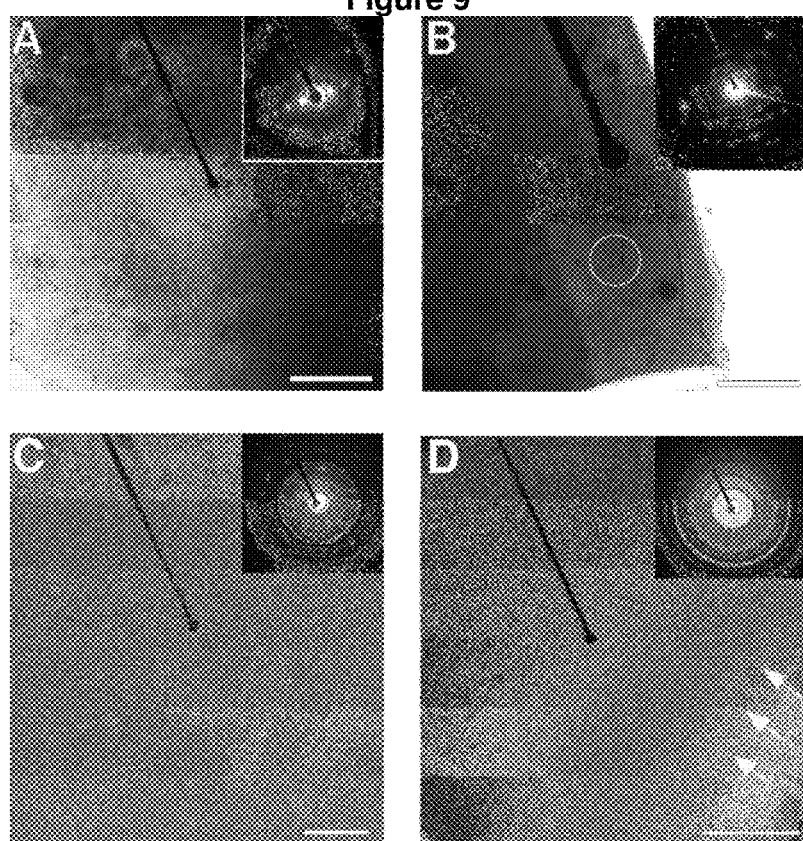

FIG. 9 shows Electron microscope images (inlet: electron diffraction pattern) of ice crystals in dilute aqueous solution (PBS) at various cooling rates. All cooling rates (relative measurements) were recorded with a 50 μm thermocouple. The real cooling rates are much faster.

(A) sample frozen at a measured cooling rate of about 1000 K/s as obtained with the prior art device adapted to an inverted microscope (FIG. 8). The electron diffraction pattern shows that only a single hexagonal ice crystal can be found. Real size of the ice crystal cannot be determined. However, the sample consisted only of hexagonal ice, which at this size would disrupt cells by displacing molecular components within the cells;

(B) and (C) show a sample frozen at a measured cooling rate of about 2500 K/s and 3500 K/s, respectively. Single ice crystals were observed. At a cooling rate of about 3500 K/s, the ice crystals have a diameter smaller than 50 nm.

(D) shows a cell sample containing 30% dextran (cryo-protectant) frozen at a measured cooling rate of about 3500 K/s. Cubic ice crystals were formed with a diameter smaller than 10 nm. Arrows point towards cell membrane.

Figure 10:
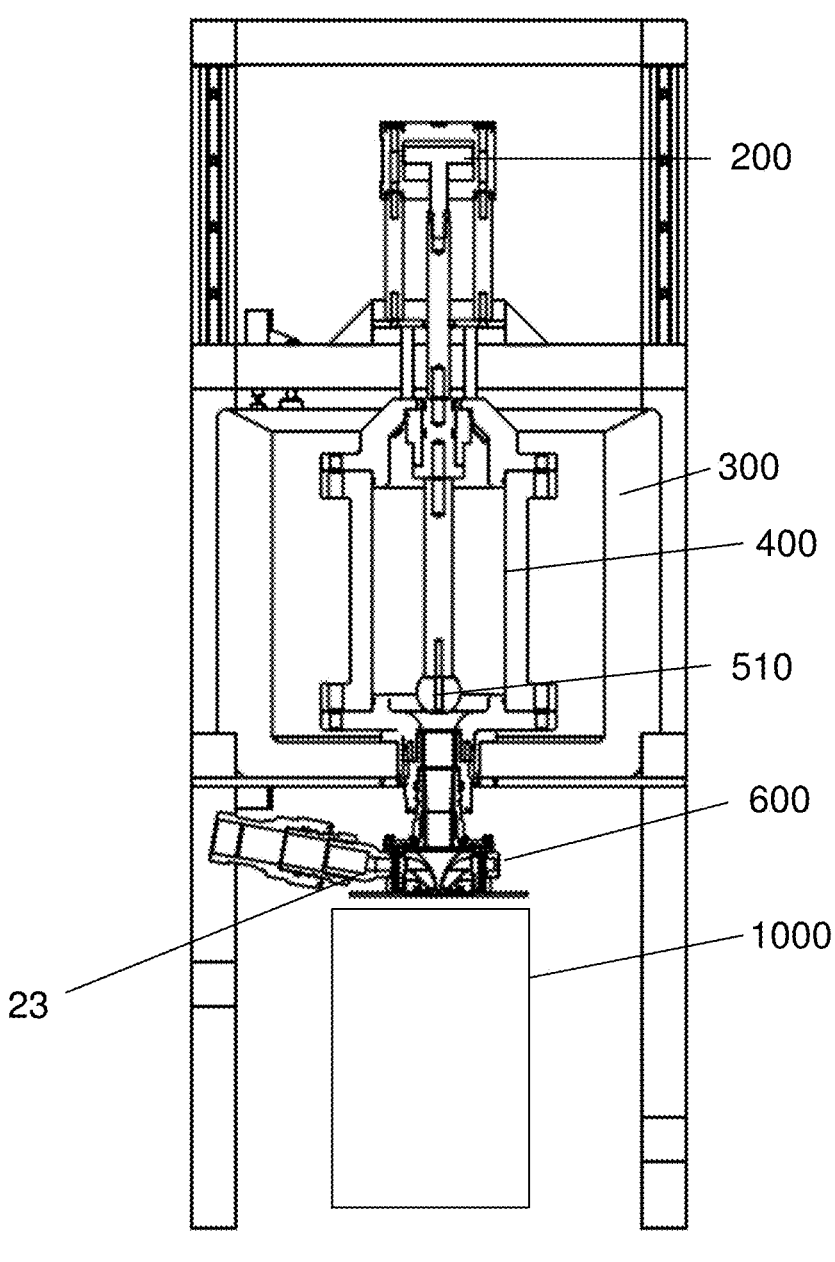

FIG. 10 shows a cross-sectional view an embodiment of a device (100) according to the invention. The following means are depicted: lifting cylinder (200), cooling tank (300), pressure tank (400), piston tip (510), heat exchanger (600), measuring device (1000) e.g. an inverted microscope, and gas outlet (23). The closed expansion chamber (30) forms together with the carrier substrate (10) a heat exchanger (600). The gas outlet (23) further comprises a quick coupling for an exhaust hose.

Figure 11:
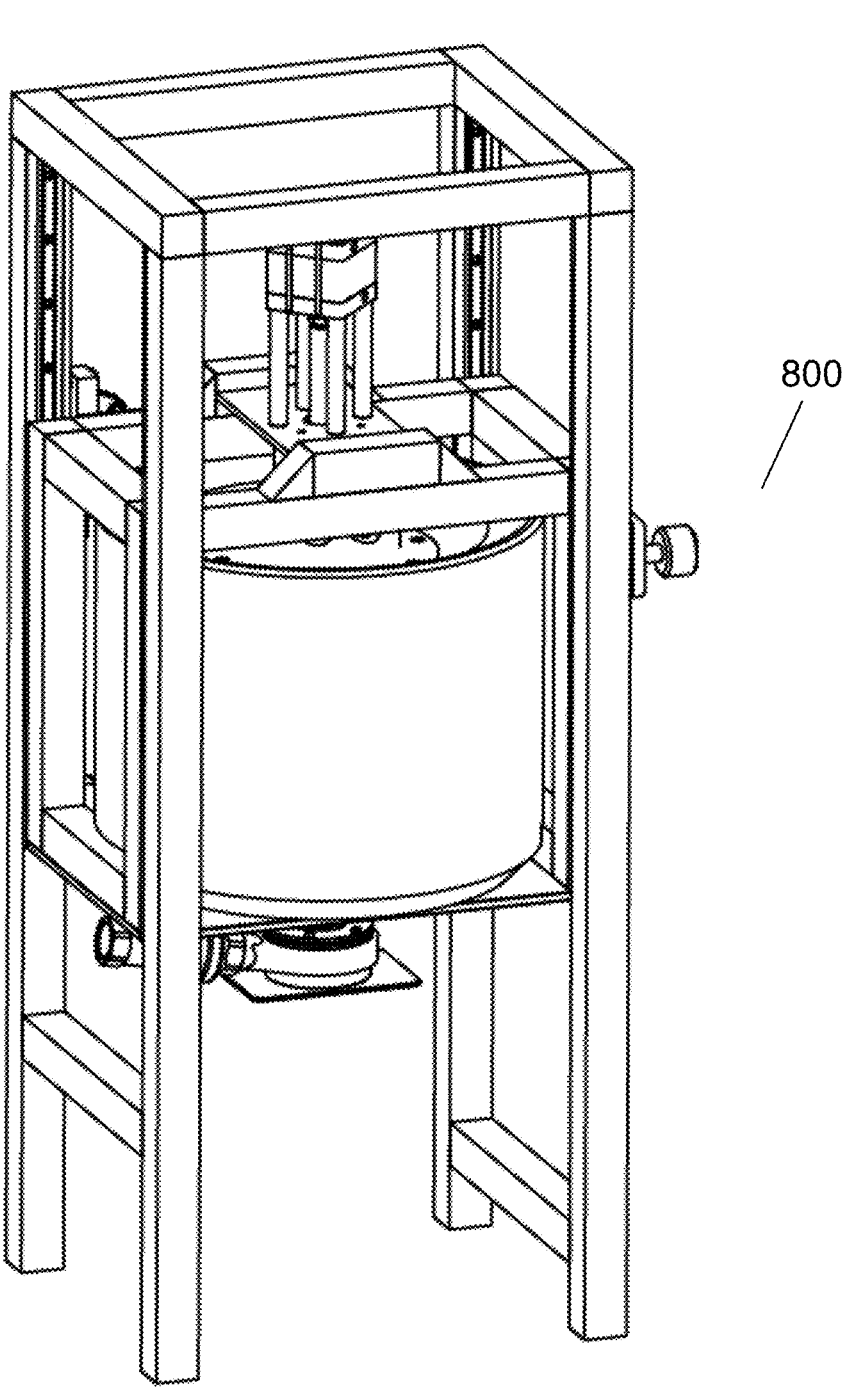

FIG. 11 shows a view of the outside of the embodiment of the device (100) according to the invention shown in FIG. 10. Means for adjusting and locking the height (800) are depicted.

Figure 12:
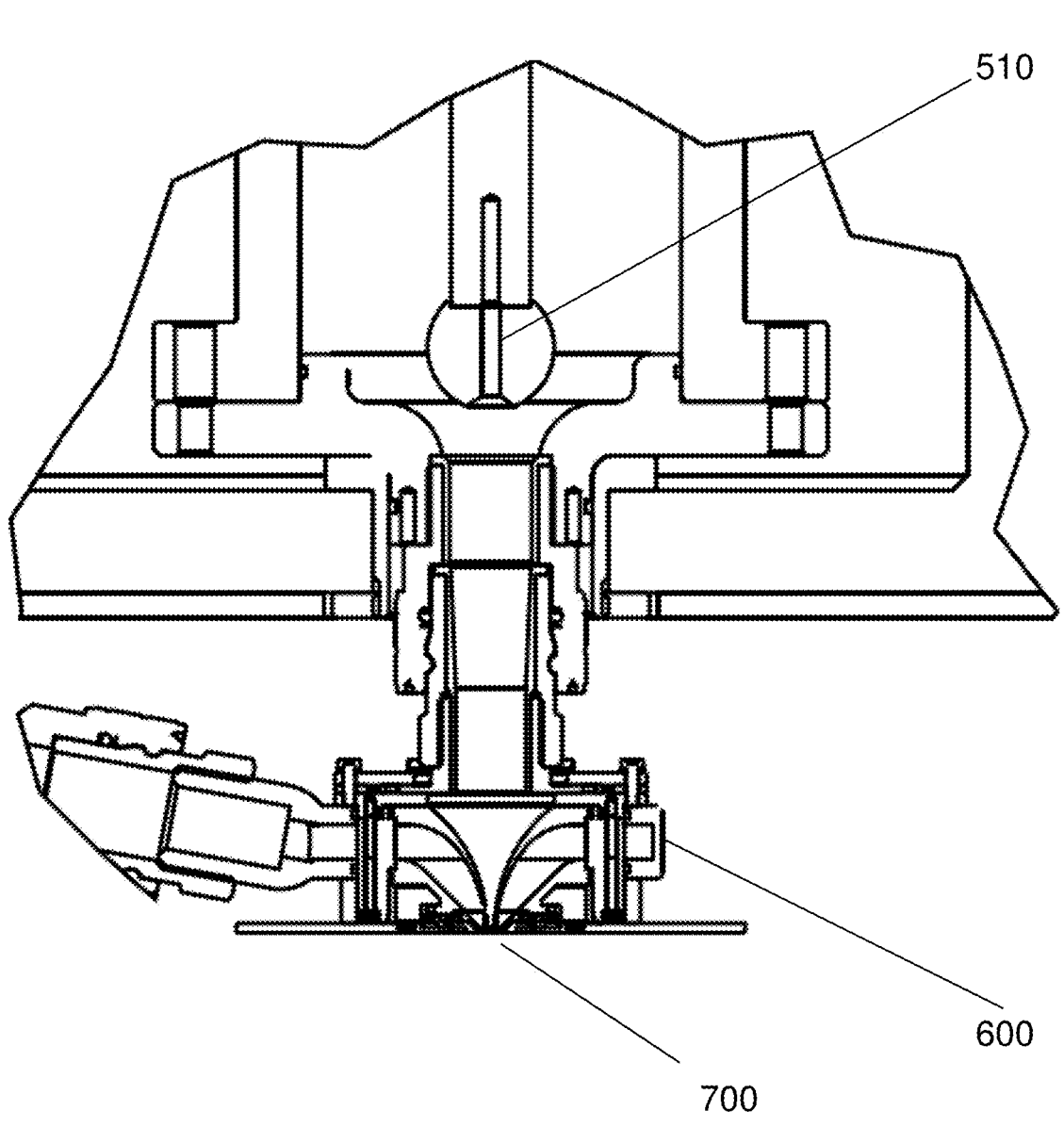

FIG. 12 shows the lower part of the embodiment of the device (100) according to the invention shown in FIG. 10. Depicted are among others a piston tip (510), a heat exchanger (600) and the diamond window (700).

Figure 13:
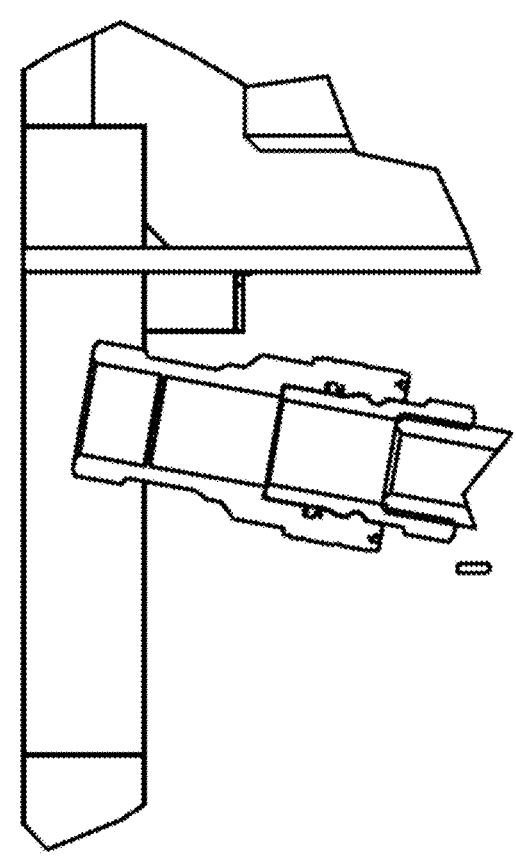

FIG. 13 shows the lower part, in particular, the gas outlet (23) of the device (100) according to the invention together with a quick coupling for an exhaust hose as shown in FIG. 10.

Figure 14:
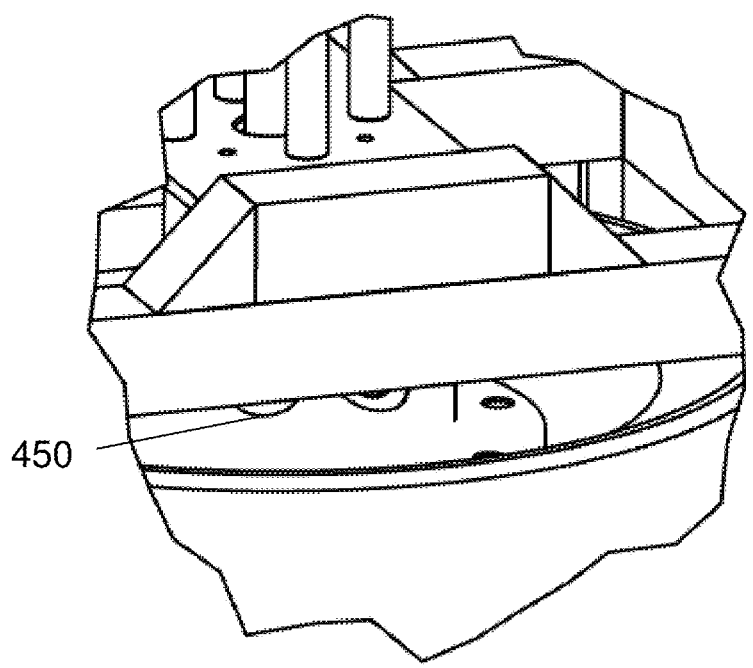

FIG. 14 shows a detailed view of the upper part of the pressure tank (400) as part of the inventive device (100) shown in FIG. 10. Depicted are threaded bores (450) for assembly parts, such as pressure measurements, rupture disc, and gas supply.

Figure 15:
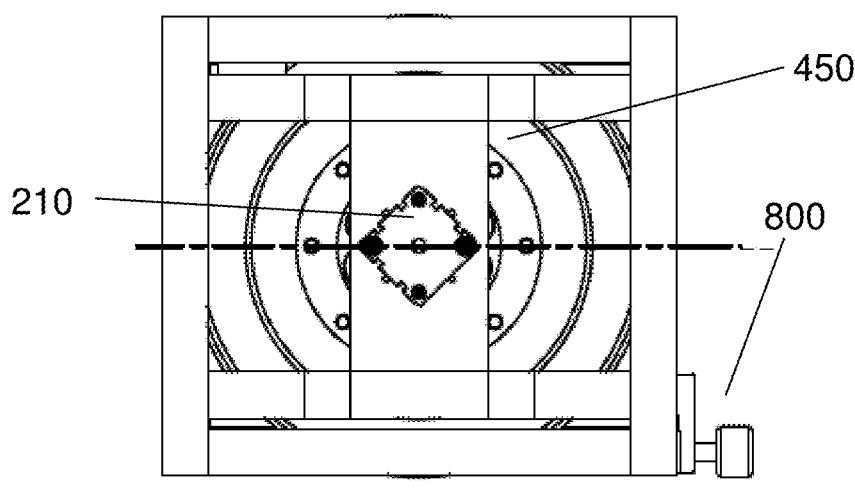

FIG. 15 shows a top view of the threaded bore (450) of an embodiment of the device (100) according to the invention shown in FIG. 10. Means for adjusting and locking the height (800), the threaded bores (450), and the hole for the lifting cylinder (210) are depicted.

Figure 16:
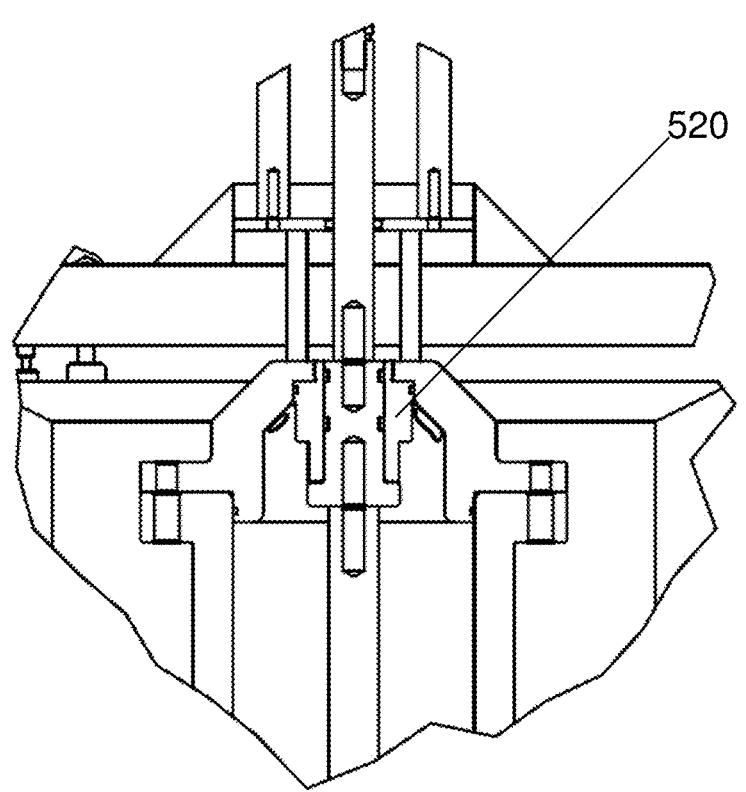

FIG. 16 shows a more detailed view of the lifting cylinder (200) of an embodiment of the device (100) according to the invention shown in FIG. 10. Among other, the piston guide (520) is depicted.

FIG. 17 shows results of widefield fluorescence microscopy of a HeLa cell transfected with EGFP before (first three images) and under cryofixation (rightmost image). Scale Bars: 10 μm FIG. 18 shows widefield fluorescence image of the fluorescent dye rhodamine 6G in cell culture medium after ultra-rapid cryo-arrest on the microscope (leftmost). The sample was mostly homogeneous apart from a highly fluorescent structure, which was already present before the cryo-arrest. arrows: expansion cracks. 3 rightmost images: Same sample during re-warming. Cracks disappeared completely, before ice crystals became visible by exclusion of the fluorescent dye (arrows). Subsequently, the ice crystals first grew and melted at even higher temperatures into an expanding liquid phase between the ice crystals (exemplified by arrows in the rightmost figures). Scale bars: 10 μm FIG. 19 shows an example of a MCF7 cell expressing TC-PTP-mCitrine, which has been imaged before cryo-arrest by confocal scanning microscopy at the indicated times before arrest (images 1-3 from left). Right half: The same cell has been imaged in confocal microscopy (sum of 10 frames) and widefield microscopy (top: single frame, bottom: sum of 100 frames). Bottom right image: Super-resolution radial fluctuations (SRRF) reconstruction of the 100 frames. Scale bars: 10 μm.

Figure 20:
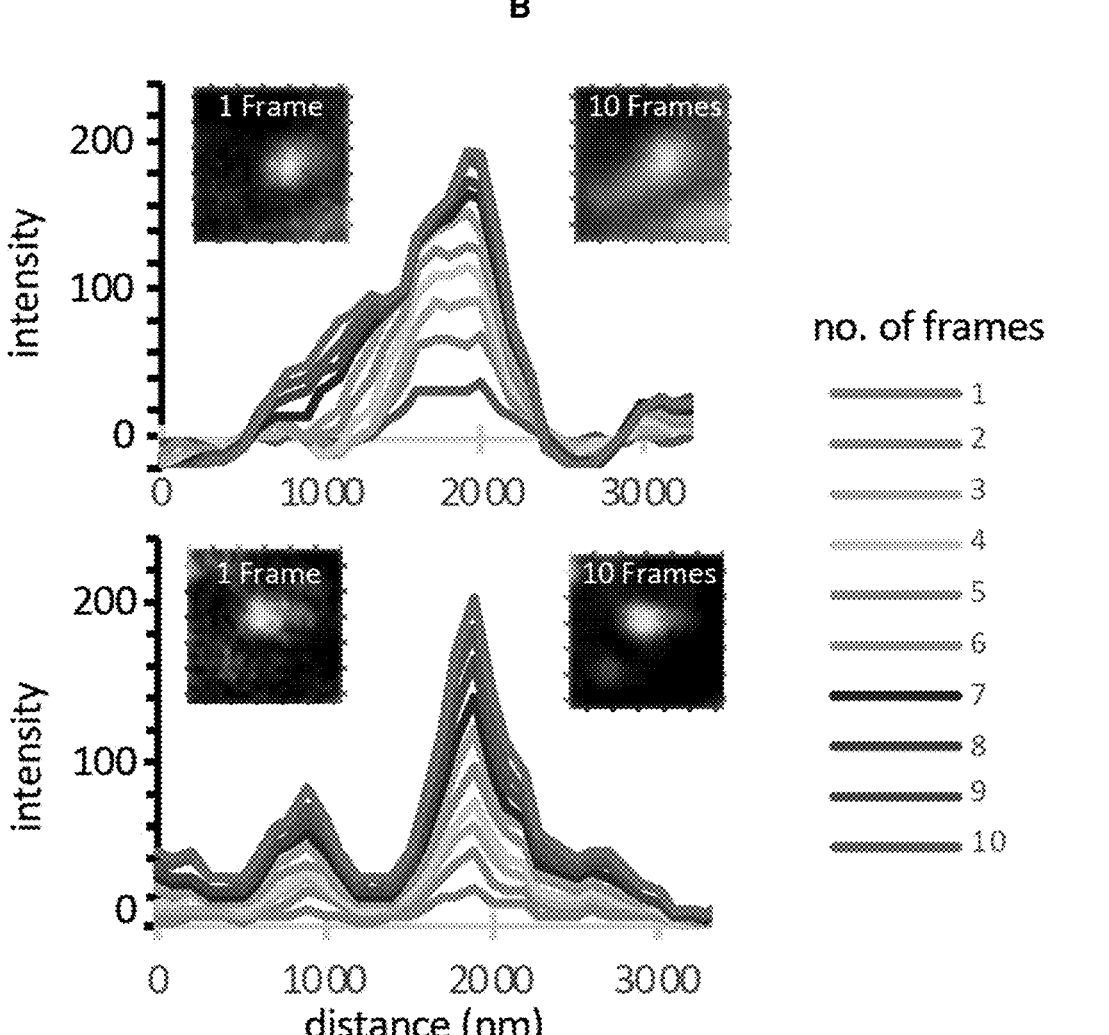

FIG. 20 (A) shows MCF7 cell expressing R-PTP-γ-mCitrine and Alexa647-labelled Snap-EGFR, imaged by confocal laser scanning microscopy before at the indicated times (3.75 s scan time) after application of 100 ng/mL EGF (single frame, images 1-3) and during cryo-arrest (sum of 10 frames, 37.5 s, image 4). Right, top: Confocal scan of a larger area containing several cells. $2^{nd}$ row: SRRF reconstruction of 100 frames widefield recording of the same cell (left) and an example of a cell arrested without prior EGF-stimulation. $3^{rd}$ row: magnifications of the boxed areas with masks for the plasma membrane (white dotted lines). Scale Bars: 10 μm;

(B) Motional blur measured by CLSM of Alexa647-Snap-EGFR labelled endosomes at room temperature (top) and under cryo-arrest (bottom). Left images: individual frame, right image: sum of 10 frames. Graphs: corresponding cumulative background corrected line profiles colour-coded by frame #.

Figure 21:
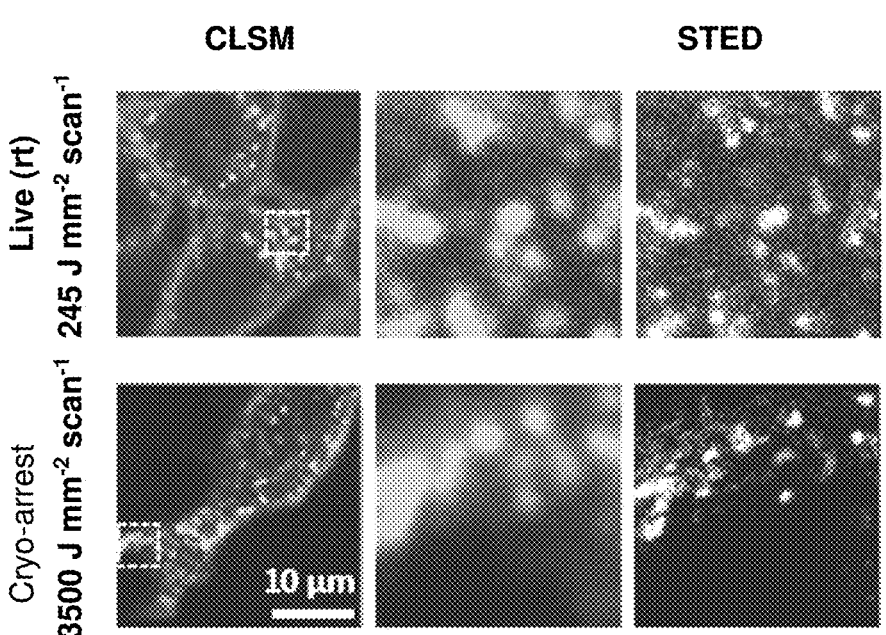
Figure 21:
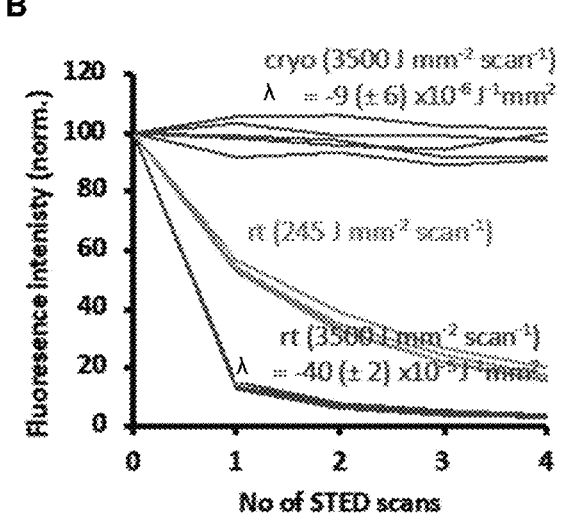
Figure 21:
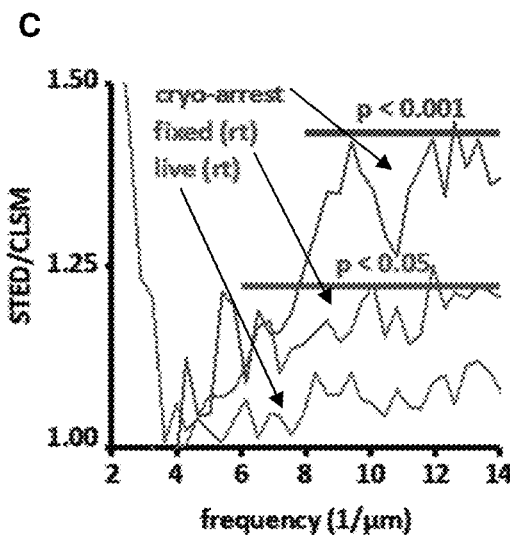
Figure 21:
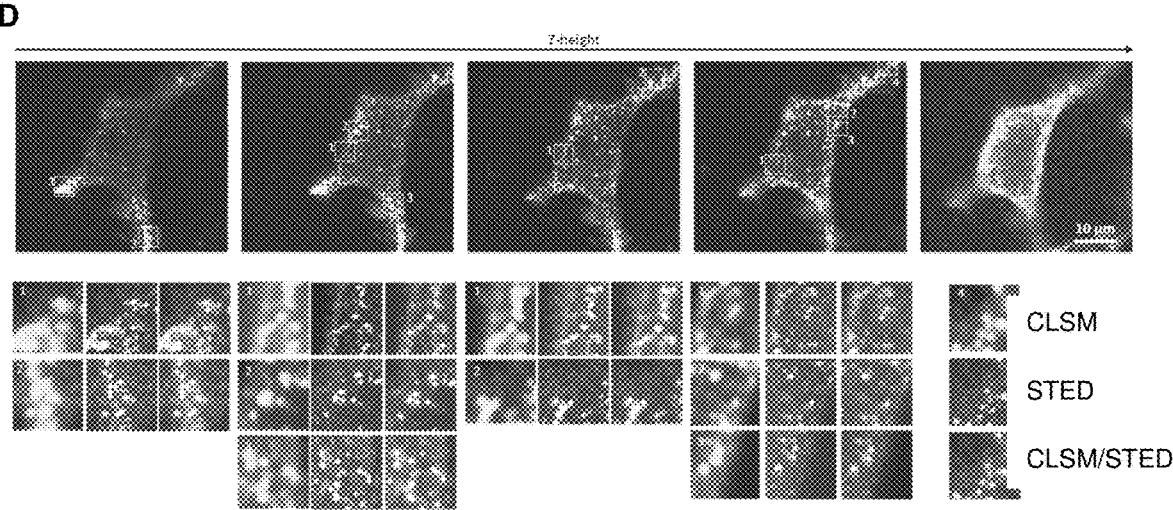

FIG. 21 (A) CLSM and STED nanoscopy of Alexa647-Snap-EGFR in live (top) and cryo-arrested (bottom) MCF7 cells. CLSM of cells (first column, pixel size: 100 nm); detailed (pixel size: 40 nm) CLSM (second column) and STED (third column) scan of boxed area with indicated laser irradiation intensities. Live: single scan; cryo-arrest: sum of 10 scans;

(B) Alexa647 photobleaching during STED scans at room temperature (rt) or under cryo-arrest (cryo) at the indicated depletion laser powers. λ: decay rates determined by exponential fits (mean+/−s.d., N=5);

(C) STED spatial frequency spectrum normalized by corresponding CLSM for different regions containing vesicles (cryo: n=11; chem. fixation: n=8; rt live: n=6); Horizontal lines: frequency range where STED information content is significantly higher than CLSM (Student's t-test); vertical line: digital resolution;

(D) Top row: 3D-CLSM of a cryo-arrested MCF7 cell. Lower rows: detailed high resolution scans (pixel size: 40 nm) of indicated regions in the top row: CLSM (left column), STED (middle column) and merge (right column).

Figure 22:
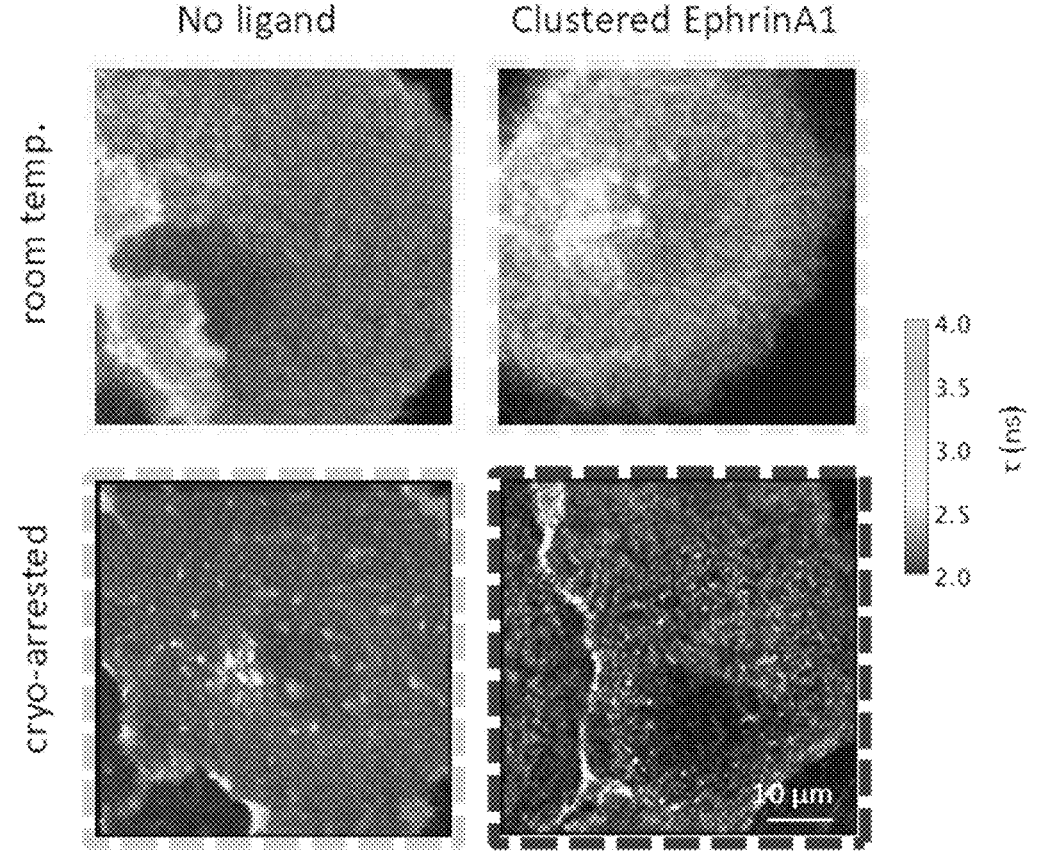

FIG. 22 Representative intensity-weighted average fluorescence lifetime (T) images obtained by confocal FLIM of Cos7 cells stably expressing LIFEA2; without (left column) and with clustered EphrinA1 stimulation (right) at room temperature (rt, top) or under cryo-arrest (cryo, bottom). Bar: τ(ns).

Figure 23:
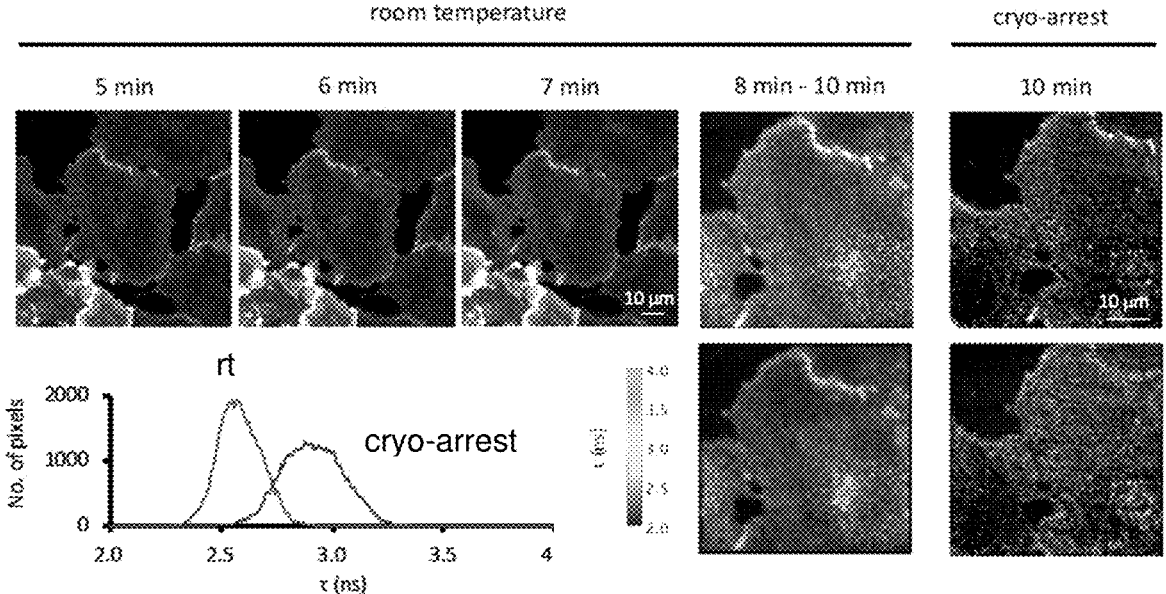

FIG. 23 Confocal FLIM of a LIFEA2-expressing Cos7 cell after indicated times of clustered EphrinA1 stimulation before and during ultra-rapid cryo-arrest. Top panels: fluorescence photon count, lower panels: T (ns), graph: corresponding T histogram at room temperature and cryo-arrest.

Figure 24:
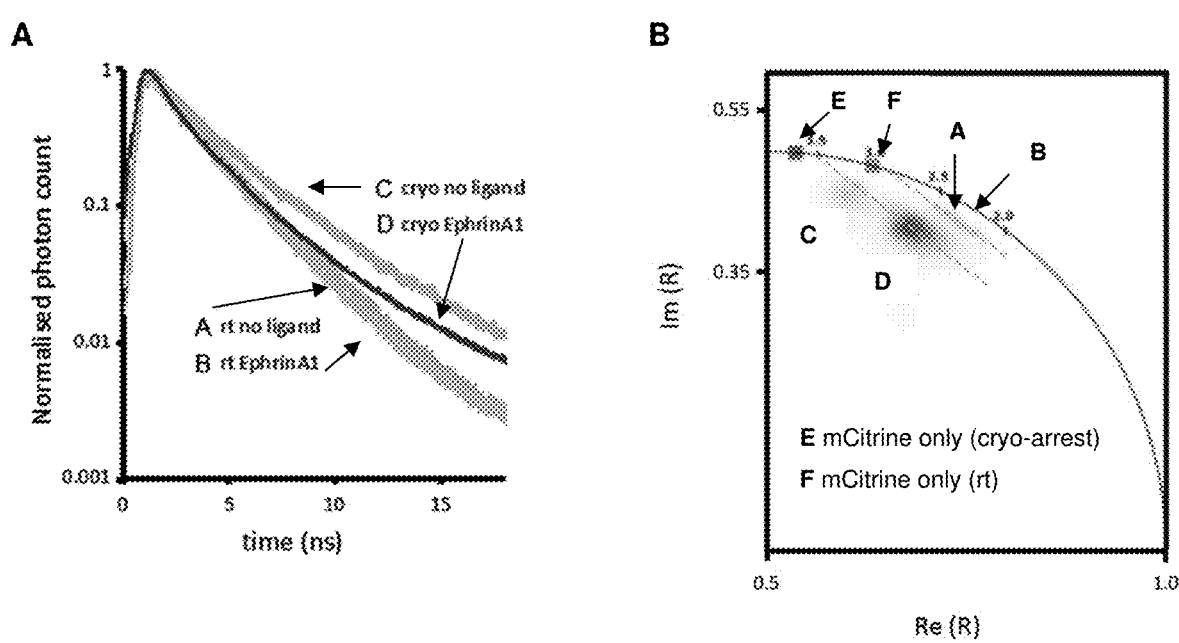

FIG. 24 (A) Normalised cumulative fluorescence decay histograms of LIFEA2 at rt and cryo-arrest, with (rt: B, N=6; n=9; cryo: D, N=7; n=16) and without (rt: A, N=6, n=10, cryo: C, N=2, n=11) clustered EphrinA1 stimulation;

(B) Imaginary (Im) and real part (Re) of phasors (R) derived from the first harmonic of fluorescence decay data in (A); dashed lines: linear fit of phasors.

Figure 25:
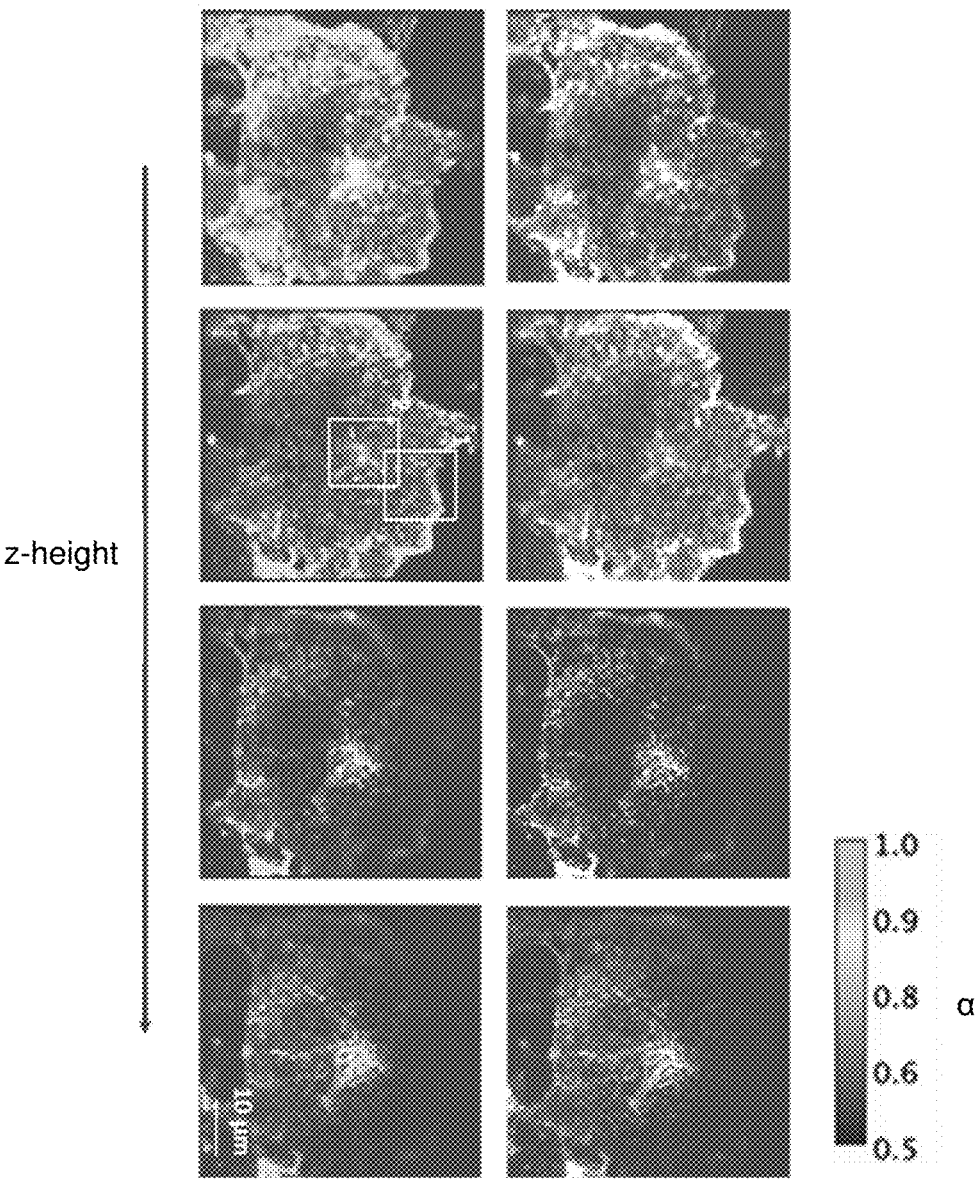

FIG. 25 Fluorescence photon count (top panels) and fluorescence intensity-weighted fraction of the active conformation of LIFEA2 (bottom) at different z-heights (rows) obtained by confocal FLIM upon cryo-arrest after 14 min stimulation with clustered EphrinA1. Bar: fraction of LIFEA2 in active conformation (a).

Figure 26:
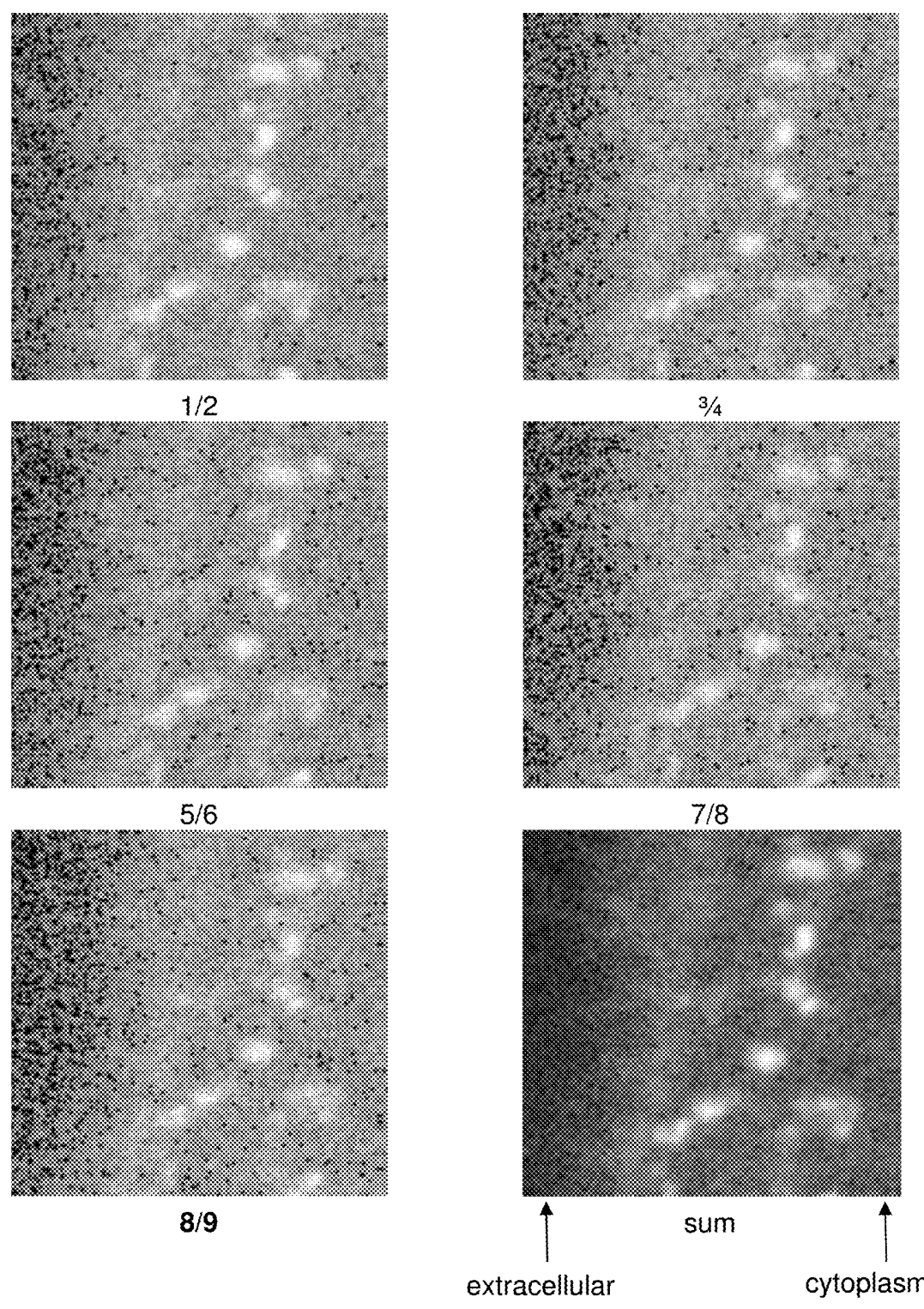

FIG. 26 shows a representative series of 10 consecutive STED scans of a 5×5 μm area of Alexa647-Snap-EGFR in EGF-stimulated (100 ng/ml) MCF7 cells under cryo-arrest. Images are shown as sum of 2 scans and gamma corrected (γ: 0.24) to highlight dim fluorescence. The plasma membrane with protrusions is visible as a continuous fluorescence area separating cytoplasmic fluorescence with endocytic structures from extracellular autofluorescence (extracellular). The series was acquired at the maximum laser intensity (0.42 W/μm$^2$). No ice crystals of 80 nm (digital resolution) or larger, which would exclude fluorophores, scatter the light and appear as dark spots, were detected in the integrated image nor did they form during scanning due to possible heating by the STED beam.

EXAMPLES

Example 1: Design and Operation of an Exemplary Embodiment of the Inventive Device The main parts of the cooling device (100) are a pressure tank (400) for holding $N_2$ and Helium, and the carrier substrate (10) acting as a heat exchanger unit. The pressure tank (400) was made from stainless steel and was sealed with copper gaskets at the junctions. It is cooled from the outside by liquid $N_2$, which is filled into a cooling tank (300) made from steel sheet and insulated by Styrodur®. It contained a pneumatically-controlled custom-built piston, which functions as a valve (22). The piston is sealed with spring-loaded PTFE sealings at the shaft. The tip of the piston was made from high density polyethylene (HDPE) to form a sealing against the stainless steel of the tank, when it is closed and at the same time be resistant to the pressure. When the piston is lifted, the pressurized fluid is released to the upper side (11) of the carrier substrate (10). The supply line (20) acting as connecting part was kept as short as feasible and it was insulated from the inside by HDPE, to minimize heating of the coolant from the metal parts. Within the heat exchanger unit, the mixture is guided through a nozzle at the outlet opening (21) directly on the upper side (11) of the carrier substrate (10) which contains a diamond window. Afterwards, the mixture can expand and is guided towards an exhaust.

Using a mixture of Helium and $N_2$ provided much better cooling performances than each of the two alone. $N_2$ alone liquefies rapidly at −196° C. and 50 bar, which leads to a pressure drop in the vessel and thus a slow release. Consequentially, cooling rates were much slower. Helium cannot liquefy under these conditions, but the gas alone has a too low thermal capacity leading to an incomplete and slow cryofixation.

$N_2$ was loaded into the device by first filling it with nitrogen from the in-house supply (app. 7-8 bar), which was guided through a copper spiral immersed in liquid nitrogen, for 1 min. Afterwards, the pressure was increased by Helium from a pressurized bottle (200 bar, Westfalen A G, Münster, Germany). The pressure used for filling the pressure tank was limited to 50 bar by a reducer valve.

All valves were controlled via a graphical user interface, which was created using the Labview software (National Instruments, Austin, Texas, USA). A check valve suitable for cryogenic use (CGS250SS, Flüssiggas-Anlagen GmbH, Salzgitter, Germany) was installed between the pressure vessel and the copper spiral for the nitrogen supply, to prevent the high pressure from entering the copper spiral. The whole setup is mounted on a frame above the epifluorescence microscope in a way that it can be elevated for sample mounting using an electronically controlled lifting cylinder (1000 N, Drive-System Europe Ltd., Werther, Germany).

Constant heating to 37° C. before the shot was achieved by two 50-W heating bands (Friedr. Freek GmbH, Menden, Germany) that were mounted to the heat exchanger unit and were regulated by a PID-controller (KT4; Panasonic Corporation, Kadoma, Japan).

To keep the temperature constantly at −196° C. after the rapid cooling, $N_2$ from the in-house supply (app. 8 bar) was used, which was guided through a copper spiral immersed in liquid nitrogen. The check valve between the copper coil and the pressure vessel opens as soon as the pressure in the vessel drops below the pressure in the copper coil. Thereby liquid nitrogen flows through the vessel on the diamond and keeps it at temperatures close to −196° C.

Around the objective a transparent flexible foil was mounted by a custom 3D-printed connector to the stage. The room inside of this foil was filled with dry Helium at room temperature at a constant low flow throughout the experiment. The temperature of the objective was regulated by an objective heater (Bioptechs Inc., Butler, PA, USA). The objective heater was always set to 25° C. During a 30-60 minutes imaging experiment the temperature of the objective was usually between 7° C. and 10° C.

Example 2: Temperature Measurements with the Device According to the Invention A 50-µm uninsulated wire thermocouple was attached to the lower side (12) of the carrier substrate (10) of the device (100) according to the invention. The cooling tank (300) and the permanent cooling were cooled down by liquid nitrogen until the heavy boiling of the liquid nitrogen stops and the parts reached a temperature close to η K. The pressure tank (400) was then filled subsequently with liquid nitrogen and helium at 50 bar. A drop of HEPES-buffered DMEM on a microscopy cover slide was attached by water adhesion to the lower side (12) of the carrier substrate (10), so that the drop encloses the thermocouple. Since the wire thermocouple was not flat, a gap between the carrier substrate and the wire persisted, resulting in a cylindrical sample having a diameter of 4 mm and a thickness of approximately 100 µm. The temperature measurement was started and the cooling was started during the running measurement by opening the outlet valve (22). Results of this measurement are shown in FIGS. 6, 7A and 8.

Example 3: Temperature Measurements with the Device According to the Invention at Pressures of 15 Bar, 25 Bar and 50 Bar A 50-µm uninsulated wire thermocouple was attached to the lower side (12) of the carrier substrate (10) of the device (100) according to the invention. The cooling tank (300) and the permanent cooling were cooled down by liquid nitrogen until the heavy boiling of the liquid nitrogen stops and the parts reached a temperature close to η K. The pressure tank (400) was then filled subsequently with liquid nitrogen and helium at 15 bar, 25 bar or 50 bar, or filled with helium at 50 bar without liquid nitrogen. A drop of HEPES-buffered DMEM on a microscopy cover slide was attached by water adhesion to the lower side (12) of the carrier substrate (10), so that the drop encloses the thermocouple. Since the wire thermocouple was not flat, a gap between the carrier substrate and the wire persisted, resulting in a cylindrical sample having a diameter of 4 mm and a thickness of approximately 100 µm. The temperature measurement was started and the cooling was started during the running measurement by opening the outlet valve (22). The cooling rate significantly drops with lower pressure and the lowest cooling rate was observed in the absence of liquid nitrogen (FIG. 7C).

Example 4: Temperature Measurements with a Prior Art Device Adapted to an Inverted Microscope A device as disclosed in EP 2 877 828 B1 was set up and adapted to an inverted microscope by extending the supply line to the upper side of the carrier substrate. The lower side of the carrier substrate was equipped with a thermocouple. The temperature measurements were carried out as described in Example 2. Results of this measurement are shown in FIGS. 7B and 8.

Example 5: Microscopy of Adherently Grown Mammalian Cells

An inverted microscope equipped with the temperature control device of the present invention was set up: First, the cooling tank (300) and the permanent cooling were cooled down by liquid nitrogen until the heavy boiling of the liquid nitrogen stops and the parts reached a temperature close to η K. The pressure tank (400) was then filled subsequently with nitrogen and helium at 50 bar. A cover slide on which cell adherently grew was attached by water adhesion to the lower side (12) of the carrier substrate (10). For this, most of the cell culture medium was removed so that the cells remained in a thin layer of app. 15 µm. The stage was lowered onto the microscope objective and the living cells could be observed. At a time point of interest cells were abruptly cryo-arrested by opening the valve. Detailed microscopic measurements on the cryo-arrested cells could then be performed.

Example 6: Spatially Resolved Spectroscopic Investigation of Living Cells

Methods
Calculations of Resolution and Localization Precision
We calculated the resolution and localization precision by considering the impact of the imaging system, molecular motion, fluorophore's quantum yield and photostability. Briefly, motion was modeled as diffusion of molecules through low Reynolds number liquid, and therefore the diffusion coefficient D for an object was obtained as a function of temperature (T) and radius (r) through the Stokes-Einstein equation as $$D = \frac{1}{6\pi\eta r}k_B T$$

where η is the viscosity of the liquid and $k_B$ is the Boltzmann Constant. The viscosity of water is 0.6922 mPas at 37° C. Upon cryo-arrest (CA) objects were considered to be static since viscosity is increased by >15 orders of magnitude. The photophysical properties of fluorescent proteins (Quantum Yield and photostability) were obtained from literature and their change upon cryo-arrest was obtained from the data presented here ($QY_{CA}/QY_{RT}=1.2$, (Emitted Photons)$_{CA}$/(Emitted Photons)$_{RT}>10$).

Using a gaussian approximation for the point spread function (PSF) and using that the variance of the convolution of multiple gaussians is the sum of their individual variances, the variance of the PSF (EPSF) that includes motional blur $$\left(\sigma^2_{MB}\right)$$

can be calculated as $$\sigma^2_{MB} = \sigma^2_{PSF} + v_{MB}$$

where $v_{MB}$ corresponds to the mean square displacement for the diffusion process (4DT). The described calculation, procedure is appropriate when a single point-like light source is used as label for the imaged structure. In contrast when the structure of interest is completely labelled an extra step is needed. Considering homogeneous labeling as one light source is in each point of the structure, the observed object is the convolution of the EPSF with the object. In the gaussian approximation, the output variance is again the sum of the two input variances. Calculations were performed as a function of the number of photons emitted by the molecule at a rate of ($1/500$ ns) at room temperature. This value ensures that fluorophores are not re-excited when active and was found to be in accordance to other values reported in literature. Additionally, it was considered that only 10% of the emitted photons arrived to the detector due to reduced collection and transmission efficiency.

The resolution as a function of the number of photons was calculated using a Monte Carlo simulation. Briefly, N photons were drawn from a distribution consisting of two gaussians defined by $$\sigma^2_{MB}$$

and separated at a given distance d. The outcome was binned (size a) to simulate pixelation. A gaussian mixture model was used to recover these gaussians and the contrast was defined as $$C = 1 - \frac{I_{min}}{I_{max}}$$

where $I_{min}$ correspond to the number of counts in the valley between the two gaussians and $I_{max}$ to the maximum height of the two peaks. The structures were considered to be resolved when $C>1.7\%$, following the Abbe Criterion. This process was repeated 1000 times for each combination of $$\sigma^2_{MB}, d, N.$$

When the distance was larger than $$3\sqrt{\sigma^2_{MB}}$$

the structures were considered resolved. The resolution for a given $$\sigma^2_{MB}$$

and N was defined as the minimum d at which 95% of the realizations were resolved. The localization precision was calculated as a function of N, a, and the noise of the detector. Importantly, the PSF was replaced by the EPSF to account for motional blur.

Measurement of Cooling Rates

The cooling performance was measured by a 50-μm constantan-copper thermocouple (Omega Engineering Inc., Norwalk, CT, USA; response time: 3 ms) mounted in a μL drop of aqueous buffer. Due to the thickness of the thermo-couple, the total thickness of the sample was ~100 μm, as inferred from the drop covering the whole area of the mounted cover slide. The thermocouple was connected via a USB data acquisition module (Omega Engineering Inc., Norwalk, CT, USA) to a computer and read out with a frequency of 1000 Hz (digital resolution: 2 ms) using the Labview software (National Instruments, Austin, Texas, USA).

Calculation of Thermal Diffusivity Limited Cooling Rates

To relate the measured cooling rates to thermal diffusivity-limited cooling rates in the aqueous sample, heat-flux limited cooling from one surface (i.e. cooling the aqueous solution from the diamond) was based on the equation for the rate of heat flow:

$$\frac{dQ}{dt} = -\kappa A \frac{\Delta T}{L}$$

The area (A) is that of the cover slide ($2\times10^{-5}$ m$^2$). The heat conductivity (K) of water is 0.5562 Wm$^{-2}$, the initial temperature difference ($\Delta T$) is app. 233° C. between a sample at 37° C. and liquid nitrogen (−196° C.). The thickness (L) was calculated from the pipetted volume covering the whole cover slide. The freezing speed of the sample containing the 50-μm thermocouple was calculated by assuming, that the thermocouple is measuring at 50 μm depth (L=50 μm) within the 100-μm thick sample. For aqueous samples without thermocouple, we measured a thicknesses of 10-15 μm and assumed a typical L~13 μm for adherent mammalian cell samples.

The heat flow Q can also be described as $$Q=c*m*T$$

with c being the heat capacity (water: 4 Jcm$^{-3}$K$^{-1}$) and m the mass of the sample (0.25 mg).

Combined, this results in:

$$\frac{dT}{dt} = -\kappa A \frac{\Delta T}{cmL}$$

The estimated temperature course for a sample of thickness L has been calculated using MATLAB starting from the initial temperature of 37° C.:

$$T=\Delta T(e^{-\kappa A/(cmL)}-1)+T_0$$

Despite neglecting heat transport along the thermocouple and the different thermal conductivity and capacity of the thermocouple and the aqueous solution, the resulting diffusivity-limited and measured temperature rates were very similar.

Generation of Stable Transgenic Cell Lines

A polyclonal stable cell line of MCF7 expressing TC-PTP fused to mCitrine (TC-PTP-mCitrine), was generated on the background of MCF7 cells, which have been modified by CRISPR gene editing to not express endogenous TC-PTP. TC-PTP-mCitrine (Stanoev et al. 2018, *Cell Systems* 7, 295-309.e11) was first cloned into the PiggyBac vector (System Bioscience, Palo Alto, CA). Afterwards, MCF7 cells were transfected with this construct and PiggyBac transposase (System Bioscience) in a 1:1 ratio. Transfections were performed 24 h after seeding using FuGENE© 6 (Roche Diagnostics) as transfection reagent. The transfection was performed according to the manufacturer's protocol. After one day, transfected cells were selected by 2 µg/mL puromycin for 30 h. After one additional week in regular cell culture medium, the cells were sorted by FACS for high R-PTP-γ-mCitrine expression.

A polyclonal Cos7 cell line stably expressing LIFEA2 (Sabet et al. 2015, *Nature Communications* 6, 1-13) was generated by cloning LIFEA2 into the PiggyBac vector (System Bioscience, Palo Alto, CA). Afterwards, MCF7 cells were transfected with this construct and PiggyBac transposase (System Bioscience) in a 1:1 ratio. Transfections were performed 24 h after seeding using FuGENE© 6 (Roche Diagnostics) as transfection reagent. The transfection was performed according to the manufacturer's protocol. After one day, transfected cells were selected by 3 µg/mL puromycin for 14 days.

To generate a polyclonal stable cell line of MCF7 expressing EGFR with an extracellular SNAP-tag (SNAP-EGFR) (Ibach et al. 2015, *Plos One* 10, e0143162) and R-PTP-γ fused to mCitrine (R-PTP-γ-mCitrine), both constructs were first cloned into the PiggyBac vector (System Bioscience, Palo Alto, CA). Afterwards, MCF7 cells were transfected with the constructs and PiggyBac transposase (System Bioscience) in a 1:1:2 ratio. Transfections were performed 24 h after seeding using FuGENE© 6 (Roche Diagnostics) as transfection reagent. The transfection was performed according to the manufacturer's protocol. After one day, transfected cells were selected by 2 µg/mL puromycin for 30 h. After one additional week in regular cell culture medium, the cells were sorted by FACS for high R-PTP-γ-mCitrine expression. We observed that MCF7 cells expressing endogenous R-PTP-γ-mCitrine and no endogenous EGFR are not viable over more than a few days. Labeling of Snap-EGFR was done by incubating the cells with 0.5 µM Snap-Surface Alexa 647 (New England Biolabs GmbH, Frankfurt, Germany) for at least 60 min. Due to the constant recycling of EGFR, this resulted in labeling of EGFR at the plasma membrane as well as in endocytic compartments. The cells were labelled with Snap-Surface Alexa 647 and it was microscopically confirmed that >99% of these cells also express SNAP-EGFR.

Cell Culture, Transfection and Preparation

HeLa (ATCC No. CCL-185), Cos7 (ATCC No. CRL-1651) and MCF7 (ATCC No. HTB-22) cells were obtained from ATCC. The cells were authenticated by Short Tandem Repeat (STR) analysis and did not contain DNA sequences from mouse, rat and hamster (Leibniz Institute DSMZ). The cells were regularly tested for mycoplasma infection using the MycoAlert Mycoplasma detection kit (Lonza, Basel, Switzerland). They were maintained in Dulbecco's Modified Eagle's Medium (DMEM) supplemented with 10% fetal bovine serum (FBS), 200 mM L-Glutamine, and 1% non-essential amino acids. and cultured at 37° C. with 95% air and 5% $CO_2$.

For ultra-rapid cryo-arrest experiments, cells were either seeded on 4-mm cover slides in 3.5-cm plastic petri dishes at a concentration of $1$-$2\times10^5$ cells per well or the 4-mm cover slides were attached to chambers from biocompatible silicone (4-well micro-Inserts; ibidi GmbH, Gräfelfing, Germany), which were filled with 20 µL cell culture medium of $4\times10^4$ cells/mL. The later approach had the advantage that the bottom side of the cover slides remained free of medium. Cells were seeded at least one day before the experiment. Excess liquid was removed before the experiment, the cover slides were placed on a custom 3D-printed holder to facilitate their mounting by adhesion of the remaining aqueous solution directly on the diamond heat exchanger. Experiments at 37° C. were performed in glass bottom cell culture dishes (MatTek Corporation, Ashland, MA, USA) with $1$-$4\times10^5$ cells per dish.

Transient transfections of HeLa cells with EGFP (GFP-N₁ vector, Clontech Laboratories Inc., Mountain View, CA, USA), have been done 6-24 h after seeding of the cells using 1 µg DNA per well and FuGENE© 6 (Roche Diagnostics) as transfection reagent. The transfection was performed according to the manufacturer's protocol.

Chemical fixation for STED imaging was done by incubating the cells in 2% glutaraldehyde in 4% formaldehyde in phosphate buffered saline at 37° C. for 20 min. This fixes cells faster and with less artefacts than other aldehyde-fixations (Huebinger et al. 2018, *Sci Rep* 8, 17756).

Fluorescence Microscopy

Cryo-fluorescence microscopy and corresponding control experiments were performed on a commercial confocal laser-scanning STED microscope (Expert Line, Abberior Instruments, Gottingen, Germany) equipped with 488-nm, 561-nm and 640-nm excitation lasers, STED lasers at 595 nm (nominal 1 W) and 775 nm (1.25 W) wavelength and FLIM hardware and software integration. The system was additionally equipped with a MT20 illumination system (Olympus Deutschland GmbH, Hamburg, Germany) and an Orca-R2 camera (Hamamatsu Photonics, Hamamatsu, Japan) for widefield imaging.

Widefield fluorescence imaging of HeLa cells expressing EGFP and solutions of Rhodamine 6G as well as donor only controls for FLIM were done with a 40×0.6NA objective (LucPlanFLN; Olympus Deutschland GmbH, Hamburg, Germany). All other imaging have been acquired with a 40×0.95NA objective (UPlanApo; Olympus Deutschland GmbH, Hamburg, Germany).

Confocal imaging including FLIM measurements have been performed by 485-nm laser excitation (mCitrine) or 640-nm laser excitation (Alexa647; measured irradiation power at the sample plane for photobleaching: 0.2 mW) and pixel length of 100 nm or 200 nm (FLIM). Widefield fluorescence imaging has been done with filter sets for EGFP and mCitrine (excitation: 470/40 nm; dichroic mirror 495 nm; emission 520/35 nm; measured power at the sample plane: 10 mW) or for Alexa647 (excitation: 620/60 nm; dichroic mirror 640 nm; emission 537 700/75 nm) and pixel length of 163 nm. Sequential widefield fluorescence images for SRRF reconstructions have been acquired with a frame rate of 1 frame/s. This comparably low frame rate allowed to successfully reconstruct the super-resolution images from the reduced fluorescence fluctuation dynamics under cryo-conditions.

STED imaging was done with 640-nm laser excitation and the 775-nm laser for stimulated emission depletion. Samples have been scanned with pixel length of 40 nm and dwell time of 15 us. Individual frames have been aligned by rigid body registration algorithm using the open source program Fiji (Schindelin et al. 2012, *Nature Methods* 9, 676-682) to compensate for sample drift. To achieve the sensitive doughnut-shape depletion beam under cryo-conditions, spherical aberrations had to be corrected by the correction collar of the objective.

Image Analysis

General image processing including quantification of fluorescence intensities, extracting line profiles and calculation of Manders coefficients was done using the open source program Fiji (Schindelin et al. 2012 *Nature Methods*, 9: 676-82). Quantification of bleaching was done by fitting fluorescence intensities by monoexponential fits using Microsoft Excel (Microsoft Corporation, Redmond, WA, USA). In cases where fluorescence intensities could not be fitted by monoexponential fits due to convergence to 0 fluorescence, the first, monoexponential part of the data was fitted. Super-Resolution Radial Fluctuation (SRRF) analysis was done using the NanoJ plugin to Fiji (Laine et al. 2019 *Journal of Physics D: Applied Physics*, 52: 163001). Coefficients of determination were calculated using the pearsonr function implemented in SciPy (Version 1.5.2) (Virtanen et al. 2020, *Nature Methods* 17, 261-272).

Analysis of FLIM Datasets

Each photon counting dataset was registered to compensate for possible stage drift by applying a rigid translation only transformation. After calculating a photon counting image stack, the shifts in x and y directions of each frame in relation to the first were found using a discrete Fourier transform based algorithm (Reddy et al. 1996, *IEEE Transactions on Image Processing* 5, 1266-1271) implemented in Python (imreg_dft 2.0). These values were then rounded to the nearest integer. A new, registered, photon counting dataset was assembled by shifting each photon in each frame by the number of pixels previously determined. Photons that fell outside of the image defined by the first frame after registration were dropped. Registered photon counting datasets were corrected for background and instrument response function (IRF) directly from the data as previously described (Grecco et al. 2009, *Opt. Express* 17, 6493-6508). Briefly, the background was estimated in two ways. First, all frames in the image stack were summed together to produce a photon counting image. After denoising using a 9-pixel median filtered implemented in Python (SciPy 1.5.2) the position (P) of the minimum value was found. The total background was then calculated from the original image as the mean value around P pixel using a 21-pixel to 51-pixel (depending on the image) window. The background was also estimated from the photon counting histogram. Again, after median denoising (21-bin window) the background per bin was estimated as the mean value (51-bin window) in the original histogram around the minimum in the denoised-one. This value was then extrapolated to the whole image by multiplying by the number of bins. Both background values were cross checked for consistency. The IRF was estimated from the higher harmonics of the histogram.

The resulting corrected datasets were denoised using pawFLIM (Silberberg et al. 2017, *Methods Appl Fluoresc* 5, 024016). Briefly, this is a weighted translational-invariant Haar-wavelet transform denoising algorithm to phasor images which results in significantly less bias and mean square error.

Measured average fluorescence lifetimes of the FRET-donor mCitrine fused to TC-PTP or R-PTP-γ expressed in MCF7 cells increased from 3.04+/−0.01 ns at room temperature to 3.71+/−0.02 ns (mean+/−s.d.) under cryo-arrest (p<0.0001 using student's t-test), but remained close to mono-exponential. In measurements using LIFEA2, the clearly resolved non-exponential fluorescence decay profiles under cryo-arrest indicated mixtures of active and inactive conformations that exhibit a distinct average FRET efficiency as well as a fraction of LIFEA2 with non-absorbing mCherry acceptors. Thus, the resulting denoised cumulative phasor plots were analyzed by global analysis with a three component model derived as an extension of the two component model previously described (Verveer et al. 2000, *Science* 290, 1567-1570). These three spatially invariant states are: (1) a fixed fraction of donor alone (sensor with non-absorbing acceptor; fraction under cryo-arrest: 0.2) and fluorescence lifetime (3.71+/−0.02 ns), (2) sensor in closed (active) conformation with fluorescence lifetime (0.9+/−0.2 ns) and corresponding FRET efficiency (0.75+/−0.25) and, (3) sensor in extended (inactive) conformation with fluorescence lifetime (3.5+/−0.2 ns) and corresponding FRET efficiency (0.05+/−0.01); each represented by a phasor. Therefore, each observed phasor is the sum of 3 phasors weighted by the corresponding normalized number of photons from each state. The complete phasor data of an image was therefore fitted with a linear combination of the three phasors and the corresponding photon fractions using a custom-made Python program based on Imfit 1.0.2. As previously described (Verveer et al. 2000, *Biophys J* 78, 2127-2137), the conversion from photon fractions to molecular fractions in each state was done by dividing each by the corresponding fluorescence lifetime (a measure of the quantum yield) and renormalizing the sum to 1. The fraction of active conformation was renormalized by dividing by (1-fraction of donor alone) to account for the fraction of sensors with non-absorbing acceptors.

Fluorescence microscopy of cryofixed HeLa cells expressing EGFP HeLa cell transfected with EGFP were prepared for cryo-microscopy as outlined above. Wide-field fluorescence imaging of these HeLa cells expressing EGFP showed that EGFP fluorescence as well as cellular morphology was preserved after cryopreservation with the inventive device, exhibiting no detectable ice crystals, which would result in fluorescence free areas (FIG. 17).

Fluorescence Microscopy of Rhodamine 6G Solution

A solution of Rhodamine 6G in cell culture medium with a thickness of 15 μm was prepared and subjected to cryo-preservation and thawing with the device described herein. Wide-field fluorescence imaging of the fluorescent solution showed that no detectable ice crystals were formed during and after cryofixation; Upon thawing the solution, ice crystals were formed (FIG. 18).

Confocal Imaging of MCF7 Cells Expressing TC-PTP-mCitrine

In order to investigate if the intricate sub-cellular organisation was preserved after ultra-rapid cryo-arrest, the extensive and dynamically maintained endoplasmic reticulum (ER) (Guo et al. 2018, *Cell*, 175: 1430-42.e17), was imaged before and after cryo-arrest by multiple fluorescence microscopy modalities. For this, MCF7 cells expressing TC-PTP fused to the fluorescent protein mCitrine (TC-PTP-mCitrine) (Stanoev et al. 2018, *Cell Systems*, 7: 295-309.e11) were used. Confocal laser scanning microscopy (CLSM)

before and after cryo-arrest demonstrated that the ER was highly preserved after ultra-rapid cryo-fixation.

Due to the high photostability of fluorophores at cryo-temperatures, 100 widefield fluorescence images of the same arrested cells could be acquired enabling super resolution radial fluctuation (SRRF) reconstructions (Gustafsson et al. 2016, *Nature Communications,* 7: 12471) with improved resolution and contrast (FIG. 19), demonstrating the preservation of the delicate ER organelle after cryo-fixation.

Confocal Imaging of MCF7 Cells Co-Expressing Alexa647-SNAP-EGFR and R-PTP-γ-mCitrine To assess how ultra-rapid cryo-arrest could improve the investigation of molecular organization in dynamic cellular systems, the spatial distributions of a proto-oncoprotein and functionally related candidate tumour suppressor protein were imaged by multi-modal fluorescence imaging. For this, MCF7 cells that co-expressed the fluorescent fusion constructs of the receptor tyrosine kinase epidermal growth factor receptor (EGFR, Alexa647 labelled Snap-EGFR: Alexa647-SNAP-EGFR) as well as the receptor-like protein tyrosine phosphatase γ (R-PTP-γ) fused to mCitrine (R-PTP-γ-mCitrine) (Stanoev et al. 2018, *Cell Systems,* 7: 295-309.e11) were mounted on the cryo-microscope according to the invention. Stimulation with epidermal growth factor (EGF, 100 ng/ml) enabled the vesicular transport dynamics of both proteins to be followed at room temperature, after which cryo-arrest allowed for precise capture of the spatial patterns of both proteins in relation to one other (FIG. 20A).

SRRF reconstructions of 100 widefield fluorescence images of the same arrested cells became also possible (FIG. 20A). From these reconstructions the inhomogeneous distribution of EGFR along the lateral plane of the plasma membrane (Masip et al. 2016, *Nature Methods,* 13) became apparent as ~400 nm patches. Dual colour SRRF revealed a high co-localization of R-PTP-γ and Alexa647-SNAP-EGFR in these patches in quiescent cells. Both proteins also exhibited co-localization in endosomal structures which was however lost after 15' EGF stimulation, where both proteins already separated at the plasma membrane (FIG. 19). This co-localisation analysis obtained at cryo-temperatures revealed the nanoscale organisation of EGFR/R-PTP-γ complexes that co-traffic in the endosomal system. These results are consistent with recycling EGFR/R-PTP-γ complexes maintaining a silent signalling state of EGFR at the plasma membrane in the absence of stimulus (Baumdick et al. 2015, *eLife,* 4). The observed separation of EGFR/R-PTP-γ clusters upon EGF stimulus show that the EGFR-EGF dimer complexes cannot longer interact with R-PTP-γ. EGFR-EGF complexes are subsequently re-routed to late endosomes to generate a finite endosomal signalling response (Stanoev et al. 2018, *Cell Systems,* 7: 295-309.e11).

STED Microscopy of MCF7 Cells Co-Expressing Alexa647-SNAP-EGFR and R-PTP-γ-mCitrine MCF7 cells co-expressing Alexa647-SNAP-EGFR and R-PTP-γ—mCitrine were obtained and prepared for STED Imaging as outlined above.

STED nanoscopy constitutes a special case among super-resolution techniques, since fluorescence intensity can be directly related to the density of fluorescence markers, yielding quantitative molecular patterns. In this laser scanning nanoscopy, resolution beyond the diffraction limit is achieved by stimulated emission of excited fluorophores using a second high-intensity, doughnut-shaped laser beam. The consequent high demands to photostability, fluorescence quantum yield and density of fluorescent labels hamper STED imaging of fluorescently tagged sparse molecules in live cells.

Indeed, only a low depletion laser power (<42 mW/μm$^2$) preserved enough fluorescent markers to obtain a noisy STED image of Alexa647-Snap-EGFR in MCF7 cells at room temperature (see FIGS. 21A and 21B), resulting in a statistically insignificant increase in information content beyond the diffraction limit over regular CLSM (FIGS. 21A and 21C). The resolution could be slightly improved by alleviating motional blur through chemical fixation of the cells, enabling the accumulation of photons from 5 consecutive STED frames before bleaching the sample (FIG. 21C). However, after ultra-rapid cryo-arrest of living cells, the ~45-fold decreased bleaching rate (FIG. 21*b*) enabled a 10-fold increase of both the depletion laser power (420 mW/μm$^2$) as well as exposure time (radiation energy density: 35 mJ/μm$^2$), resulting in sharply resolved endosomal structures containing Alexa647-Snap-EGFR (FIG. 21D). Information content was significantly increased at scales <125 nm down to the digital (pixel-limited) resolution of 80 nm (FIG. 21C). No ice-crystals were detected at this resolution as fluorescent free areas in the cytoplasm of these cells (FIG. 26). This was also the case after repeated STED scanning with maximal depletion laser intensity after which the structure and configuration of the endocytic structures was preserved. This shows that the high intensity STED illumination did not warm the sample enough to create ice crystals.

This experiment confirms that by cryofixation motional blur and bleaching are largely prevented, thereby enabling scanning a whole cell in 3D by confocal microscopy, and subsequently recording STED images of different regions at different z-levels (FIG. 21D). The total acquisition time was >15 min.

Consequently, cryofixation facilitates STED microscopy of multiple sub-areas within a much larger volume with drastically improved signal.

Confocal FRET-FLIM microscopy of Cos7 cells expressing LIFEA2 Cos7 cells expressing LIFEA2 were obtained and prepared for cryomicroscopy as outlined above. FRET-FLIM investigations were performed in order to determine the activity state distribution of the tyrosine kinase EphA2 after cryofixation with the inventive device.

At room temperature, receptor activation by the ligand clustered Ephrin A1 could be observed at the plasma membrane of Cos7 cells by a small (~0.2 ns) drop in average fluorescence lifetime of the FRET donor mCitrine in LIFEA2 (FIG. 22). Yet, motional blur and poor separation of the fluorescence decay profiles and derived phasors severely limited the spatial as well as fluorescence lifetime resolution on membrane structures in the cell (FIG. 22). At cryo-temperatures, however, the increased quantum yield of mCitrine resulted in a largely improved separation of the decay profiles, average fluorescence lifetimes (T) and associated phasors of LIFEA2 in stimulated versus unstimulated cells (FIG. 22). Clustered receptor activity could now be resolved in plasma membrane patches and endocytic structures (FIG. 22), where basal activity in absence of exogenous stimulation was likely caused by endogenous ephrin on neighbouring cells. This contrast improvement in molecular activity imaging became especially apparent when the same Ephrin A1-stimulated cell was compared before and during cryo-arrest (FIG. 22).

Under cryo-arrest, the large separation of the cumulative phasors (FIG. 24C) enables to derive the spatially invariant fluorescence lifetimes of the active (τ=0.9±0.2 ns) and inactive (τ=3.5±0.1 ns) conformations by global analysis as well as the fraction of LIFEA2 with non-absorbing mCherry acceptor (~0.2). Using these constrains, the spatially variant molecular fraction of active LIFEA2 (α) could be derived from the phasor in each voxel of an image. Cryo-arrest thereby enabled the acquisition (time>10 min) and reconstruction of a 3D molecular activity map of LIFEA2 in a stimulated Cos7 cell (FIG. 25), where individual vesicles with activated receptors that emerged from the plasma membrane could be distinguished from gradually inactivated receptors in the perinuclear endosomal compartments.

Thus, under cryofixation with the inventive device, the spatial distribution of fluorescence lifetimes could be measured with greatly improved resolution, enabling an unpreceded mapping of the conformational state of the receptor to the numerous individual endosomes and endomembrane structures in the cell (FIG. 25).

What is claimed is:

1. A method for decreasing temperature of a sample for inverse microscopy comprising the following steps:
(a) providing a sample on the lower side of a carrier substrate at atmospheric pressure;
(b) providing in a pressure tank liquid nitrogen having a temperature below its critical temperature and helium having a pressure of at least 2.5 MPa; and
(c) supplying the liquid nitrogen from the pressure tank to the upper side of the carrier substrate under pressure by opening an outlet valve located at the bottom of the pressure tank, wherein the liquid nitrogen is brought into contact with the upper side of the carrier substrate thereby decreasing the temperature of the sample.

2. The method according to claim 1 further comprising step (d):
(d) tempering the sample on the lower side of the carrier substrate by passing a further liquid over the upper side of the carrier substrate.

3. The method according to claim 1, wherein the sample is a living sample of a biological material, and wherein the biological material is optionally living cells.

4. The method according to claim 1, wherein the pressure of helium is between 5 MPa and 100 MPa.

5. The method according to claim 1, wherein in step (c) the temperature of the sample is decreased, decreased without formation of ice crystals within the sample and/or decreased without formation of ice crystals larger than 10 nm in diameter within the sample.

6. A device for decreasing the temperature of a sample comprising:
(a) a carrier substrate with a lower side for accommodating a sample and with an upper side, which is exposed for a supply of a liquid;
(b) a pressure tank adapted for holding a fluid, the pressure tank comprising an outlet valve located at the bottom;
(c) a supply line connecting the outlet valve with the upper side of the carrier substrate, wherein the supply line is adapted to pass the liquid with a pressure higher than the atmospheric pressure through it; and
(d) an expansion chamber surrounding the upper side of the carrier substrate,
wherein the pressure tank is mounted to the upper side of the carrier substrate, to keep the supply line as short as possible.

7. The device according to claim 6, wherein the supply line is insulated from the inside.

8. The device according to claim 6, wherein the temperature of said sample is decreased in a way that no ice crystals within the sample are formed or that no ice crystals larger than 10 nm in diameter within the sample are formed.

9. The device according to claim 6, wherein the outlet valve is selected from the group consisting of a switchable valve, a fast-opening switchable valve, an electrically switchable valve, a pneumatically switchable valve, and a switchable piston valve.

10. The device according to claim 6, wherein the bottom of the pressure tank is funnel-shaped and the outlet valve is located at the center of said bottom.

11. The device according to claim 6, wherein the carrier substrate is diamond, optionally a CVD diamond.

12. The device according to claim 6, wherein the distance between the outlet opening and the upper side of the carrier substrate is in the range of 0.5 mm to 1.5 mm.

13. The device according to claim 6, wherein the expansion chamber has a dimension in the range of 50 $cm^3$ to 100 $cm^3$.

14. The device according to claim 6, wherein the pressure tank is surrounded by a cooling tank for cooling the liquid and/or wherein the supply line is funnel-shaped, optionally funnel-shaped at the outlet opening.

15. A method of fluorescence microscopy comprising the following steps:
(a) providing a sample containing fluorescent molecules on the lower side of a carrier substrate at atmospheric pressure;
(b) providing in a pressure tank liquid nitrogen having a temperature below its critical temperature and helium having a pressure of at least 2.5 MPa;
(c) supplying the liquid nitrogen from the pressure tank to the upper side of the carrier substrate under pressure by opening an outlet valve located at the bottom of the pressure tank, wherein the liquid nitrogen is brought into contact with the upper side of the carrier substrate, thereby decreasing the temperature of the sample;
(d) illuminating the temperature decreased sample; and
(e) detecting the fluorescence produced by the illuminated sample.

16. A method for performing optical microscopy with stimulated emission depletion of a cryo-arrested sample, comprising
(a) providing a sample containing fluorescent molecules on the lower side of a carrier substrate at atmospheric pressure;
(b) providing in a pressure tank liquid nitrogen having a temperature below its critical temperature and helium having a pressure of at least 2.5 MPa;
(c) supplying the liquid nitrogen from the pressure tank to the upper side of the carrier substrate under pressure by opening an outlet valve located at the bottom of the pressure tank, wherein the liquid nitrogen is brought into contact with the upper side of the carrier substrate, thereby decreasing the temperature of the sample;
(d1) illuminating the temperature decreased sample by a first pulsed laser beam to excite the fluorescent molecules for fluorescence in the sample, wherein the first pulsed laser beam is focused on at least one focal area;
(d2) illuminating the temperature decreased sample by a second torus-shaped laser beam to de-excite the fluorescent molecules in the sample, wherein the second laser beam comprises an intensity zero point in the at least one focal area;
(e) detecting the fluorescence produced by the illuminated sample; and
(f) optionally repeating steps (d1), (d2) and (e) at different positions of the focal area of the first pulsed laser beam and at different positions of the intensity zero point of the second torus-shaped laser beam.

17. A method for performing fluorescence-lifetime imaging microscopy with time-correlated single-photon counting of a cryo-arrested sample, comprising (a) providing a sample containing fluorescent molecules on the lower side of a carrier substrate at atmospheric pressure;

(b) providing in a pressure tank liquid nitrogen having a temperature below its critical temperature and helium having a pressure of at least 2.5 MPa;

(c) supplying the liquid nitrogen from the pressure tank to the upper side of the carrier substrate under pressure by opening an outlet valve located at the bottom of the pressure tank, wherein the liquid nitrogen is brought into contact with the upper side of the carrier substrate, thereby decreasing the temperature of the sample;

(d) periodically exciting the fluorescent molecules in the temperature decreased sample to emit fluorescence photons by illuminating the sample with a pulsed laser beam;

(e) detecting the fluorescence photons produced by the sample together with the photon arrival times relative to the laser pulse; and (f) determining the fluorescence-lifetime from the detected fluorescence photons and the photon arrival times.

* * * * *